(12) United States Patent
O'Kane et al.

(10) Patent No.: US 11,500,522 B2
(45) Date of Patent: Nov. 15, 2022

(54) SYSTEM, METHOD, AND APPARATUS FOR PROVIDING A RECORD OVERVIEW OF AN OPPORTUNITY BASED ON AN EVENT INTEGRATED WITH A THIRD-PARTY PERSONAL INFORMATION MANAGEMENT (PIM) APPLICATION WITHIN A CLOUD BASED COMPUTING ENVIRONMENT

(71) Applicant: salesforce.com, inc., San Francisco, CA (US)

(72) Inventors: Melissa Ann O'Kane, San Leandro, CA (US); Sriram Venkata Krishnan Iyer, Fremont, CA (US); Daniel Tafner McGarry, San Francisco, CA (US); Douglas M. Lowder, San Leandro, CA (US); Anthony J. Annuzzi, Sunnyvale, CA (US); Elias Yates Andrew, Mountain View, CA (US); Emily Schwartzman, San Francisco, CA (US); Christopher Thomas Sellinger, San Francisco, CA (US)

(73) Assignee: salesforce.com, inc., San Francisco, CA (US)

( * ) Notice: Subject to any disclaimer, the term of this patent is extended or adjusted under 35 U.S.C. 154(b) by 57 days.

(21) Appl. No.: 16/447,133

(22) Filed: Jun. 20, 2019

(65) Prior Publication Data
US 2020/0097170 A1    Mar. 26, 2020

Related U.S. Application Data

(60) Provisional application No. 62/736,450, filed on Sep. 25, 2018.

(51) Int. Cl.
*G06F 3/048*   (2013.01)
*G06F 3/0484*   (2022.01)
(Continued)

(52) U.S. Cl.
CPC .......... *G06F 3/0484* (2013.01); *G06F 3/0481* (2013.01); *G06F 3/04886* (2013.01);
(Continued)

(58) Field of Classification Search
CPC .. G06F 3/0484; G06F 3/0481; G06F 3/04886; G06F 9/451; G06F 9/453;
(Continued)

(56) References Cited

U.S. PATENT DOCUMENTS 8,196,097 B1   6/2012   Sampath et al.
8,200,962 B1   6/2012   Boodman et al.
(Continued)

OTHER PUBLICATIONS

Advisory Action for U.S. Appl. No. 16/447,126 dated Oct. 15, 2020, 3 pages.
(Continued)

Primary Examiner — Haoshian Shih
(74) Attorney, Agent, or Firm — Elliott, Ostrander & Preston, P.C.

(57) ABSTRACT

System and method to display PIM application content in one or more PIM application display panes of a graphical user interface (GUI), select the displayed PIM application content for which to obtain a one or more record overviews of a CRM record related to the PIM application content, receive PIM application context data related to selected PIM application content, generate the one or more record overviews of the CRM record related to the PIM application content to display in a context-specific display pane based on the received PIM application content or PIM application context data, and display the generated one or more record overviews in the context-specific display pane.

21 Claims, 33 Drawing Sheets

(51) Int. Cl.
   *G06F 3/0481* (2022.01)
   *G06F 9/451* (2018.01)
   *G06F 3/04886* (2022.01)
   *G06Q 10/10* (2012.01)
   *G06F 16/28* (2019.01)
   *G06F 16/2457* (2019.01)

(52) U.S. Cl.
   CPC .............. *G06F 9/451* (2018.02); *G06F 9/453* (2018.02); *G06F 16/24575* (2019.01); *G06F 16/287* (2019.01); *G06Q 10/107* (2013.01); *G06Q 10/109* (2013.01)

(58) Field of Classification Search
   CPC ............ G06F 16/287; G06F 16/24575; G06Q 10/107; G06Q 10/109
   See application file for complete search history.

(56) References Cited

U.S. PATENT DOCUMENTS

| | | | | |
|---|---|---|---|---|
| 8,244,714 | B1* | 8/2012 | Collins | G06F 16/248 707/714 |
| 2011/0314366 | A1* | 12/2011 | Parker, III | G06Q 30/02 715/221 |
| 2013/0073330 | A1* | 3/2013 | McCormack | G06Q 10/00 705/7.21 |
| 2014/0142948 | A1* | 5/2014 | Rathi | G06F 3/167 704/270.1 |
| 2015/0347478 | A1* | 12/2015 | Tripathi | G06F 16/2246 707/743 |
| 2016/0198322 | A1* | 7/2016 | Pitis | H04W 4/80 455/420 |
| 2016/0202851 | A1* | 7/2016 | Turner | H04W 4/029 715/734 |
| 2017/0109446 | A1* | 4/2017 | Wu | G06F 7/02 |
| 2017/0316022 | A1* | 11/2017 | Joshi | G06Q 30/0631 |
| 2019/0339822 | A1* | 11/2019 | Devine | H04L 51/16 |
| 2020/0028753 | A1 | 1/2020 | Powar et al. | |

OTHER PUBLICATIONS

Corrected Notice of Allowability for U.S. Appl. No. 16/447,126 dated Oct. 8, 2021, 3 pages.

Final Office Action for U.S. Appl. No. 16/447,112 dated Feb. 5, 2021, 11 pages.

Final Office Action for U.S. Appl. No. 16/447,126, dated Jul. 31, 2020, 27 pages.

Notice of Allowance for U.S. Appl. No. 16/447,112 dated Aug. 24, 2021, 7 pages.

Notice of Allowance for U.S. Appl. No. 16/447,126 dated Sep. 30, 2021, 8 pages.

Office Action for U.S. Appl. No. 16/447,112 dated Apr. 16, 2020, 14 pages.

Office Action for U.S. Appl. No. 16/447,126, dated Mar. 19, 2020, 21 pages.

Office Action for U.S. Appl. No. 16/447,126 dated May 13, 2021, 30 pages.

* cited by examiner

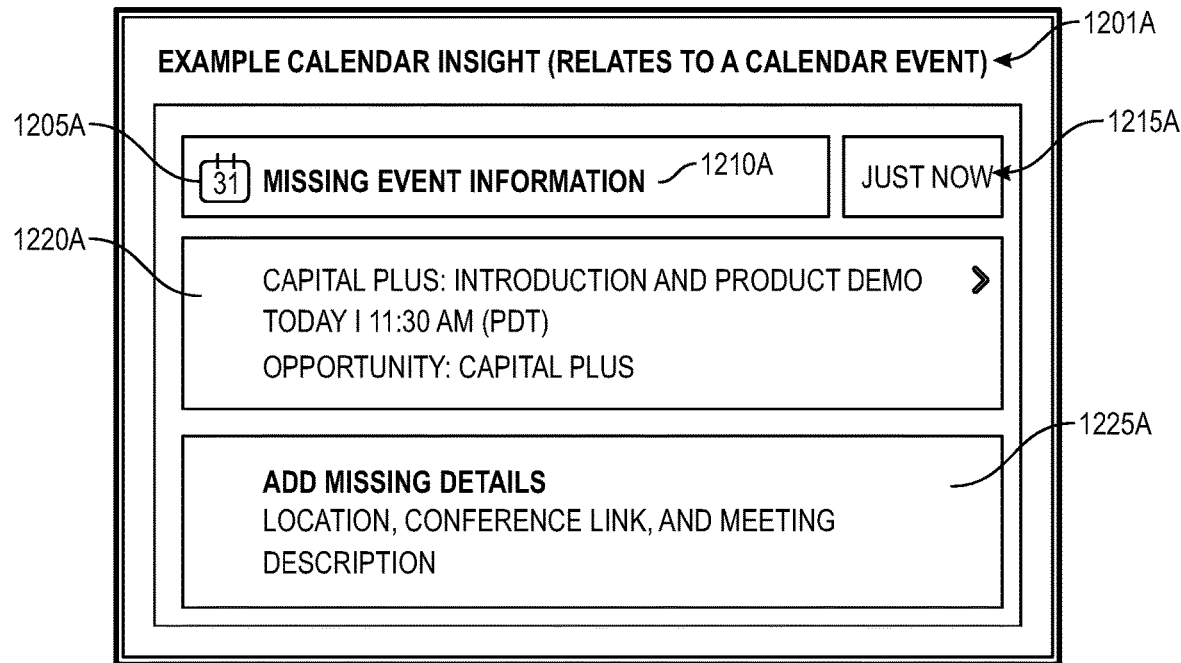
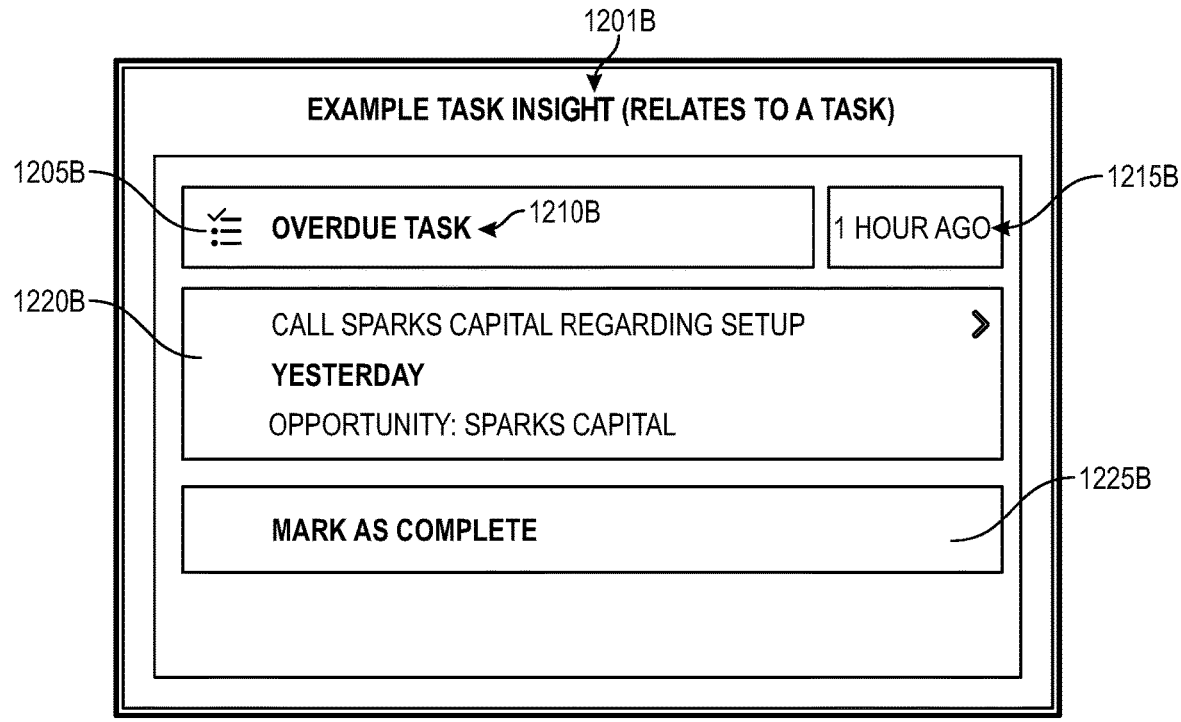
FIG. 12A

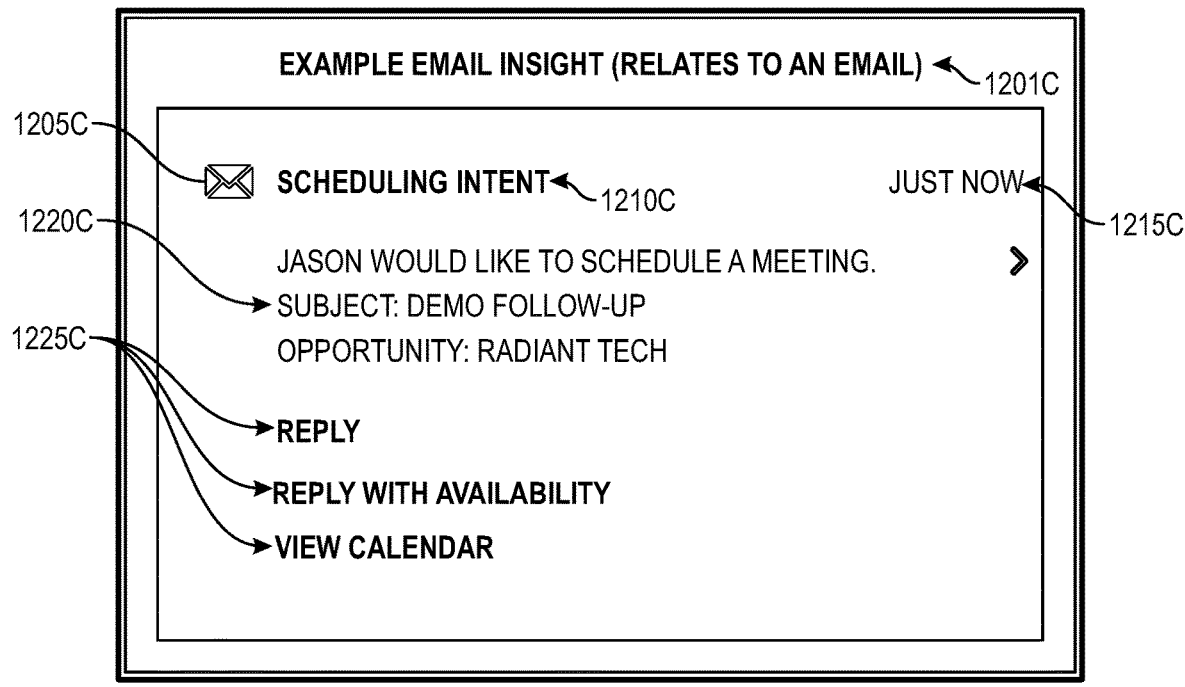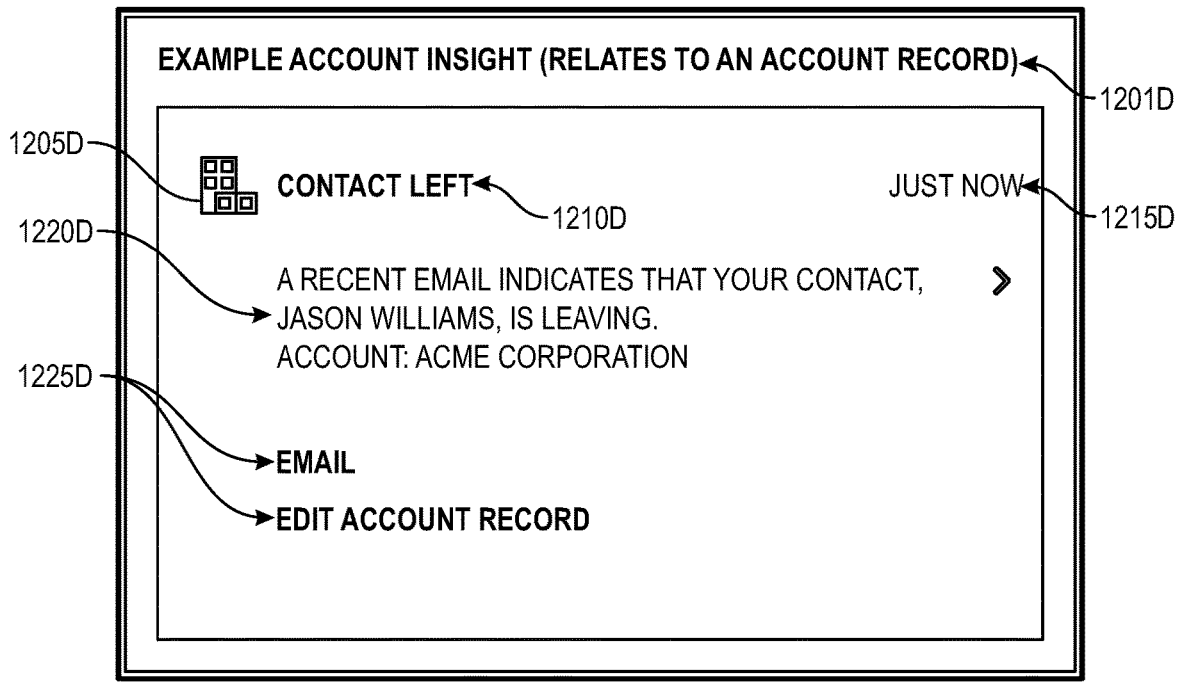
FIG. 12B

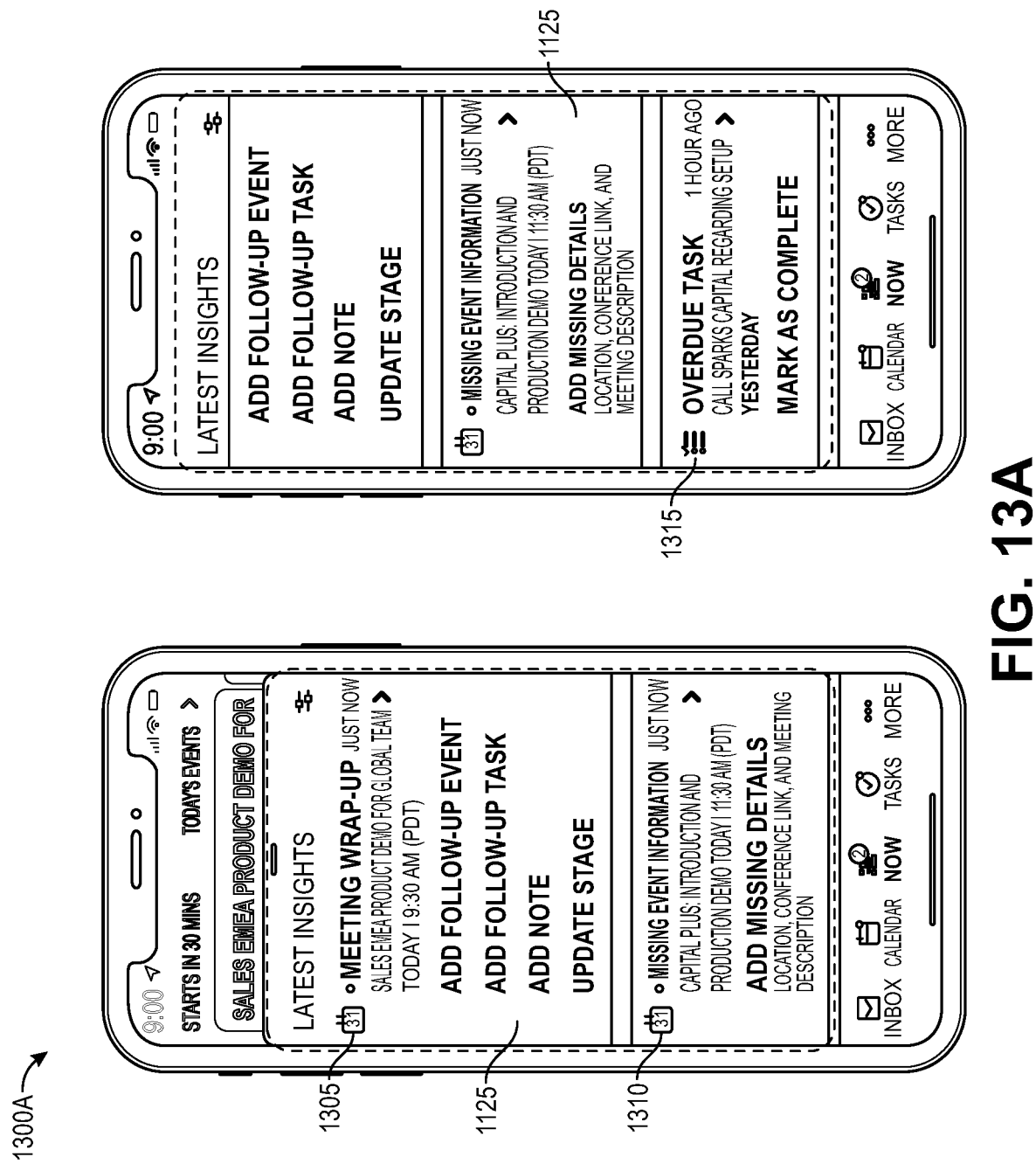

| INSIGHT CATEGORY | INSIGHT TYPE | DISPLAY RULE | EXPIRATION RULE |
|---|---|---|---|
| EMAIL | SCHEDULING INTENT PRICING DISCUSSED OUT OF OFFICE EXECUTIVE MENTIONED | AT TIME OF INSIGHT TRIGGER | BASED ON USER SETTING |
| CALENDAR | MISSING INFORMATION PENDING GUESTS | 24 HOURS BEFORE EVENT START TIME | 1 MINUTE AFTER EVENT END TIME |
| CALENDAR | MEETING WRAP-UP | 1 MINUTES AFTER EVENT END TIME | BASED ON USER SETTING |
| TASK | TASK | AT TIME OF TASK TRIGGER | BASED ON USER SETTING |

FIG. 16

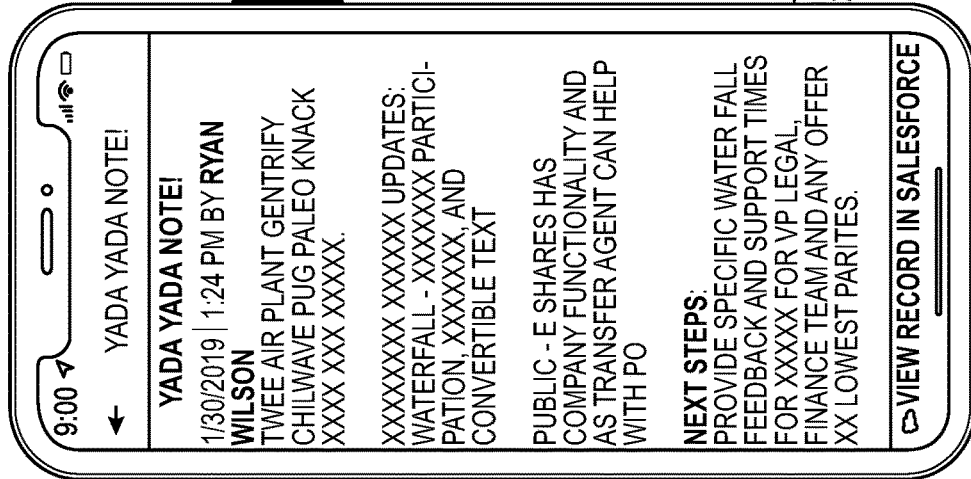
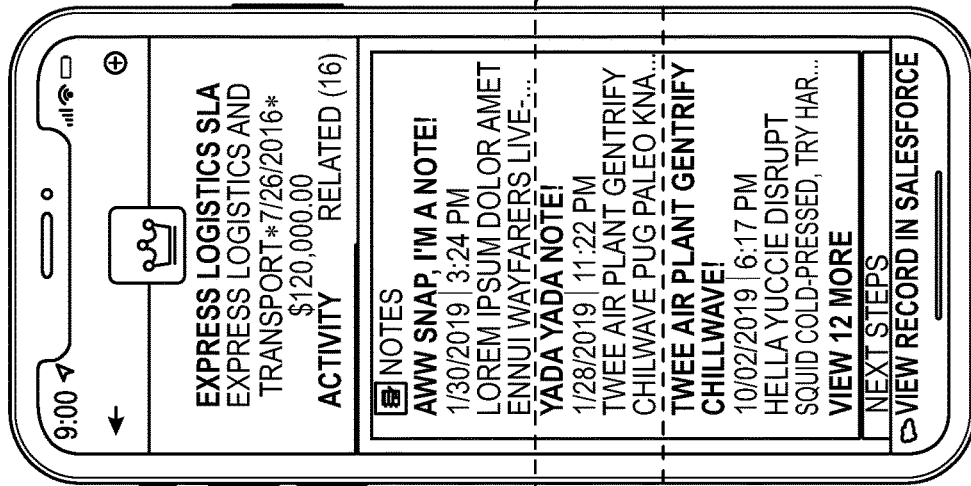
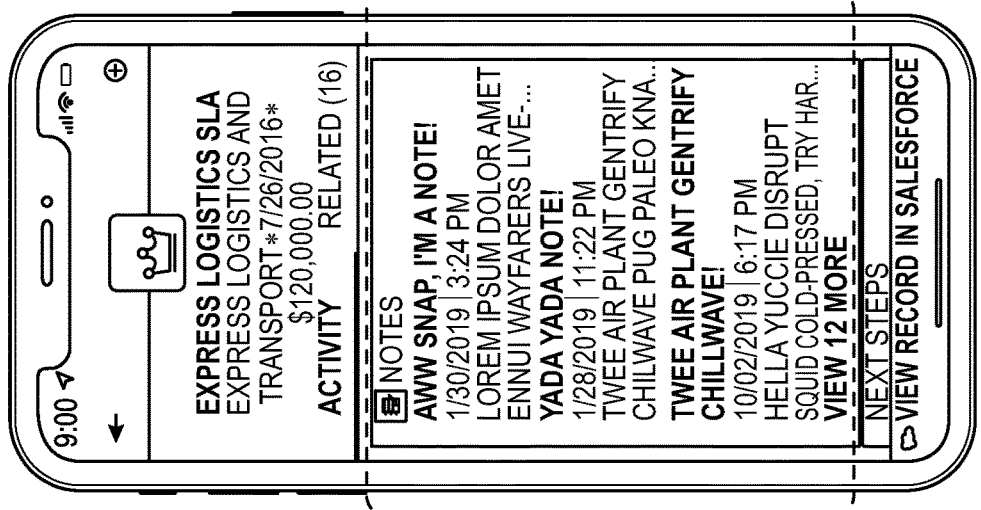
FIG. 23

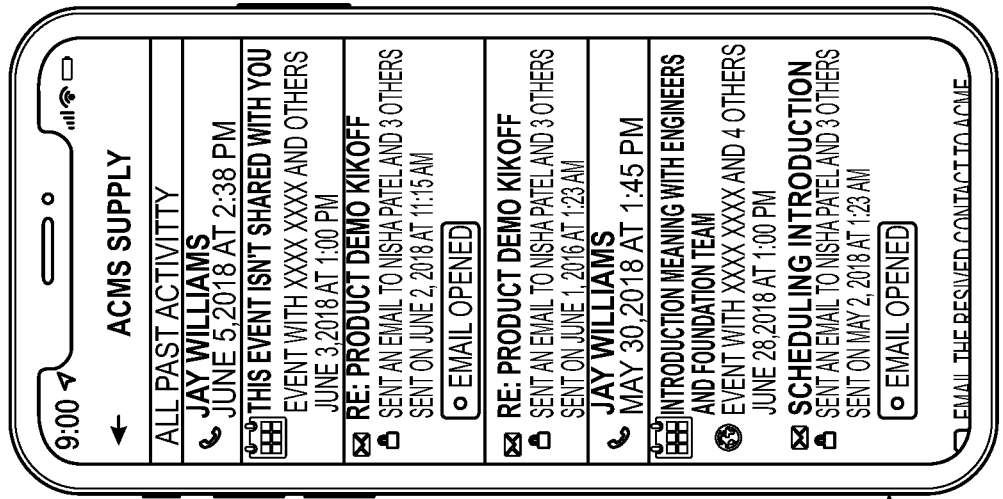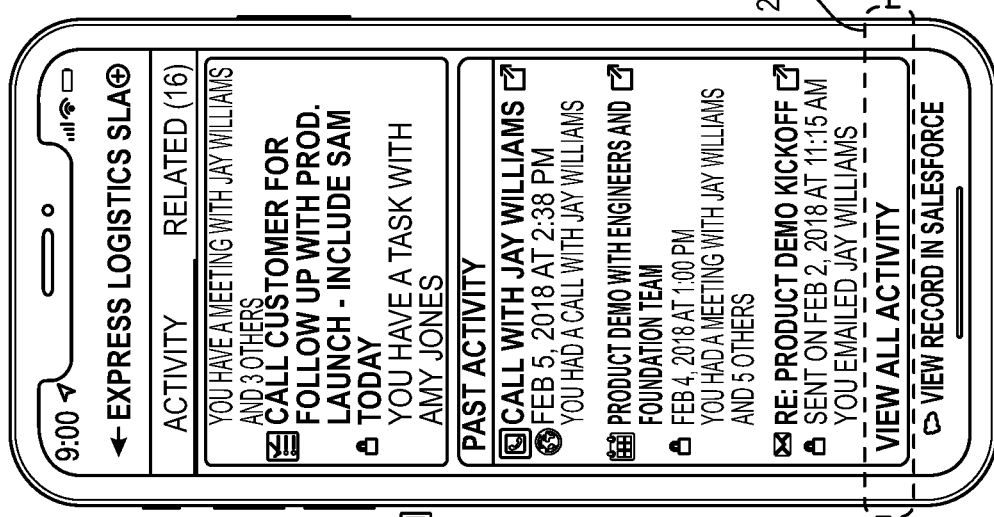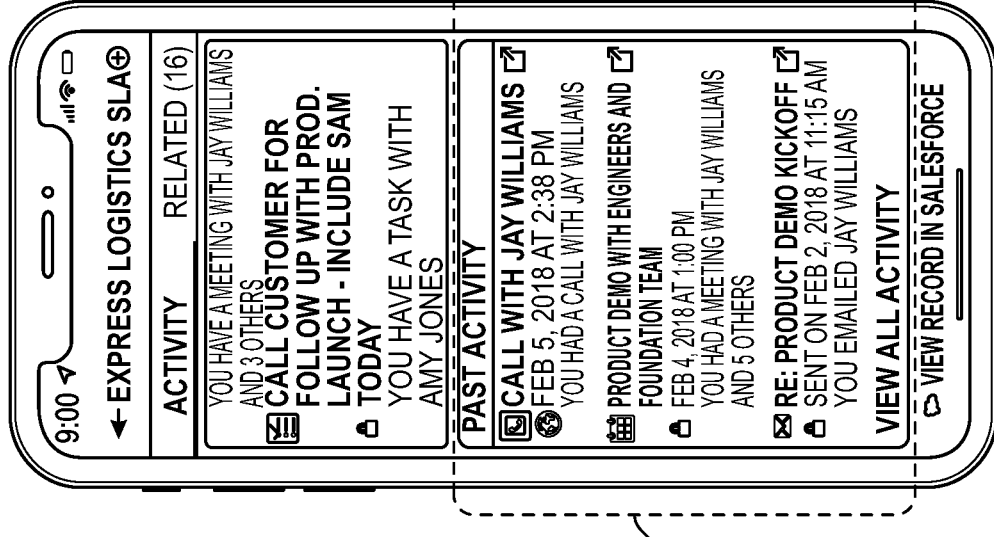
FIG. 24

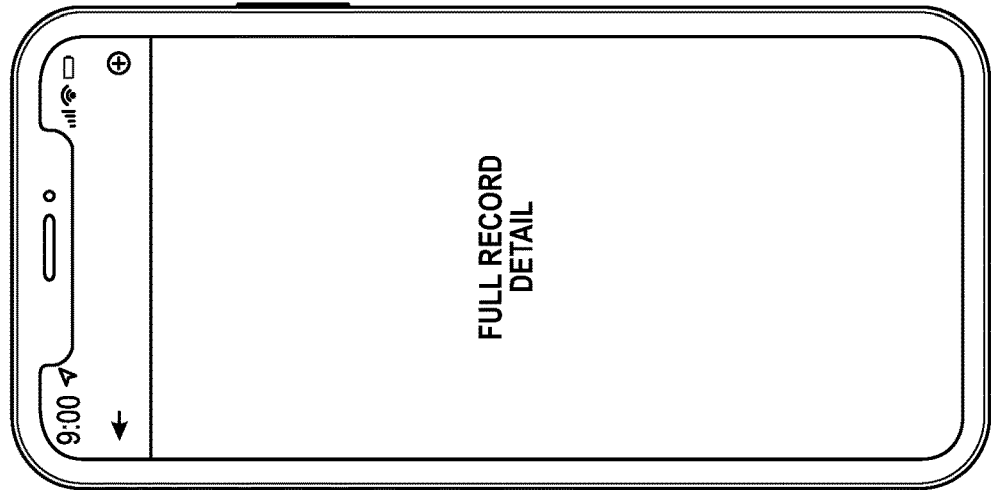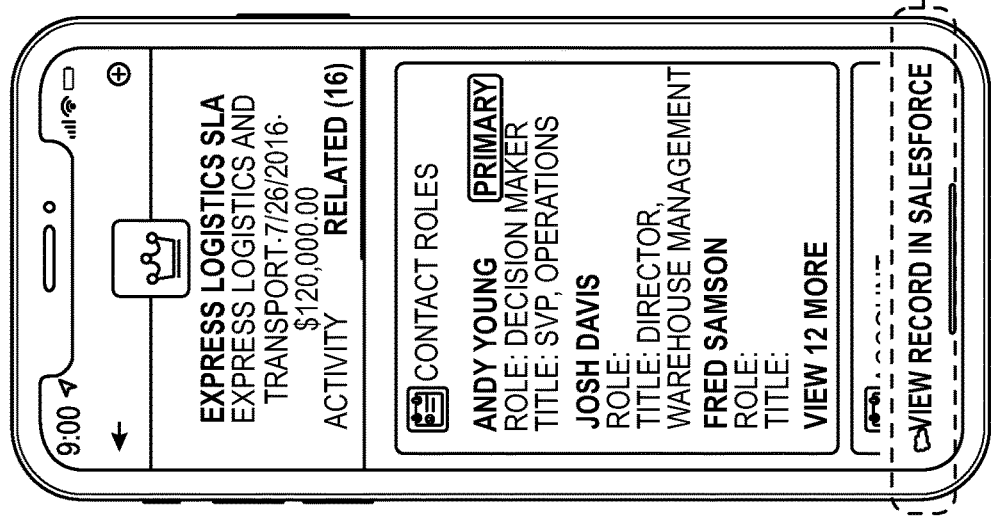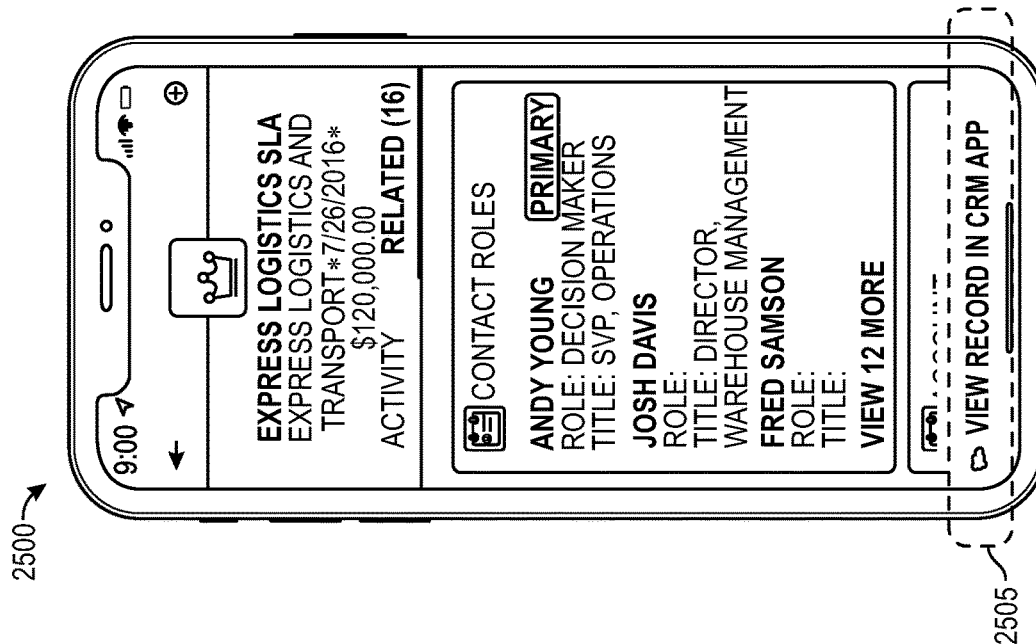
FIG. 25

SYSTEM, METHOD, AND APPARATUS FOR PROVIDING A RECORD OVERVIEW OF AN OPPORTUNITY BASED ON AN EVENT INTEGRATED WITH A THIRD-PARTY PERSONAL INFORMATION MANAGEMENT (PIM) APPLICATION WITHIN A CLOUD BASED COMPUTING ENVIRONMENT

CLAIM OF PRIORITY

This non-provisional application claims priority to U.S. Provisional Patent Application No. 62/736,450, filed Sep. 25, 2018, the entire contents of which are incorporated herein by reference.

COPYRIGHT NOTICE

A portion of the disclosure of this patent document contains material that is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

TECHNICAL FIELD

Embodiments disclosed herein relate generally to the field of computing, and more particularly, to a system, method, and apparatus for providing insights, and taking actions thereon, for contextually relevant user-specific content integrated with a third-party Personal Information Management (PIM) application within a cloud based computing environment, such as a database system implementation supported by a processor and a memory to execute such functionality. Such means may be implemented within the computing architecture of a hosted computing environment, such as an on-demand or cloud-computing environment that uses multi-tenant database technologies, client-server technologies, traditional database technologies, and/or other computing architecture in support of the hosted computing environment.

BACKGROUND

The subject matter discussed in the background section is not to be assumed as prior art merely because it is mentioned in the background section. Similarly, a problem mentioned in the background section or associated with the subject matter of the background section is not assumed to have been previously recognized in the prior art. The subject matter in the background section merely represents different approaches, which, in and of themselves, may also correspond to claimed embodiments.

Modern computing has witnessed the mass migration of data and user applications to the "cloud" where services and relevant applications are hosted and executed remotely by a host organization or a cloud based service provider. Content and data are consumed or viewed locally via a Graphical User Interface (GUI) at a user's local internet connected device, such as a personal computer (PC), smart phone, or tablet computer.

Consider for instance, so-called "Personal Information Management" or "Personal Information Manager" (PIM) tools and applications. PIM tools may include online email and calendaring applications such as Google's "Gmail" or locally executed email and calendaring clients such as Microsoft's "Outlook." Such PIM tools provide application software that functions as a personal organizer and communication tool (e.g., email, chat, video), as well as recording, tracking, and managing certain types of "personal information" such as contacts, appointments, events, reminders, photos, and so forth.

Such PIM tools and applications are not always well suited to an individual's personal needs or an organization's workflows and business considerations. However, because third party service providers host such PIM tools, it is not feasible to modify or customize the PIM tools or applications.

Nevertheless, it is desirable for many users and organizations to modify or supplement the data, content, and information presented with and available via their third party hosted email, calendaring, and communication tools embedded within such PIM applications.

The present state of the art may therefore benefit by integrating contextually relevant user-specific content with a third-party Personal Information Management (PIM) application within a cloud based computing environment.

BRIEF DESCRIPTION OF THE DRAWINGS

Embodiments are illustrated by way of example, and not by way of limitation, and will be more fully understood with reference to the following detailed description when considered in connection with the figures in which:

FIG. 12A depicts further details of two examples of the insights display pane, according to embodiments of the invention.

FIG. 12B depicts details of two additional examples of the insights display pane, according to embodiments of the invention.

FIG. 13A illustrates how a user can scroll to pull up the insight feed to view more insights, according to embodiments of the invention.

FIG. 16 is a table of the display and expiration logic for the insight feed, according to an embodiment.

FIG. 23 depicts an embodiment that provides for displaying any activities for or associated with the record overview.

FIG. 24 depicts one embodiment that displays as an activity a view of past activity from an opportunity overview.

FIG. 25 depicts a user accessing a full opportunity record in the CRM application, according to an embodiment.

DETAILED DESCRIPTION

Figure 1:
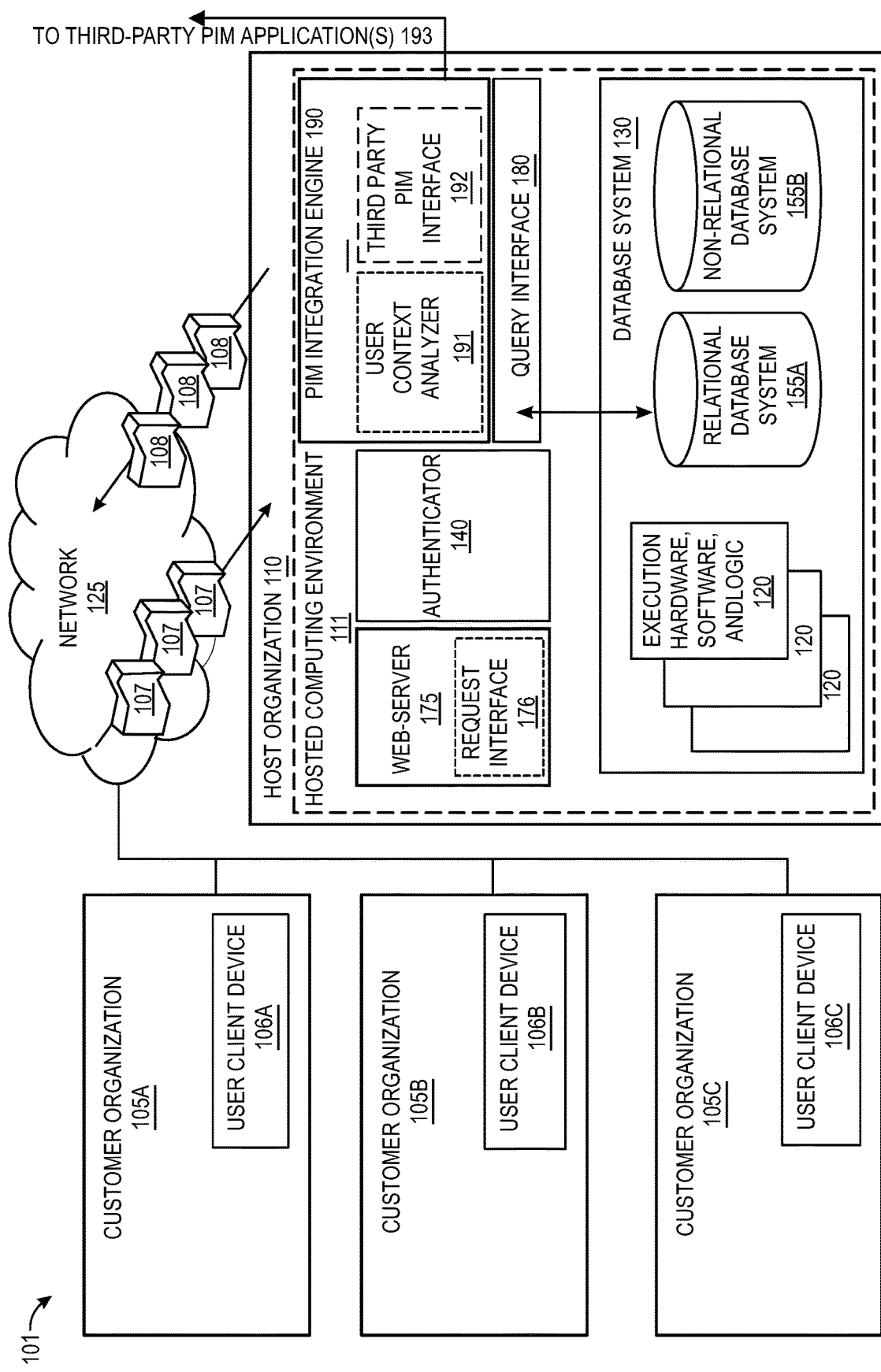
FIG. 1 depicts an exemplary architecture in accordance with described embodiments.

In the following description, numerous specific details are set forth such as examples of specific systems, languages, components, etc., in order to provide a thorough understanding of the various embodiments of the invention. It will be apparent, however, to one skilled in the art that these specific details need not be described to practice the embodiments disclosed herein. In other instances, well-known materials or methods are not described in detail in order to avoid unnecessarily obscuring the disclosed embodiments.

In addition to various hardware components depicted in the figures and described herein, embodiments further include various operations described below. The operations described in accordance with such embodiments may be performed by hardware components or may be embodied in machine-executable instructions that cause a general-purpose or special-purpose processor programmed with the instructions to perform the operations. Alternatively, the operations may be performed by a combination of hardware and software.

Embodiments also relate to an apparatus for performing the operations disclosed herein. This apparatus may be a specially constructed, or general purpose, computer selectively activated or reconfigured by a computer program stored in the computer. The computer program may be stored in a computer readable storage medium, such as, but not limited to, any type of disk including optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

The algorithms and displays presented herein are not inherently related to any particular computer or other apparatus. Various general purpose systems may be used with programs in accordance with the teachings herein, or it may prove convenient to construct more specialized apparatus to perform the required method steps. The required structure for a variety of these systems will appear as set forth in the description below. In addition, embodiments are not described with reference to any particular programming language. It will be appreciated that a variety of programming languages may be used to implement the teachings of the embodiments as described herein.

Embodiments of the invention may be provided as a computer program product, or software, embodied in a machine-readable medium having stored thereon instructions, which when executed program a computer system (or other electronic devices) to perform a process according to the disclosed embodiments. A machine-readable medium includes any mechanism for storing or transmitting information in a form readable by a machine (e.g., a computer). For example, a machine-readable (e.g., computer-readable) medium includes a machine (e.g., a computer) readable storage medium (e.g., read only memory ("ROM"), random access memory ("RAM"), magnetic disk storage media, optical storage media, flash memory devices, etc.), or a machine (e.g., computer) readable transmission medium (electrical, optical, acoustical), etc.

Any of the disclosed embodiments may be used alone or together with one another in combination. Although various embodiments may have been partially motivated by deficiencies with conventional techniques and approaches, some of which are described or alluded to within the specification, the embodiments need not necessarily address or solve any of these deficiencies, but may address only some, or none, of the deficiencies, or be directed toward different deficiencies and problems that are not directly discussed.

FIG. 1 depicts an exemplary architecture 101 in accordance with described embodiments. In one embodiment, a hosted computing environment 111 is communicably interfaced with a plurality of user client devices 106A-C (e.g., such as mobile devices, smart phones, tablets, PCs, etc.) through host organization 110. In one embodiment, a database system 130 includes databases 155A and 155B, for example, to store application code, object data, tables, datasets, and underlying database records with user data on behalf of customer organizations 105A-C (e.g., users of such a database system 130 or tenants of a multi-tenant database type database system or the affiliated users of such a database system). Such databases include various database system types including, for example, a relational database system 155A and a non-relational database system 155B according to certain embodiments.

In certain embodiments, a client-server computing architecture may be utilized to supplement features, functionality, or computing resources for the database system 130 or alternatively, a computing grid, or a pool of work servers, or some combination of hosted computing architectures may be utilized to carry out the computational workload and processing demanded of the host organization 110 in conjunction with the database system 130.

The database system 130 depicted in the embodiment shown includes a plurality of underlying hardware, software, and logic elements 120 that implement database functionality and a code execution environment within the host organization 110.

In accordance with one embodiment, database system 130 utilizes the underlying database system implementations 155A and 155B to service database queries and other data interactions with the database system 130 that communicate with the database system 130 via the query interface. The hardware, software, and logic elements 120 of the database system 130 are separate and distinct from a plurality of customer organizations (105A, 105B, and 105C) which utilize web services and other service offerings as provided by the host organization 110 by communicably interfacing to the host organization 110 via network 125. In such a way, host organization 110 may implement on-demand services, on-demand database services or cloud computing services to subscribing customer organizations 105A-C.

Further depicted is the host organization 110 receiving input and other requests 107 from a plurality of customer organizations 105A-C via network 125 (such as a public Internet). For example, incoming search queries, database queries, API requests, interactions with displayed graphical user interfaces and displays at the user client devices 106A-C, or other inputs may be received from the customer organizations 105A-C to be processed against the database system 130, or such queries may be constructed from the inputs and other requests 107 for execution against the databases 155 or the query interface 180. Results 108 are then returned to an originator or requestor, such as a user of one of a user client device 106A-C at a customer organization 105A-C.

In one embodiment, each customer organization 105A-C is an entity selected from the group consisting of: a separate and distinct remote organization, an organizational group within the host organization 110, a business partner of the host organization 110, or a customer organization 105A-C that subscribes to cloud computing services provided by the host organization 110.

In one embodiment, requests 107 are received at, or submitted to, a web-server 175 within host organization 110. Host organization 110 may receive a variety of requests for processing by the host organization 110 and its database system 130. Incoming requests 107 received at web-server 175 may specify which services from the host organization 110 are to be provided, such as query requests, search request, status requests, database transactions, graphical user interface requests and interactions, processing requests to retrieve, update, or store data on behalf of one of the customer organizations 105A-C, code execution requests, and so forth. Web-server 175 may be responsible for receiving requests 107 from various customer organizations 105A-C via network 125 on behalf of the query interface 180 and for providing a web-based interface or other graphical displays to an end-user user client device 106A-C or machine originating such data requests 107.

The query interface 180 is capable of receiving and executing requested queries against the databases and storage components of the database system 130 so as to return a result set, response, or other requested data in furtherance of the methodologies described. The query interface 180 additionally provides functionality to pass queries from web-server 175 into the database system 130 for execution against the databases 155 for processing search queries, or into the other available data stores of the host organization's computing environment 111. In one embodiment, the query interface 180 implements an Application Programming Interface (API) through which queries may be executed against the databases 155 or the other data stores.

Host organization 110 may implement a request interface 176 via web-server 175 or as a stand-alone interface to receive requests packets or other requests 107 from the user client devices 106A-C. Request interface 176 further supports the return of response packets or other replies and responses 108 in an outgoing direction from host organization 110 to the user client devices 106A-C.

Authenticator 140 operates on behalf of the host organization to verify, authenticate, and otherwise credential users attempting to gain access to the host organization.

Still further depicted within the hosted computing environment 111 is the PIM (Personal Information Management) engine 190 having therein both a User Context Analyzer 191 and also a Third Party PIM interface 192 which is capable of communicating with third party PIM application(s) 193 hosted remotely from the computing architecture of the hosted computing environment 111. For instance, the third party PIM interface 192 may communicate remotely to Outlook email cloud based services provided by Microsoft, or communicate with remotely hosted Microsoft Exchange servers hosted by organizations remote from the host organization 110, or the third party PIM interface 192 may communicate remotely with Gmail services or G-Suite services provided by Google. In other embodiments, the third party PIM interface 192 may be utilized to instead communicate with internally hosted email, calendar, and PIM applications and tools provided by the host organization 110 or may be utilized to communicate with such PIM applications and tools provided by closely integrated partner organizations which operate cooperatively with the host organization 110.

Figure 2A:
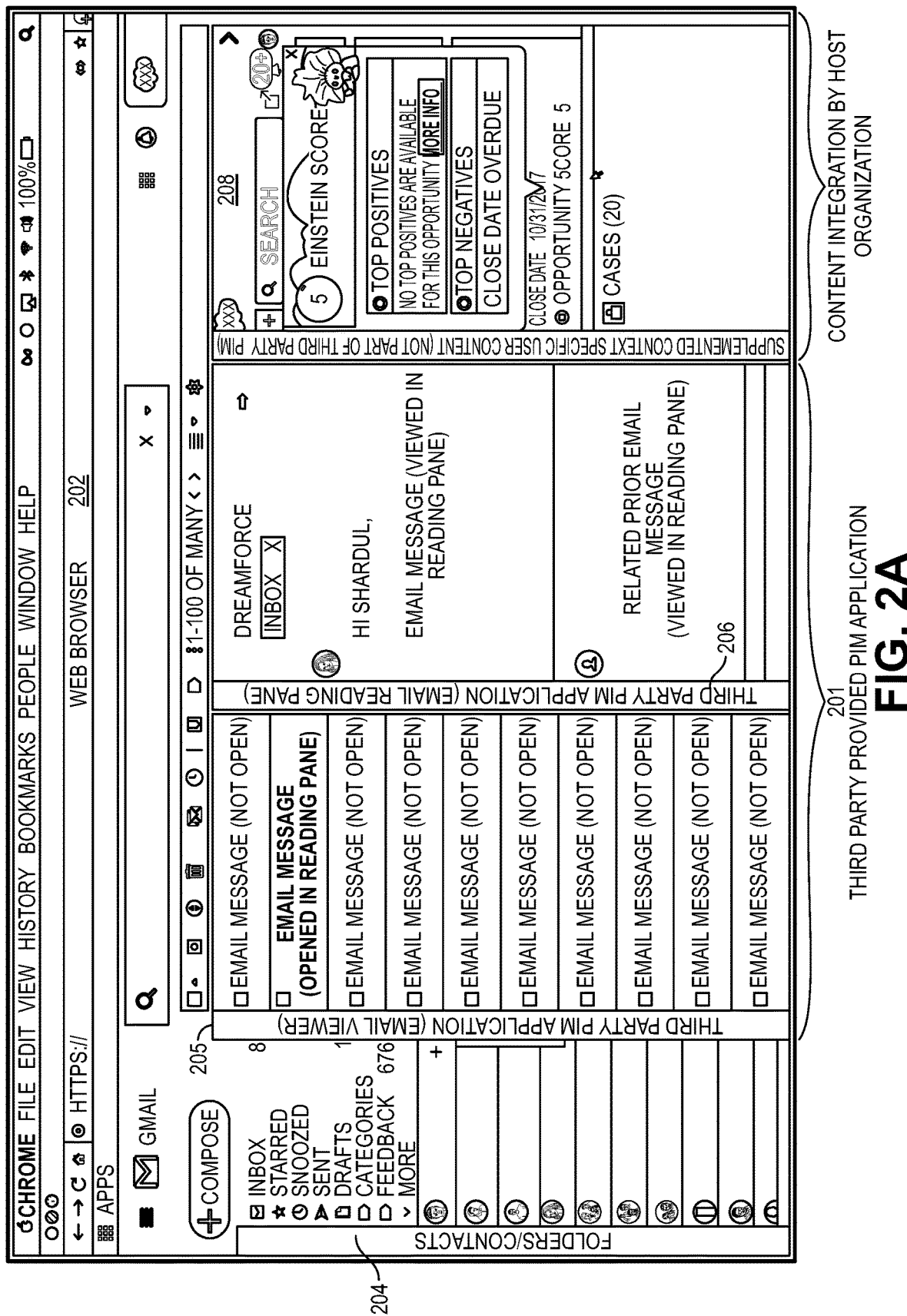
FIG. 2A depicts an exemplary screenshot of an example user interface for a PIM application.

FIG. 2A depicts a screenshot of an example user interface for a PIM application 201. In this example, when a user computer device (e.g., a smartphone) accesses the third party's PIM system using a web browser, app, or other GUI, the PIM application 201 displays a user interface in the form of a web page 200 for display in the web browser 202. In other examples, the PIM application 201 may provide a user interface from an installed application instead of using a browser. The techniques described herein are applicable to a user interface provided by an installed application as well as a user interface provided by a web browser.

Figure 9:
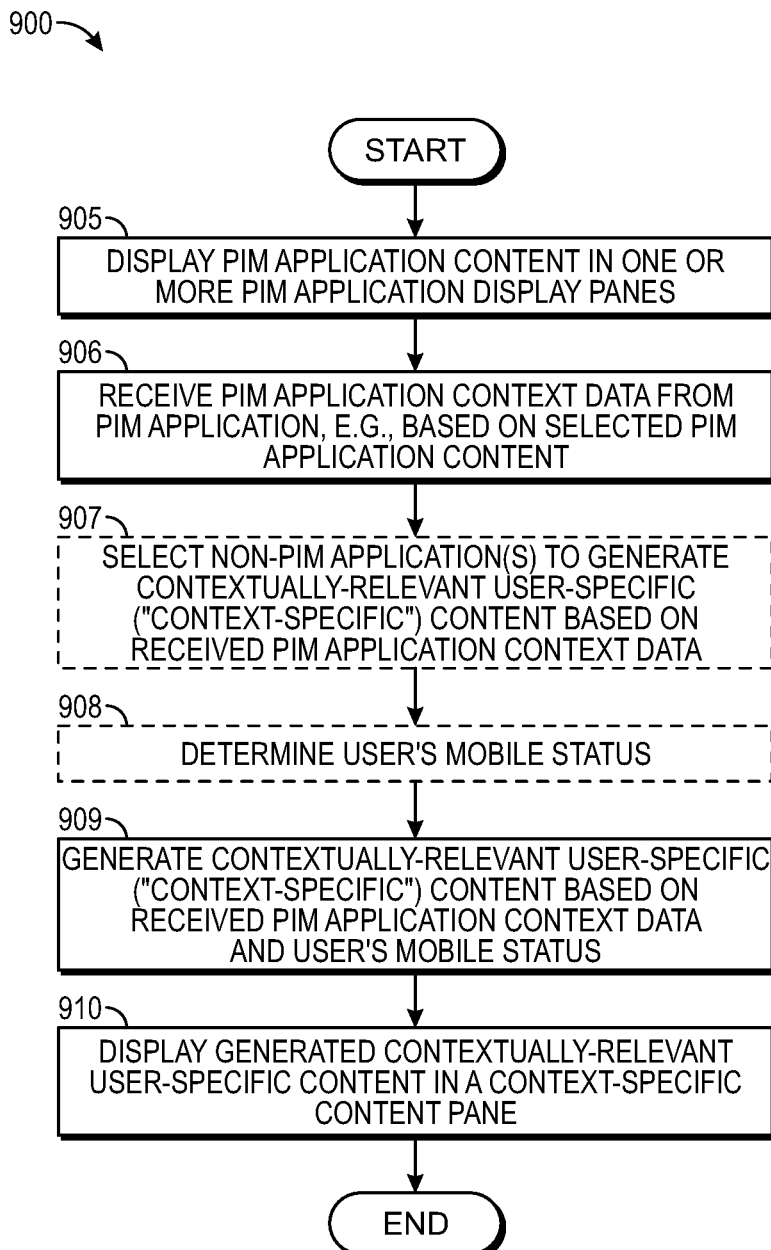
FIG. 9 depicts, that when email messages are displayed by the PIM application, the user interface may display one or more panes containing PIM application-provided content, according to embodiments of the invention.

With further reference to the flow diagram 900 in FIG. 9, when email messages are displayed by the PIM application, the user interface may display one or more panes containing PIM application-provided content at 905, e.g., a first pane 204 containing a listing of the user's email folders and contacts, a second pane 205 containing a list of messages in a selected user email folder, and a third pane 206 containing a view of a selected message within an email reading pane. The display of the multiple, e.g., first, second and third, panes is native PIM application functionality provided by the third party PIM application. As depicted here, the user interface now additionally displays at 910 in a fourth, supplemental, display pane 208 contextually relevant user-specific (i.e., context-specific) content regarding the selected message which is specific to the particular user. The context-specific content is not provided by the third party PIM application even though the context-specific content is displayed in an additional display pane integrated with, or positioned next to, the other display panes provided by the third party PIM application. In this example, the context-specific content includes an "Einstein Score" for a particular opportunity (e.g., a sales opportunity) along with top positives, and top negatives, for that opportunity and related cases.

According to certain embodiments, the PIM integration engine uses or references artificial intelligence applied to the relevant contact to generate context-specific content, e.g., an opportunity score that informs the user as to the statistical likelihood that a sales opportunity is going to close, and such information is then pushed to the supplemental information display pane in the PIM application. Where such orgs use artificial intelligence, they may further display not just the opportunity and opportunity name along with known data such as the sales stage and the close date, but also predicted information which is not known, such as the opportunity score, for example, in a range from 0 to 100.

In other examples, other types of context-specific content for the user may be displayed such as social network feed content involving the PIM message participants, social network feed content involving the PIM message subject, recent communications content involving the PIM message participants, recent communications content involving the PIM message subject, and other types of content. For example, participant content may be displayed including particular information regarding an email participant's name, job title, account name, and company. Account content may be displayed including an account name and billing address regarding an email participant. The opportunities content may include a product name (including quantity or dollar amount), account name, and close date for previous sales regarding an email participant. The cases content includes information regarding the priority of the case.

When the PIM application displays calendar events, the user interface may display, in addition to a calendar, a separate display pane containing context-specific content. This context-specific content may be similar to that displayed with an email message or may be different.

The context-specific content, whether for an email message or for a calendar event, can be provided by a database and database applications operating within a cloud-based system such as a PaaS-, SaaS-, IaaS-, or BaaS-system, or a proprietary computer system, or some other type of computer system. For instance, the host organization 110 may provide or retrieve such information as depicted at FIG. 1. To generate the context-specific content, the database of the host organization receives at step 906 PIM application context data from the third party PIM application and then executes one or more database applications (apps) using the context data as input for the apps to retrieve at step 909 contextually relevant user specific information available from the host organization or other sources not affiliated with the third party service provider hosting the PIM application.

According to certain embodiments, the PIM application context data is retrieved from or based on the selected PIM message or content, such as the email message presently viewed in the reading pane. For instance, PIM application context data from an email message may include the subject, the email participants, and content from the body of the email message. The email participants may include the sender, the primary recipient(s) and the carbon copy (cc) recipients. PIM application context data for a calendar event may include the subject, the body, the participants, the participation response, and the appointment/meeting start and end time.

Subsequent to receipt of the PIM application context data, a database server operating in the database system of the host organization 110 (see FIG. 1) then supplies the PIM application context data to database applications and invoke the database applications to generate context-specific content to display in the context-specific content display pane of the PIM application's user interface. The database server can format the context-specific content in a manner suitable to display in the context-specific content display pane and consequently may format the content into a web page or as HTML content.

In other embodiments, rather than the context-specific content being limited to people content, accounts content, opportunities content, and case content, as in the prior example, the database server may provide a user with a variety of options for customizing the context-specific content. The database server can optionally invoke at 907 an application selection component executing within the database system that allows for the selection of a number of different types of database applications to use in generating the context-specific content.

As depicted here, the applications available for selection to generate context-specific content may include database supplied applications, custom managed applications that are developed by third parties and purchased on an app exchange, or customized customer applications that are developed by a user's organization. The application selection component may provide a user interface that allows for the selection of the application to use in generating context-specific content, for instance, to allow the user to customize the context-specific content through the selection of the applications used to generate the content.

In such a way, embodiments of the invention provide a visual display beyond that provided by native PIM applications. For instance, the visual display supplements the user's preferred email application through an additional GUI or display pane that is embedded in Outlook and Gmail on the e-mail side and on the calendar side. Such functionality is beneficial to the user when they are dealing with emails as such users may operate within a variety of different contexts. For instance, users may be (a) reading emails that they received (b) reviewing emails that they sent previously, or (c) composing emails to send to people, thus resulting in different types of experiences within the same email application.

The PIM integration engine recognizes these different activity contexts and provides configuration capabilities to customize the user experience in a way that is unique and more beneficial to the user for each of these different scenarios.

The PIM integration engine therefore presents a GUI for display to the user device complementing the native application, e.g., Gmail or Outlook, with embodiments of the invention to help users understand the context of an email. Therefore, when the user receives an email from someone in Outlook, a lot of information is known about that person due to, for example, the user's configured CRM access permissions. For instance, the cloud computing service provider's backend includes a wealth of details about the person from a contact profile or from an account they work at as well as the opportunities the user has in progress with those people.

To avoid having users toggle between the two applications, such as between Gmail or Outlook and a cloud computing service provider's application, and then necessitating those users to copy and paste information, the PIM integration engine brings, or integrates, information from the cloud computing service provider's application into the user's PIM application.

In such a way, it is much easier for the user to obtain contextually-relevant user-specific information. Users will readily recognize that the PIM interface engine is providing supplemental information beyond that provided by the native Gmail or Outlook experience, however, the PIM integration engine nevertheless presents the supplemental information to the user in a new side display panel that looks like a familiar cloud computing service provider's application page while also maintaining a PIM application-consistent appearance.

According to described embodiments, each cloud computing service provider's organization can be configured to be specifically tailored to the business implementing that organization. Thus, if the business has a need to track a very specific piece of information, the organization can create a new field if the PIM integration engine does not provide that information by default, and that information is then contextually relevant user-specific information that can be displayed via the supplemental information provided via the PIM integration engine.

Further provided are administration capabilities in the org that allows an admin to configure precisely what shows up on the contact profile. Therefore, the PIM integration engine accesses an org's customizations to find what that particular organization considers relevant based on what the admin has done, in the event the admin has gone beyond what is provided to them by default.

According to certain embodiments, the PIM integration engine reads a layout as defined for a specific org to determine which field(s) to present and which layout to use when displaying the contact details. Therefore, if an org has decided to add a custom field or add additional fields on their contact details page, then the PIM application, e.g., Outlook or Gmail, will reflect the changes as defined by the admin, within the supplemental information display pane.

For instance, the PIM integration engine may reference the org's administrative configuration and display preferences, and contextualize such to customize the display information specifically for that org. For example, everything defined by the admin in the org to which the user belongs will be retrieved, meaning that the admin can tailor the information and the display of that information to the particular needs of that org.

For instance, an admin can decide which application component displays via the PIM application for the user's mobile device when pushed by the PIM integration engine. In one embodiment the application component is a Salesforce lightning component. The Salesforce lightning component is a container of information via which the admin may define which related information about a person is to be displayed when the contact is viewed. For instance, the admin may define that sales opportunities being worked on with that contact are to be displayed or the admin may define that cases opened in the past by that contact are to be displayed. Or the admin may define that cases are not to be displayed because the role of the user is not associated with support, and so while such information may be contextually relevant in terms of data relationships, the information is not relevant or of interest to that particular user or that user's non-support role, and therefore the admin may suppress the lightning component that retrieves all the related cases for that person. Or the admin may define, when a user requests access to further details regarding a particular contact, precisely what fields and what attributes are to be displayed as a result of the request.

For example, when a user is reading an email, likely they are not looking for the same type of help from their cloud-services computing services provider as when they are composing an email. For example, when composing an email, the user might be looking to the cloud-services computing services provider to provide email content as a template provided by or developed by that org's marketing organization, which provides approved or recommended templates for use when communicating with customers. Therefore, the best option in such a situation is to permit the user to select from one of the templates for use in drafting the email. For example, if the user clicks on a contact and replies to that contact via email, then the user will be presented with an email template by the PIM integration manager within the supplemental information display pane. Such functionality is not part of the native email experience, but is presented as a contextually relevant user-specific option based on the user's behavior and use of that particular email application.

Conversely, when the user is reading an email, the functionality to select an email composition template or the like will not be suggested as it is not considered contextually relevant.

In other embodiments, options are presented to enable an email to be tracked, with the option being presented from the email composition mode and available from the supplemental information display pane provided by the PIM integration engine.

Another option presented may be to send an email later rather than sending immediately upon completion.

Similarly, when viewing an electronic calendar, different contextually relevant options will be presented via the PIM application's supplemental information that are helpful to the user for the creation of appointments and which is different from the information displayed when reading emails, reviewing sent emails, or composing emails.

Figure 2B:
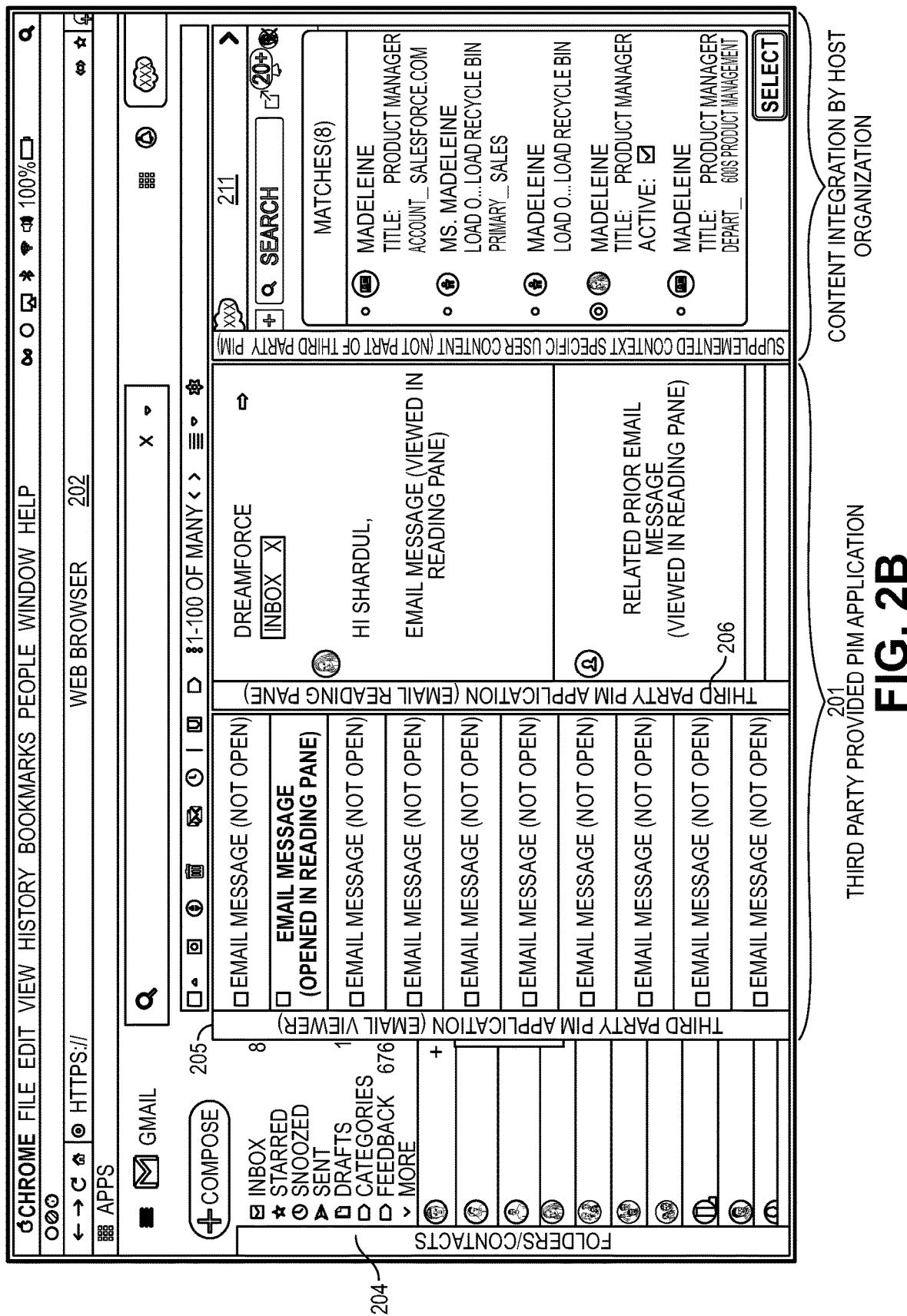
FIG. 2B depicts an alternative exemplary user interface for a PIM application.

FIG. 2B depicts an alternative exemplary user interface for a PIM application 201. For instance, there is alternative contextually relevant data displayed to the user at the right most pane 211, in which the supplemental user specific content includes potential matches found by the host organization 110 and providing the supplemental information to the user's GUI display. More specifically, potential matches for the contact or sender of the email message are displayed in the reading pane. Such additional information may be retrieved from local sources residing at the host organization, such as the database system of the host organization, or retrieved from other sources such as social media feeds or other publicly available resources.

As shown here, there are a number of potentially relevant matches on the right hand side display pane 211 provided by the supplemental and contextually relevant data pushed (i.e., provided) by the PIM integration engine. These potential matches are provided because a contact was included using their email address and the system then retrieved the possible matches from the host organization's available data sources or those third party service provider data sources connected with the host organization, and then presented all of those potential matches as contextually relevant supplemental data. For instance, based on a match to an email address, there are multiple contacts having that email address, and/or a matching title, or possibly a matching title working with that particular account and a same or similar name, or some combination or subset of the above, along with a confidence level by which the potential matches may be ranked.

The user may then select a person and the system will store that selection in memory so that the next time an email is received with that email address, the system will remember the user's choice in matching that email address to the corresponding record. For instance, once the selection is made, the system maintains a mapping for that particular email user to persist or "remember" that the email address and the matching person's record. According to certain embodiments, that mapping is performed using a record ID for the particular matched profile or contact record as selected by the user.

According to another embodiment, the system keeps track of functionality used by the user and in what context, and then associates those usage patterns with the user's profile, including any settings and configurations selected by the user. Then, the next time the same user interacts with that same functionality via the PIM application, the system will remember those previously saved configuration preferences and default the user's settings to those prior usage patterns to avoid the user have to re-configure the functionality for their preferences. The user may then change those defaults and the system will remember that change as a new default for any subsequent usage.

Figure 3:
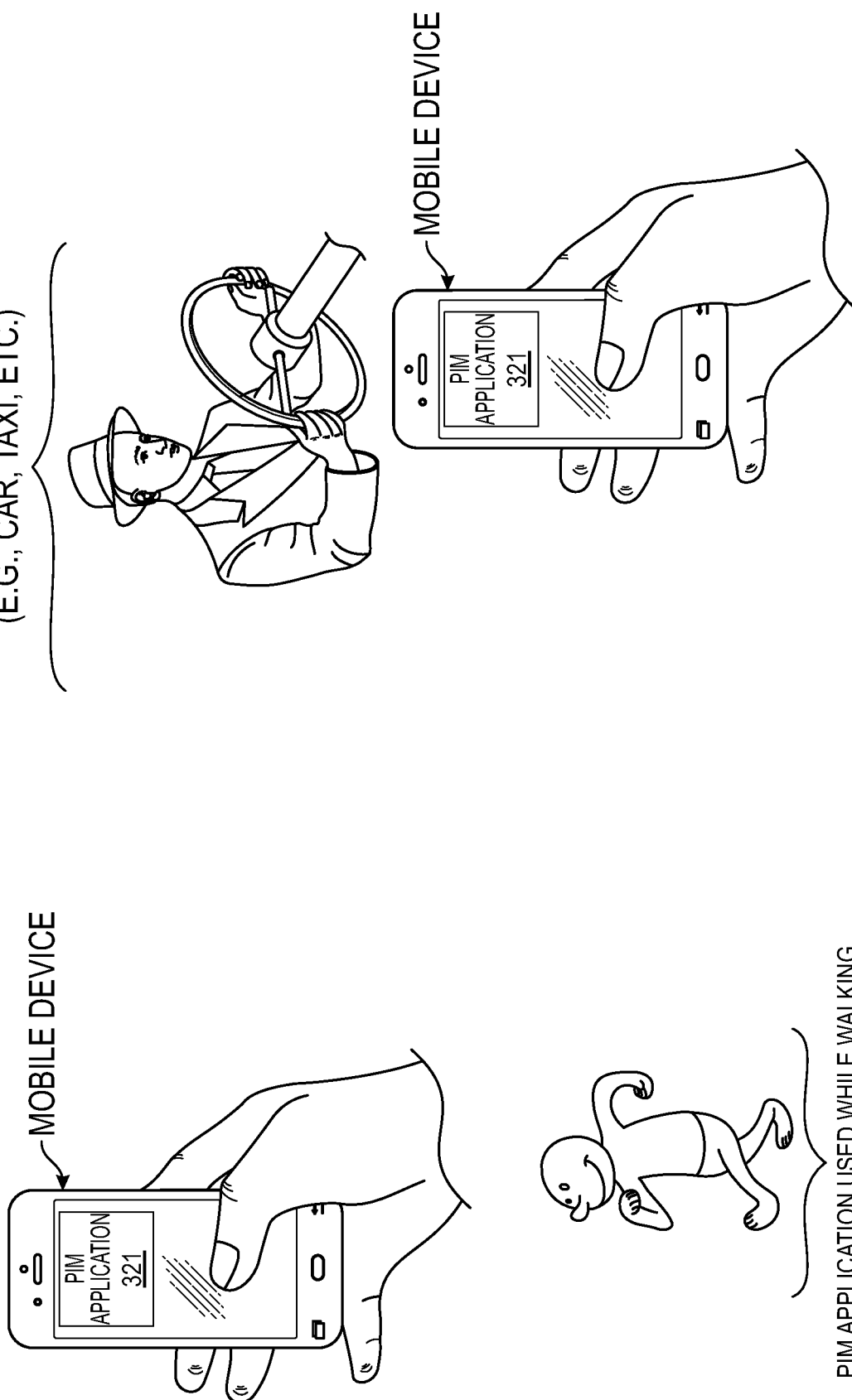
FIG. 3 depicts an alternative implementation of the PIM application while in use by a user that is either walking or traveling in a vehicle.

FIG. 3 depicts an alternative embodiment of the invention, which involves a mobile PIM application in use by a user that is mobile or moving, e.g., either walking or traveling in a vehicle. For example, the mobile PIM application provides the user with an inbox mobile app or application, which may be used by sales professionals and other business people while out in the field, visiting clients and traveling between sites. Therefore, in accordance with the described embodiments, the third party PIM application is supplemented with contextually relevant user specific content that may be helpful to such users when using the PIM application while moving about, for example, out in the field of a sales territory.

Consider, for example, such users are very often in meetings all day, often back-to-back, with prospective customers or existing customers. Therefore, being able to help such business professionals navigate through their day more effectively and efficiently provides a significant improvement to their quality of work life, work efficiency, and potentially their ability to conduct business and make sales. For instance, the PIM application may be supplemented with details helpful to scheduling and coordinating meetings to assist them while going from meeting to meeting throughout the day.

According to a particular embodiment, the PIM application operates to optionally detect the mobile status of the user at 908, that is, whether a user of the PIM application is in a moving vehicle or if they are traveling on foot, that is to say, if they are walking, and/or whether the user is using the PIM application on a mobile computing device such as a tablet computer or smart phone. In such embodiments, this additional context (e.g., walking vs. traveling by way of a vehicle) is then taken into account when displaying the supplemental context display pane to the user. For instance, if the user is on foot, then the PIM application may present within the supplemental information display pane a GUI or a page related to a calendar of events for the user. For instance, the calendar events page may further include a directions link that is created by crawling the events details for that particular user.

For example, if the PIM application detects the user is in a car or a moving vehicle versus walking, then the PIM application's supplemental page will default the navigation directions link to the particular transportation mode. If the PIM application detects the user is on foot and between meetings at the same general geographic location for the entire day, then the PIM application will default the navigation directions link to a walking mode. Similarly, if the user is in a moving vehicle, then the PIM application will detect the transportation mode (e.g., vehicle) as contextually relevant and then default or change the display to be in driving mode for navigation purposes.

According to a certain embodiment, the detection of a transportation mode further detects varying types of vehicle travel, such as detecting travel in an automobile (e.g., such as a taxi, Uber, Lyft, or personal vehicle) versus travel on mass transit, and then provides relevant navigation info by defaulting the directions or destination link to the appropriate transportation mode.

In such a way, the PIM application operates via the supplemental contextually relevant user specific content to help customers of the host organization to navigate through their day.

According to other embodiments, the PIM application is connected to a CRM application via a mapping to contextually return a routing for the user, e.g., a sales rep, throughout the day, as a type of automated itinerary. For instance, using location and travel information, the PIM application is supplemented with information of where and when the user to go and what order and route to take throughout the day. For example, the PIM application is supplemented with context from the CRM application as to the people the user is to meet with that particular day, and then returns a proposed order of customers to meet when and where, and how to navigate to those various destinations.

For instance, the PIM application may determine that the user is presently at customer or client A's location, but is to travel to customer or client B's location across the street. The PIM application will therefore be supplemented with information to automatically route the user to the destination and with a suggestion that the user go to customer B's location for a site visit. In this way, it is no longer necessary for the user to manually switch between a calendar, a mapping application, such as Google Maps or Apple Maps, an email app, and a list of customers, just to determine, on their own, where to go next. Instead, the supplemental content provided to the PIM application includes contextually relevant suggestions specific to that particular user, allowing the user simply to look at their PIM application and choose to follow the automatically proposed next location and navigation.

According to certain embodiments, the context information is derived from crawling one or more of the inbox, calendar, contacts, client opportunities, sales data, CRM data, active or background mobile apps, or social media links associated with the user, pursuant to configuration and permission granted by the user. Similarly, content provided to the user may be derived from such sources.

For example, the context and content may be derived by referencing the CRM data for a sales rep to identify the location of key accounts; and then based on those accounts, the system may gather additional relevant information, such as location for a client, potential value of that account, whether that account is already a client or a customer, or if that account is still in the prospective stage, etc. Based on these contextual details the system will then display a proposal, such as recommending the sales travel to a location nearby to visit the account contact since they are in the same geographic area or in close proximity to the sales rep.

Moreover, the sales rep will be informed via their PIM application and personalized inbox that an account is, for example, marked red or in a critical stage, and therefore, more work/effort may be appropriate to service the account or to win the account, in conjunction with that account being conveniently located geographically, something that is knowable from the sales rep's CRM access.

Furthermore, the supplemental information displayed to the sales rep's PIM account may include an insight, such as a particular opportunity insight or account insight, for example, this company or this account was just acquired by a larger company, and thus, it would be beneficial for the account rep to visit the client contact to prevent atrophy, especially where providing higher client contact time will maintain or improve the client relationship. Such insight information may be acquired from another insight and recommendation engine that monitors news and social media feeds and then maps such information to the sales rep's particular accounts or opportunities based on CRM access for that user. Insight, as used herein, is defined as smart and actionable information provided to a user at the right time, an appropriate time, or within a configurable period of time.

For example, probability scores for a potential client may be returned as an opportunity score for the user's further consideration. Take, for example, a sales account where a probability of closing is only 10% but the site for the account is located very nearby to a location of the user or a location where the user will be according to their proposed route. The PIM application can display a recommendation on how to quickly navigate to the account site and can help to coordinate a meeting by blocking off time on a calendar and listing the relevant contacts, yet provide the opportunity score to the user so that the user can decide whether, or not, to pursue the opportunity. In this example, the sales rep may decline to follow the PIM application's suggestion given that the supplemental data displayed to the user is additionally showing the very poor 10% closing probability, suggesting the meeting may not be worth the sales rep's time and effort.

However, if the user elects to pursue the proposal, then the PIM application will permit the user to accept and automatically schedule a meeting for the client site visit along with providing relevant contact information for that site visit and directions based on travel mode to the site visit, as described above.

According to another embodiment, the PIM application's supplemental data is displayed to either the current device being utilized by the sales rep or user, or alternatively, the PIM application's supplemental data may be configured to display to all available channels configured by the user. For instance, the same recommendation (e.g., to go to a client site visit) may be displayed simultaneously to any or all of the user's PC, tablet, smart watch, smart phone, and in-vehicle internet connected infotainment screen. Such channels are configurable by the user and set according to preference. Alternatively, certain channels may be prioritized and then the information is displayed in serial to various devices until acknowledged.

Figure 4A:
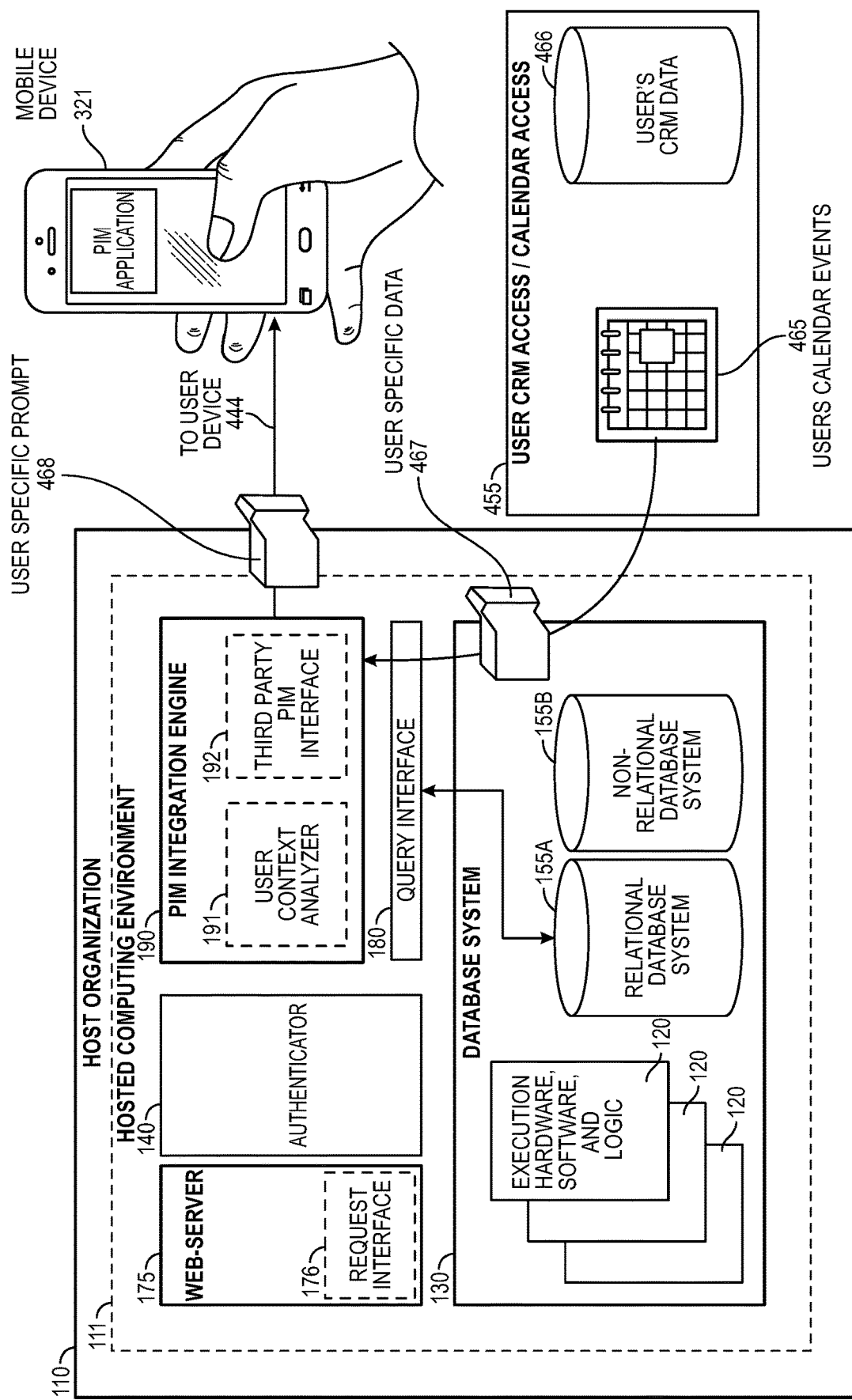
FIG. 4A depicts another alternative embodiment of the supplemental information provided to the user via the PIM application.

FIG. 4A depicts another alternative embodiment of the supplemental information provided to the user via the PIM application. In particular, FIG. 4A depicts a user's mobile device again interacting with the host organization over a public Internet. As illustrated, the PIM integration engine 190 has access to user specific data 467 originating from the user CRM access and calendar access 455, and specifically the user's calendar events 465 and the user's CRM data 466. As shown here, the query interface 180 retrieves the relevant user specific data 467 for PIM integration via the user context analyzer 191 and then pushes a user specific prompt 468 to the user device 444.

For instance, the supplemental information may integrate with the host organization's email insights or may push such insights to the user, or push locally generated insights to the user via the user context analyzer 191.

Consider for example, event insights defined in consideration of missing information that a sales rep would likely require or missing information that a calendar event should ordinarily contain. For example, consider sales rep A created a calendar event for an important meeting with client Bob Smith to propose the sale of a new product. However, the user context analyzer 191 determines that the sales rep has forgotten or neglected to include a meeting location in the calendar event or alternatively, has not yet received any replies on the calendar invite for the meeting, each of which being expected information or an expected result.

In the event of a missing location, within a configurable amount of time, such as 48 hours before the event takes place, the PIM integration engine may determine the insight that there is no location for the meeting, and therefore, a user specific prompt 468 is displayed to the sales rep's user device 444 indicating the insight that there is no meeting location established for the meeting. The sales rep may click on the prompt which will then link and open the calendar event detail, where the sales rep can add the meeting location in response to the insight.

In the event of the sales rep not yet receiving any replies within a configurable amount of time prior to the meeting, a user specific prompt is sent to the user's mobile device 444 notifying the sales rep of the insight that there are no replies, specifically, the meeting invitees have not yet accepted the meeting invite. The sales rep may then click on the prompt or associated link which will link to and open an email or updated meeting invite to re-send or reply to the original meeting invite, at which point the sales rep can quickly add a note and re-send the meeting invite or re-send an email to the meeting invitees to confirm or potentially inquiring if the invitees need to re-schedule the meeting. Upon sending the email or updated meeting invite, the action taken will then clear the insight, that is, the insight is marked as having been attended to.

According to certain embodiments, the PIM integration engine is crawling the calendar events for that user on the backend without the user's involvement, but pursuant to the user's granted permission. A crawling engine may utilize a set of criteria to determine specifically what conditions or events to crawl for on the backend, along with a time trigger for those conditions. For example, 48 hours or 24 hours prior to a configured event insight, some action may occur, such as displaying the insight and a user specific prompt to the user to take the action needed to attend to the insight for that event.

According to another embodiment, the crawling engine in conjunction with the PIM integration engine delivers user specific insights and prompts 468 to the user device 444 based on previously established tasks and events configured by the user upon those tasks becoming time relevant.

Consider, for example, a busy sales rep starting their day and needing to conduct a variety of sales related tasks or other business tasks. The PIM application 321 may be utilized by the PIM integration engine to deliver tasks belonging to that sales rep to the sales rep's user device, based on certain tasks now falling within a configurable time period. For example, there may be a task for the sales rep to call company ACME solutions on Thursday, and the PIM integration engine can display a user specific prompt to the supplemental content display pane of the user's email or other PIM application reminding the sales person to make the call, and also providing the relevant contextual data, such as telephone number, contact, account data, account status, account value, account opportunity to close probability (if the account is not yet secured), and so forth. Such information is derived from a combination of the user's CRM access and calendar or task management access 455.

For example, it is very possible that the sales rep configured the task reminder, but has not yet reviewed tasks. The PIM integration engine can deliver such insights to the user's device to help them quickly review and handle those tasks, in this example, by making the call to the client contact and then clearing the insight.

As the crawling engine crawls the available data sources, such as the user's calendar and task manager, events meeting certain conditions may be captured and then as they become increasingly time-relevant or contextually relevant, the PIM integration engine will initiate an insight for or relevant to the event to provide the user specific prompt to the user device, thus displaying a recommendation or proposal, for instance, to call the client contact, or to take some other action based on the user's predefined task.

Similarly, where the crawling engine identifies tasks or potential insights based on sources other than the user's own calendar and tasks, such as insights derived from Salesforce or Einstein Email Insights, the PIM integration engine can display or push those user specific prompts to the user's electronic mail inbox within the supplemental information display pane. For example, the user may be prompted to call the client contact pursuant to the insights identifying that a company associated with an established CRM account has sold or a CEO has departed the company, and thus, it may be necessary to find and meet with a new person or contact within the company to continue that opportunity.

According to another embodiment, the PIM integration engine consumes information provided by existing Salesforce products such as Einstein Opportunity and Account Insights; runs through machine learning to identify contextual relevancy, and then displays or prompts the user to take action based on those insights.

Embodiments for Providing Insights and Taking Actions Based Thereon

Embodiments of the invention relate to a user viewing content in an application interface, e.g., "today's events" in a calendaring application, and being automatically connected to related content that provides an insight, defined herein as smart and actionable items of information provided to the user at just the right moment, regarding the content being viewed. The related content is pulled, for example, from a CRM application. There are standard or default insights, such as bringing to the user's attention an email from a high profile individual that relates to the content the user is viewing in the application interface.

There is also the ability to configure custom insights for a particular organization (.org), e.g., a user can configure who are their top 10 clients, and then insights are provided based on such. There is also the ability to mix and match a combination of standard and custom insights according to the embodiments. Users may create custom insights. For example, a user may configure a custom insight to display or push a user specific prompt to the user's mobile device any time one of that user's top 10 accounts is mentioned in an email, thus triggering an instant notification so that the user is made aware of that event instantly. According to such an embodiment, the system on the back end is crawling the various data sources including email, calendar, tasks, and CRM access for that user, to manage the required contextual analysis intelligently on the backend on behalf of the user. In certain embodiments, the crawling for events and data is extended to any calendar appointment, task, email, or CRM account for which the user is a recipient, participant, or holds sufficient permissions to access such data.

By providing insights to a user viewing content in an application interface, a user is then able to take quick actions based on such insights. The PIM mobile app surfaces (displays) content, e.g., today's events, in one portion of a mobile device screen, and insights regarding the content in another portion of the screen. The user can select an insight and then another screen is displayed at which the user can select or take one or more "quick actions" associated with those events, wherein a quick action is defined herein as an action that is highly contextually relevant to the insight that is being provided. In short, a user may select an insight and then take an associated quick action based on that insight. For example, the content being viewed might be information about an upcoming meeting. The insight might suggest there is information about the meeting that is missing, such as location, conference link or meeting description. The user can take action by updating the missing information for the upcoming meeting. In another embodiment, quick actions can be taken based directly on an Email, Event, Task, or Opportunity, and not based on insights provided for such.

Figure 10:
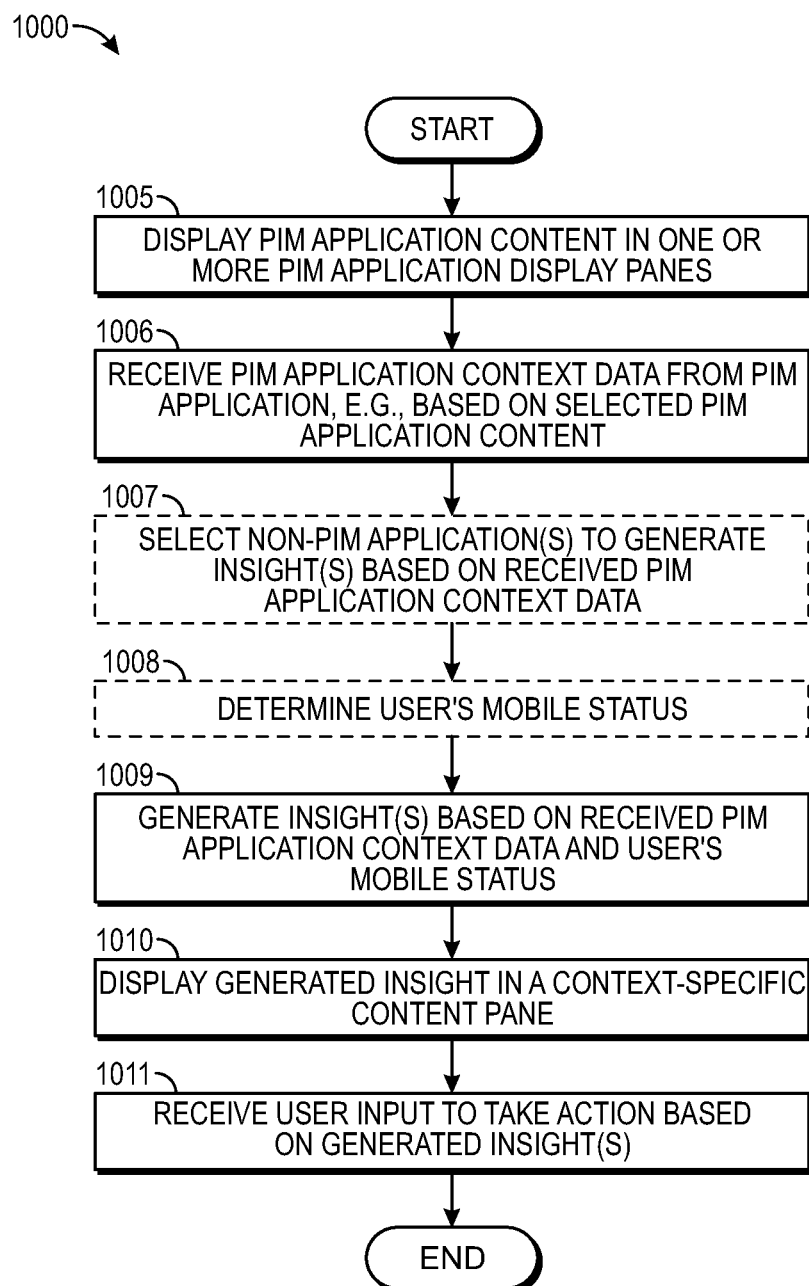
FIG. 10 is a flow diagram of embodiments for providing insights based on an email, event, task or opportunity and taking a quick action based on such insights.

Embodiments for providing insights based on an email, event, task or opportunity and taking a quick action based on such insights are further described below with reference to the flow diagram 1000 in FIG. 10. In one embodiment 1000, PIM application content such as email messages is displayed by the PIM application. The user interface may display one or more panes containing PIM application-provided content at 1005, e.g., a first pane containing a listing of the user's email folders and contacts, a second pane containing a list of messages in a selected user email folder, and a third pane containing a view of a selected message within an email reading pane. The display of the multiple panes is provided by the third party PIM application. The user interface may additionally display at 1010 in a fourth, supplemental, display pane contextually relevant user-specific (i.e., context-specific) content, in particular, one or more insights, regarding the selected message which is specific to the particular user. The insight may or may not be provided by the third party PIM application. In any case, the insight is displayed in an additional display pane integrated with, or positioned next to, the other display panes provided by the third party PIM application.

When the PIM application displays calendar events, the user interface may display, in addition to a calendar, a separate display pane containing insights. This context-specific content may be similar to that displayed with an email message or may be different.

The insights, whether for an email message or for a calendar event, can be provided by a database and database applications operating within a cloud-based system such as a PaaS-, SaaS-, IaaS-, or BaaS-system, or a proprietary computer system, or some other type of computer system. For instance, the host organization 110 may provide or retrieve such information as depicted at FIG. 1. To generate the insights, the database of the host organization receives at step 1006 PIM application context data from the third party PIM application and then executes one or more database applications (apps) using the context data as input for the apps to retrieve at step 1009 contextually relevant user specific insights available from the host organization or other sources not affiliated with the third party service provider hosting the PIM application. Once the user interface displays at 1010 in the supplemental display pane one or more insights, user input may be received at 1011 in response to one or more insights.

In other embodiments, the database server may provide a user with a variety of options for customizing the insights. The database server can optionally invoke at 1007 an application selection component executing within the database system that allows for the selection of a number of different types of database applications to use in generating the insights.

According to a particular embodiment, the PIM application operates to optionally detect the mobile status of the user at 1008. In such embodiments, this additional context (e.g., walking vs. traveling by way of a vehicle) is then taken into account when displaying the insights display pane to the user. For instance, if the user is on foot, then the PIM application may present within the supplemental information display pane a GUI or a page related to a calendar of events for the user. For instance, the calendar events page may further include a directions link that is created by crawling the events details for that particular user.

Figure 11:
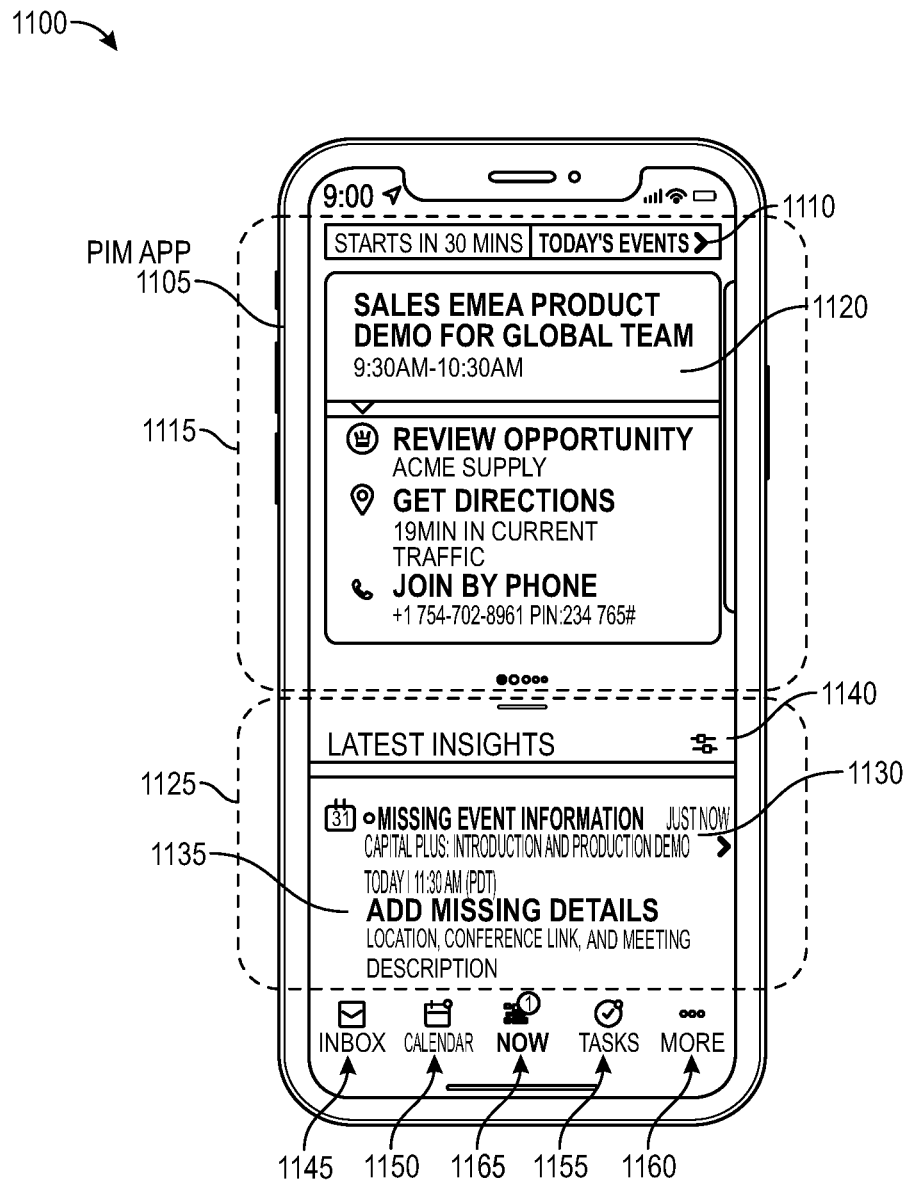
FIG. 11 depicts a graphical user interface displayed on a mobile device for a PIM application in an events-based application, according to one embodiment of the invention for providing insights and for taking quick actions based on the insights.

FIG. 11 depicts a graphical user interface 1100 displayed on a mobile device for a PIM application 1105, in this example, an events-based application, according to one embodiment of the invention for providing insights and for taking quick actions based on the insights. PIM application 1105 includes a first display pane 1110 that indicates today's events are selected. A carousel of cards for upcoming events is provided in display pane 1115, and an overview 1120 for a selected one of the events in the carousel of cards is displayed in display pane 1115. The overview depicted is for a Sales EMEA product demo scheduled for 9:30-10:30 that day. It is appreciated that a user can see the next event that is on their calendar for the current (or selected) day, where they are the organizer or attendee. The user, in one embodiment, can swipe through upcoming event cards to see all the events in which they are to participate for that day.

In addition to the display pane 1115 providing a view of upcoming events, PIM application 1105 further provides a separate display pane 1125 that offers a feed, or view, of a plurality of insights relating to the upcoming events. According to one embodiment, the plurality of insights are chronologically sorted. In another embodiment, insights might be prioritized according to a level of importance or the like. FIG. 11 depicts an insight 1130 that event information is missing for an introduction and product demo meeting scheduled for 11:30 AM that day. This insight is not related to the current overview 1120 for the selected event displayed in pane 1115. However, it is appreciated that the user could scroll through the carousel of cards 1115 to locate the overview for the Capital Plus introduction and product demo event, or search through the sorted feed of insights appearing in display pane 1125 to find any insights related to the current overview 1120 for the selected event displayed in display pane 1115.

Recall from above that an insight, as that term is used herein, is defined as smart and actionable information provided to a user at the right time, an appropriate time, or within a configurable period of time. In this example, the insight is displayed at 9:00 AM that details are missing regarding the meeting scheduled for 11:30 AM that same day, two and one-half hours before the scheduled meeting, and the user is offered an opportunity to take quick action at 1135 by selecting the link to add the missing details. According to one embodiment, the list of insights may include only those insights for events occurring that same day, or for events occurring within some configurable period of time, such as 24 hours, 28 hours, 1 week, etc.

While FIG. 11 depicts a graphical user interface 1100 displayed on a mobile device for an events-based PIM application 1105, in other instances, the GUI displayed may be for an email app, a calendar app, a tasks app, or some other app, each of which can be selected and executed by the user tapping on respective icons 1145, 1150, 1155, and 1160. Likewise, PIM application 1105 provides the separate display pane 1125 that offers the view of the plurality of insights when a user selects icon 1140 relating to the upcoming events. Alternatively, the insights feed in display pane 1125 may be displayed by default when a user opens up and uses any PIM based application in display pane 1115.

FIG. 12A depicts further details of two examples of the insights display pane 1125, according to embodiments of the invention 1200A. The insights, e.g., missing event information 1205B which relates to a calendar event and overdue task 1205B which relates to a task event, are intelligent and actionable pieces of information displayed to users at just the right moment. These insights provide extra context to inform decisions and save time. Insights relate to primary content, which can be an event as depicted at 1220A, a task as depicted at 1220B, an email, an account, an opportunity, etc. As can be seen in FIG. 12A, each insight has an associated insight type, such as calendar insight type 1201A or task insight type 1201B. An insight subtype is further provided, such as a "missing event information" calendar insight subtype 1210A, and a "overdue task" event insight subtype 1210B. Further, each insight includes a timestamp 1215A, 1215B that indicates the time that the insight was "pushed", that is, displayed in the insight display pane 1125. The time the insight is pushed to the insight pane is configurable according to the insight type, context, and a time period before, surrounding, or otherwise related to, the primary content. Each insight allows the user to take quick actions based on the insight, such as add missing details at 1225A regarding the location, conference link, and meeting description for a product demo event identified at 1220A, or to mark as complete at 1225B an overdue task from yesterday identified at 1220B.

FIG. 12B likewise depicts details of two additional examples of the insights display pane 1125, according to embodiments of the invention 1200B. The insights, e.g., email insight 1201C, which relates to an email, and an account insight 1201D, which relates to an account record, are intelligent and actionable pieces of information displayed to users at just the right moment. These insights provide extra context to inform decisions and save time. Insights relate to primary content, which can be a scheduling intent as depicted at 1220C, or a contact is leaving, as depicted at 1220D. As can be seen in FIG. 12B, each insight has an associated insight type, such as email insight type 1205C or an account insight type 1205D. An insight subtype is further provided, such as a "scheduling intent" email insight subtype 1210C, and a "contact left" event insight subtype 1210D. Further, each insight includes a timestamp 1215C, 1215D that indicates the time (e.g., "now") that the insight was pushed to insight display pane 1125. Each insight allows the user to take quick actions based on the insight, such as replying to a meeting request, or viewing a calendar for an available time at which to meet, as depicted at 1225C, in response to the primary content of an email from a contact that wants to schedule a meeting as identified at 1220C, or to send an email or update contact information as depicted at 1225D, in response to the primary content of contact that has left or is leaving a company as identified at 1220D.

With reference to FIGS. 11 and 13A, according to embodiment 1300A, PIM application 1105 further provides for the user to swipe up on the display pane 1125 that offers a feed, or view, of a plurality of insights relating to upcoming primary content, such as events, so that the pane that displays the feed of insights takes up the entire or full view—all other panes are no longer in view. According to one embodiment, the plurality of insights are chronologically sorted. A user can scroll to pull up the insight feed to view more insights. In the example illustrated in FIG. 13A, a calendar insight of "Meeting Wrap-up" 1305 relating to primary content regarding a Sales EMEA Product Demo is followed by an event insight of "Missing Event Information" 1310 relating to primary content regarding an introduction and product demo at a company called Capital Plus, which, in turn, is followed by a task insight of "Overdue Task" 1315 relating to primary content regarding a call to a company called Sparks Capital to discuss setup. Each of these insights includes one or more links on which the user can click to select a quick action to take, such as adding a follow-up event, a follow-up task, a note, regarding the calendar insight, add missing details regarding the event insight, or mark a task as complete regarding the task insight. According to an embodiment, an insight is cleared when the insight is read or when one of the actions was selected for an insight.

Figure 13B:
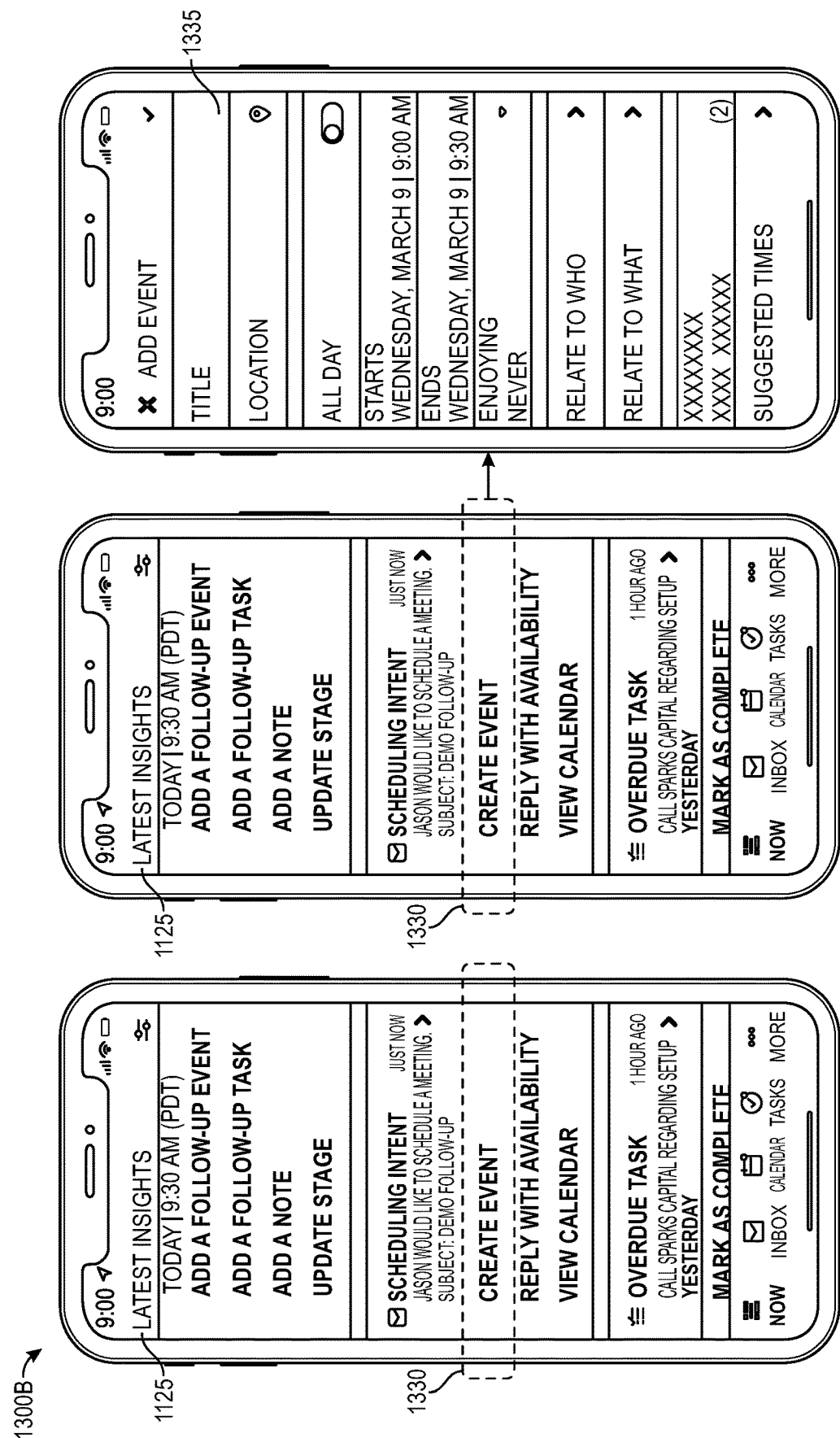
FIG. 13B according to an embodiment, provides for a user to enlarge a display pane to view the plurality of insights relating to upcoming primary content, such as events.

With reference to FIG. 13B, according to embodiment 1300B, PIM application 1105 provides for the user to enlarge display pane 1125 to view the plurality of insights relating to upcoming primary content, such as events. Therein, a user can access a relevant sub-flow for each insight via quick actions. For example, a user, as depicted at 1330, can select, for example, by tapping on the "create event" link for, the "scheduling intent" email insight depicted here and in FIG. 12B, and be taken to a subsequent sub-flow 1335, e.g., an "add event" sub-flow, wherein the user can enter information regarding scheduling a meeting in response to the insight, including adding such details as a title, location, date, time, attendees, etc.

Figure 14:
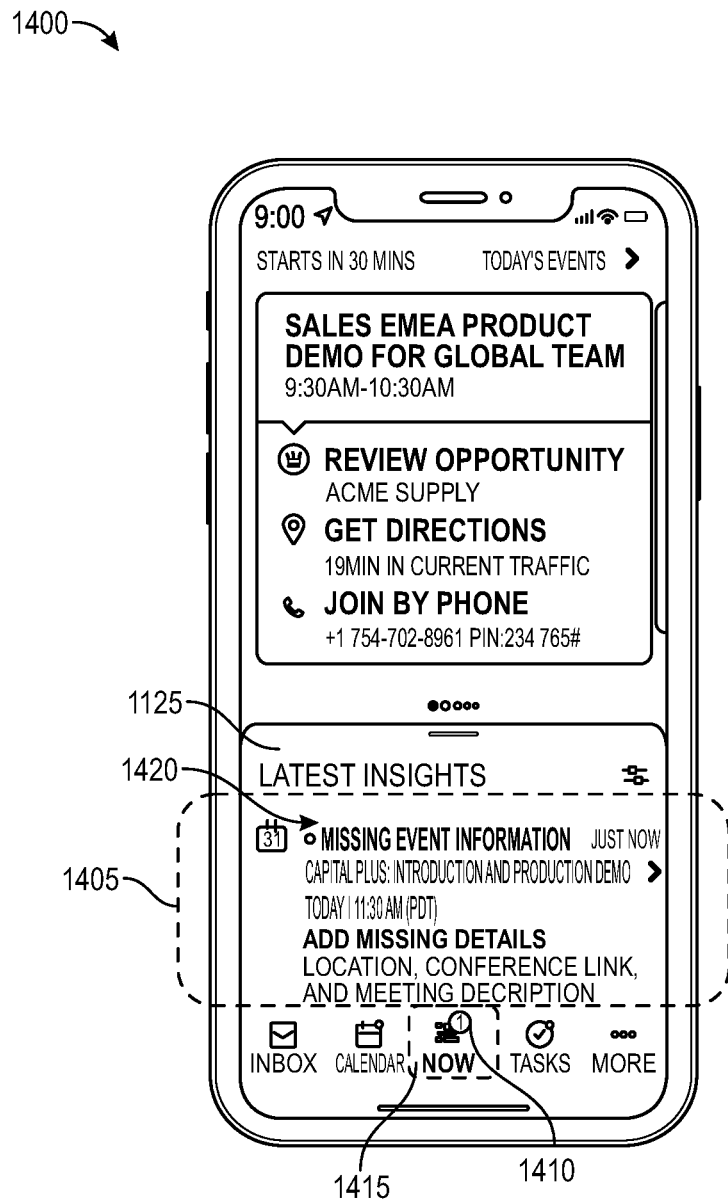
FIG. 14 depicts a new insight being pushed to the insights pane since the last time the user checked the insights feed in the insights pane, according to an embodiment.

FIG. 14 depicts a new insight 1405 being pushed to the insights pane 1125 since the last time the user checked the insights feed in the insights pane 1125. When a new insight is available, a visual indicator, such as badge 1410, may be displayed on the "Now" navigation icon 1415 with a count (of one in this instance) of the new insights, according to embodiment 1400. According to one embodiment, new insights also have a visual signal 1420 on the insight item in the feed to indicate that they are new.

Figure 15:
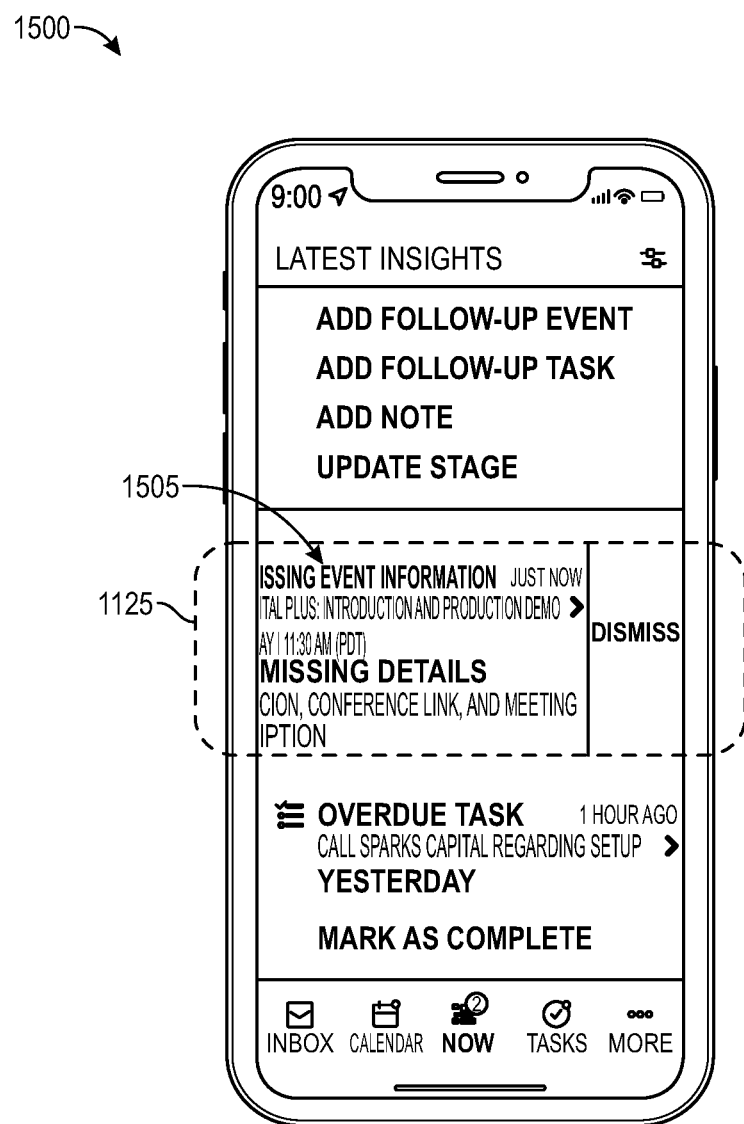
FIG. 15 depicts an embodiment in which an insight in an insights pane is dismissed from the insights feed, for example, by swiping on the insight, according to swipe behavior and actions in the Inbox.

FIG. 15 depicts an embodiment 1500 in which an insight 1505 in insights pane 1125 is dismissed from the insights feed, for example, by swiping on the insight, according to swipe behavior and actions in the Inbox.

FIG. 16 is a table of the display and expiration logic for the insight feed, according to an embodiment 1600. Insights, and in particular, insight categories 1605, have a specific insight type 1610, display rule 1615 and expiration logic 1620, which can be user configurable or according to a default logic setting.

Embodiments for Filtering Provided Insights

Embodiments of the invention relate to providing a user with the ability to customize what insights a user sees based on, for example, categories of insights such as calendar, email, task, account, or opportunity, insights.

Figure 5:
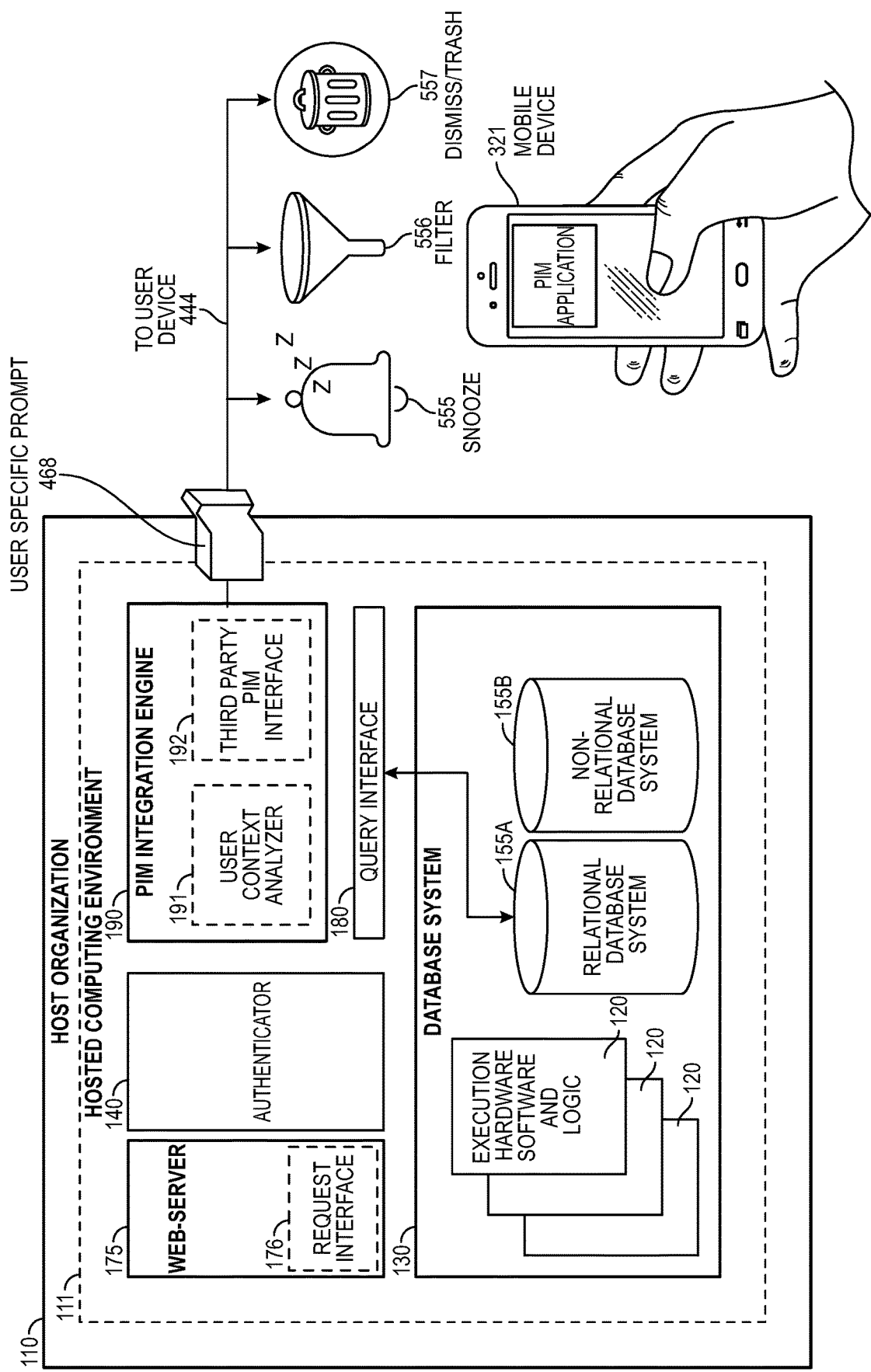
FIG. 5 depicts yet another alternative embodiment of the supplemental information provided to the user via the PIM application.

FIG. 5 depicts an embodiment of the supplemental information provided to the user via the PIM application. As depicted, there are again user specific prompts being displayed or pushed to the user device via the PIM application executing at the user device, and very specifically, via a supplemental information display pane or a supplemental display provided at the user's PIM application 321 executing at the user device. However, it is possible that the user receives insights at the PIM application that need to be handled in a way different than taking action and clearing or otherwise retiring or resolving them.

It is therefore in accordance with described embodiments that a filter 556 mechanism is provided to permit the user to configure the available insights to be displayed to only those particular ones in which the user is interested. In such a way, insights may still be generated and pushed to the user, but would be filtered 556 and therefore not be displayed if restricted by filtering conditions, or they may be displayed if permitted by filtering conditions. Similarly, those displayed insights would remain displayed to the user upon a change in filtering conditions that continues to permit them to be displayed.

In such a way, the user can filter the available insights to get only the insights they want to work with. For instance, the user could filter not only on a broader category level, but also apply very specific filters, such as filtering for available insights for the current day only, for insights related to current location or intended route of the user, for available tasks that can be resolved in a 5 minute break, or for tasks which require immediate attention or have a high priority. Again, filtering does not remove, clear, or dismiss the insights, but rather, changes the insights that are displayed for view and helps the user to focus on a specific set of sub-criteria as they deem appropriate at that time. For example, a user may focus only on out-of-office insights to inform the schedule for the day or to focus on those tasks requiring a particular quick action or type of quick to clear the insight, e.g., a follow up, etc.

In an alternative embodiment, filters are created through predictive models or machine learning intelligence based on contextual relevance for that user, with the automatically created filters then being made available to the user for selection rather than requiring the user to create and apply such filters. One such filter for a sales rep may be an email insight for any email where a certain party, contact, or type of contact, such as an executive, e.g., a CEO, is involved. Another example may be to filter for any event coming up that exceeds a threshold, such as a sales account having a predictive close score of 90%. Another filter may be for tasks based on a contact's status, such as when a contact is going to be out of office and therefore the task should be handled prior to departure for that contact person.

According to other embodiments, available filters are defaulted on the user's behalf and set as the available view based on the user's context, such as the user's location, activity, schedule, mode of transport, intended route, and so forth, to assist the user with identifying and displaying the most important and/or urgent insights at that time.

It is also contemplated that a user receives at the user device 444 a user specific prompt which is of interest, but which the user is not prepared to handle or dispatch with at that particular time, and therefore, a snooze mechanism 555 is further provided thus permitting the user to put the prompt to sleep for a configurable amount of time, such as 5 minutes, 1 hour, a day, etc. In such an event, the prompt is re-displayed to the user via the PIM application at the user's device or other network connected channels (e.g., PC, auto, smart watch, tablet, etc.) upon the expiration of the sleep timer.

There is further provided the ability to permanently dismiss or trash 557 a prompt displayed to the user. According to such an embodiment, the dismissal is distinct from clearing an action insomuch that the user is indicating a preference back to the PIM integration engine that the user does not wish to receive that type of prompt. Consequently, the user context analyzer 191 will be updated with the user's feedback and preferences and not only cease to push that particular prompt, but also de-prioritize or reduce the weight and likelihood of similar prompts being pushed to the user, thus permitting the PIM integration engine to adapt over time to the user's particular preferences on a more intuitive and streamlined basis.

Figure 17:
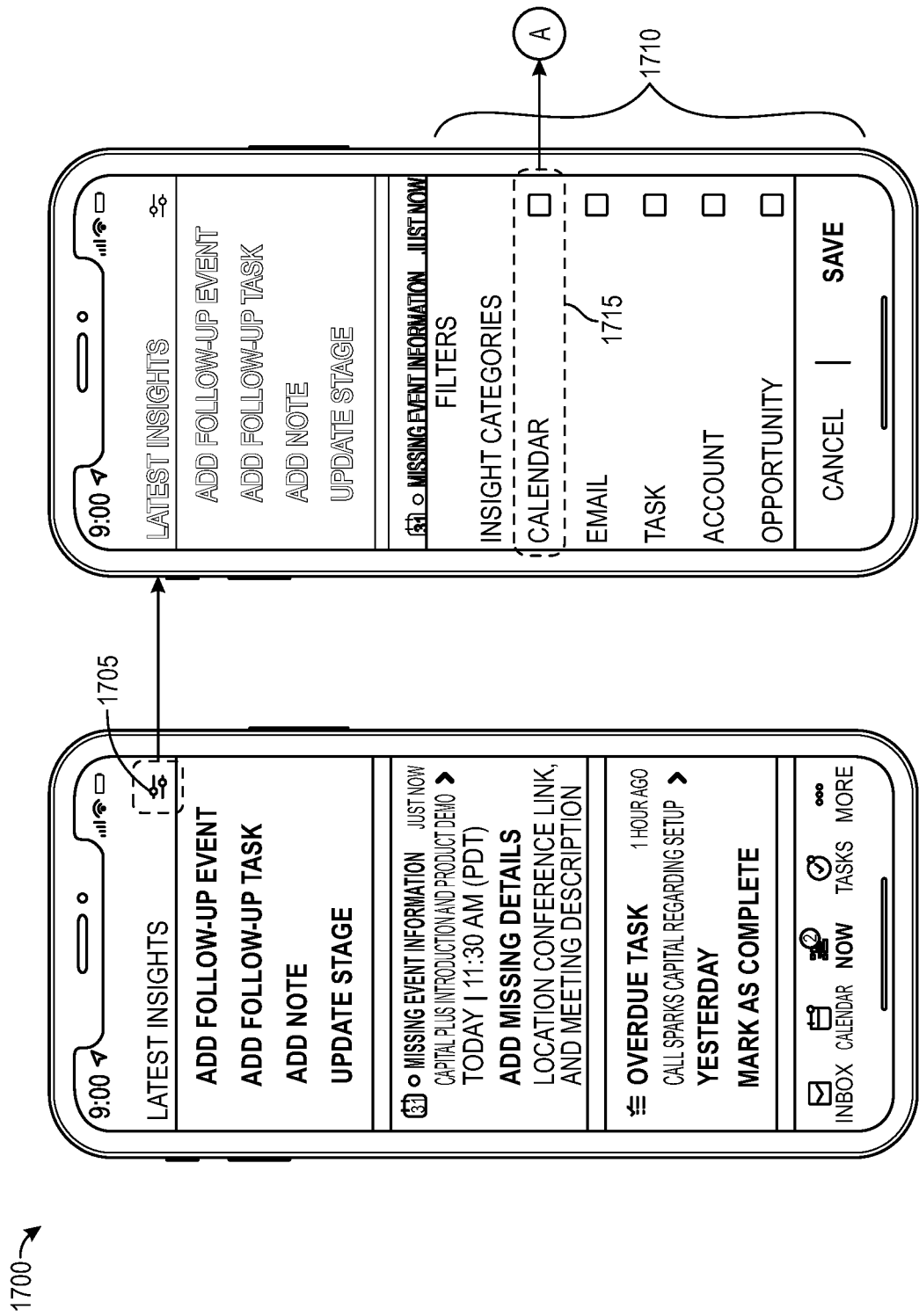
FIG. 17, according to an embodiment, depicts a user selecting to filter insights.
Figure 17:
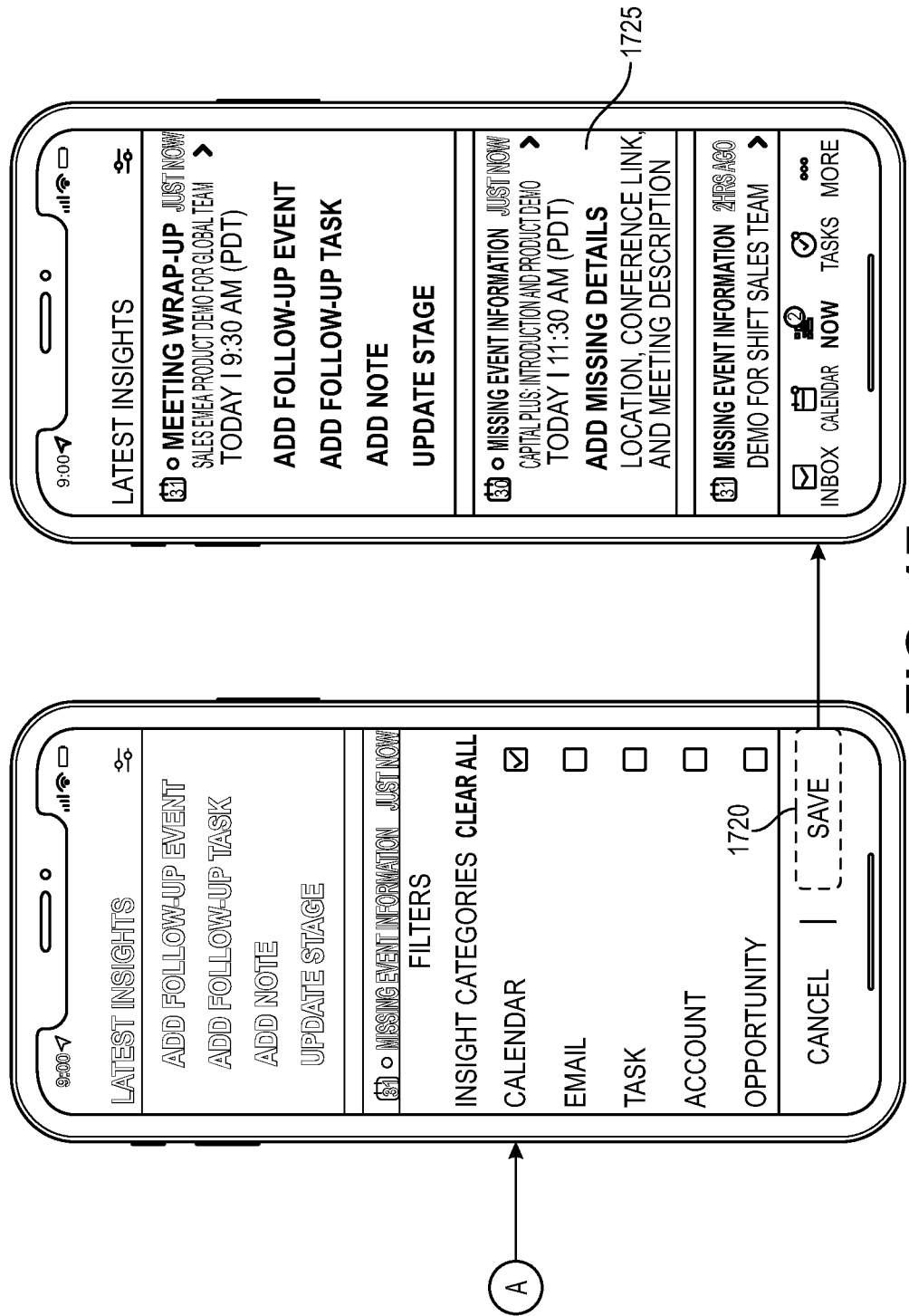

FIG. 11 depicts at 1165 a user interface that allows a user to filter insights based on insight category such as a calendar, email, task, account, or opportunity, insight. FIG. 17, according to an embodiment 1700, depicts a user selecting to filter insights at 1705, for example, by tapping on a filter icon, which causes the PIM application to display filter options at 1710. A user can select one or more filter options, for example, by tapping on a filter category, such as the calendar category of insights filter, as depicted at 1715. The user can then update the current configuration of filter insights, for example, by tapping on the save link as depicted at 1720. The filter insights screen then goes away, returning the user to the insights feed in pane 1125 as depicted at 1725. The insights feed is updated according to the filter insights configuration just updated and saved by the user a depicted at 1720.

Embodiments of the invention contemplate a graphical user interface such as depicted in FIG. 11 at 1100 being displayed on a mobile device for a PIM application 1105, in this example, an events-based application, and providing insights and for taking quick actions based on the insights. PIM application 1105 includes a first display pane 1110 that indicates today's events are selected. A carousel of cards for upcoming events is provided in display pane 1115, and an overview 1120 for a selected one of the events in the carousel of cards is displayed in display pane 1115. A user can see the next event that is on their calendar for the current (or selected) day, where they are the organizer or attendee. The user, in one embodiment, can swipe through upcoming event cards to see all the events in which they are to participate for that day.

In addition to the display pane 1115 providing a view of upcoming events, PIM application 1105 further provides a separate display pane 1125 that offers a feed, or view, of a plurality of insights relating to the upcoming events. According to one embodiment, the plurality of insights are chronologically sorted. In another embodiment, insights might be prioritized according to a level of importance or the like. FIG. 11 depicts an insight 1130 that event information is missing for an introduction and product demo meeting scheduled for 11:30 AM that day. This insight is not related to the current overview 1120 for the selected event displayed in pane 1115. However, it is appreciated that the user could scroll through the carousel of cards 1115 to locate the overview for the Capital Plus introduction and product demo event, or search through the sorted feed of insights appearing in display pane 1125 to find any insights related to the current overview 1120 for the selected event displayed in display pane 1115.

According to one embodiment, the list of insights may include only those insights for events occurring that same day, or for events occurring within some configurable period of time, such as 24 hours, 28 hours, 1 week, etc.

While FIG. 11 depicts a graphical user interface 1100 displayed on a mobile device for an events-based PIM application 1105, in other instances, the GUI displayed may be for an email app, a calendar app, a tasks app, or some other app, each of which can be selected and executed by the user tapping on respective icons 1145, 1150, 1155, and 1160. Likewise, PIM application 1105 provides the separate display pane 1125 that offers the view of the plurality of insights when a user selects icon 1140 relating to the upcoming events. Alternatively, the insights feed in display pane 1125 may be displayed by default when a user opens up and uses any PIM based application in display pane 1115.

Figure 18:
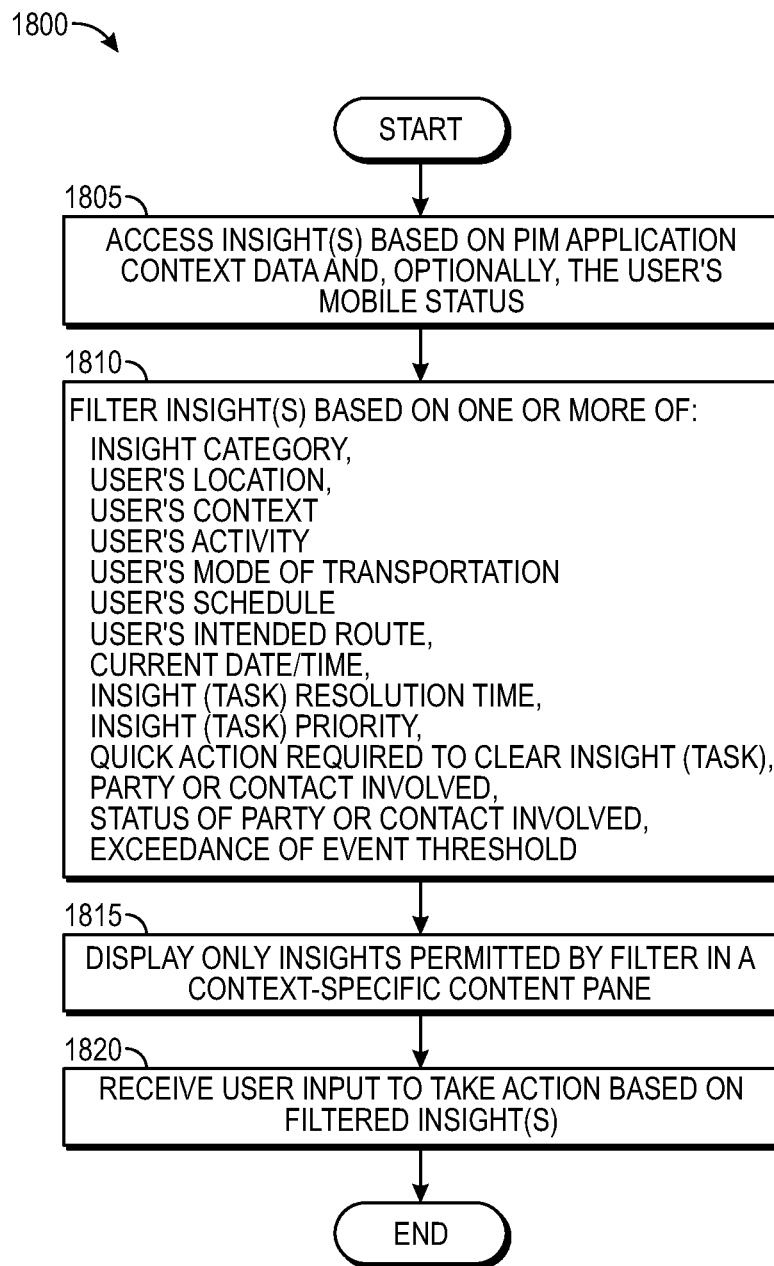
FIG. 18, according to an embodiment, depicts a user of a PIM application accessing insights based on the PIM application context data.

With reference to FIG. 18, according to an embodiment 1800, a user of a PIM application can access insights based on the PIM application context data, at 1805. The embodiment may further consider the user's mobile status in doing so. The user can control at 1810 which insights are displayed using the above-described filtering features. For, example, the user may filter, that is, determine which insights are displayed vs. which insights are hidden in the insights display pane 1115, based on one or more of the categories of insights enumerated herein, the user's location, the user's context, the user's current or upcoming scheduled activities, the user's current or intended mode of transportation, if appropriate, the user's intended route, the current date and/or time of day, the time it takes to clear (i.e., address or otherwise resolve) an insight (e.g., a task insight), the priority of an insight (e.g., a task insight), the type of quick action to completed, or the estimated time to complete a quick action needed to clear an insight, the one or more parties involved in the event or task or other type of primary content, their status, either in absolute terms or relative to the status of the user of the PIM application, or when a threshold is exceeded, such as a minimum period of time before an event is to occur, or a maximum period of time that has elapsed after an event has occurred. At 1815, once insights are filtered according to user preferences, only the insights that are permitted according to the filter settings are then displayed in a context-specific pane. Thereafter, user input may be received at 1820 to take an action, as described above, based on one or more of the filtered insights.

Embodiments for Providing a Record Overview of an Opportunity Based on an Event

Figure 27:
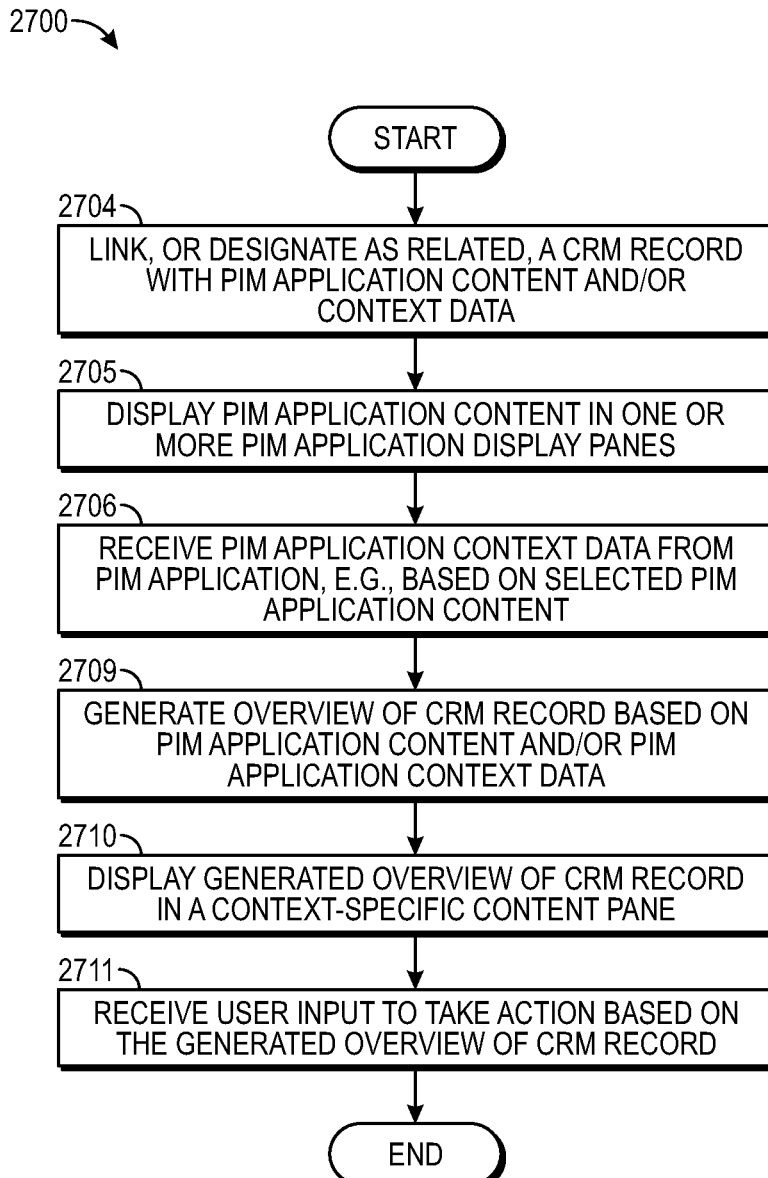
FIG. 27 depicts providing an overview of a CRM record based on related PIM content and context data, according to an embodiment of the invention.

Embodiments for providing an overview of a CRM record based on related PIM content and context data is described below with reference to the flow diagram 2700 in FIG. 27. In one embodiment 2700, PIM application content such as email messages or events are displayed by the PIM application. The user interface may display one or more panes containing PIM application-provided content at 2705, e.g., a first pane containing a listing of the user's email folders and contacts, a second pane containing a list of messages in a selected user email folder, and a third pane containing a view of a selected message within an email reading pane. The display of the multiple panes is provided by the third party PIM application. The user interface may additionally display at 2710 in a fourth, supplemental, display pane contextually relevant user-specific (i.e., context-specific) content, in particular, an overview of a CRM record related to the PIM content ("record overview"), e.g., a selected message which is specific to the particular user. The overview record may or may not be provided by the third party PIM application. In one embodiment, the user previously designates or links a CRM record with the PIM application content at 2704, In another embodiment, the overview record is derived from a crawling engine crawling one or more of the inbox, calendar, contacts, client opportunities, sales data, CRM data, active or background mobile apps, or social media links associated with the user, pursuant to configuration and permission granted by the user. In certain embodiments, the crawling for events and data is extended to any calendar appointment, task, email, or CRM account for which the user is a recipient, participant, or holds sufficient permissions to access such data.

In any case, the record overview is displayed in an additional display pane integrated with, or positioned next to, the other display panes provided by the third party PIM application.

When the PIM application displays calendar events, the user interface may display, in addition to a calendar, a separate display pane containing a record overview. This context-specific content may be similar to that displayed with an email message or may be different.

The record overview, whether for an email message or for a calendar event, can be provided by a database and database applications operating within a cloud-based system such as a PaaS-, SaaS-, IaaS-, or BaaS-system, or a proprietary computer system, or some other type of computer system. For instance, the host organization 110 may provide or retrieve such information as depicted at FIG. 1. To generate the record overview, the database of the host organization, according to one embodiment, receives at step 2706 PIM application context data from the third party PIM application and then executes one or more database applications (apps) using the context data as input for the apps to retrieve at step 2709 contextually relevant user specific overviews of CRM records available from the host organization or other sources not affiliated with the third party service provider hosting the PIM application. Once the user interface displays at 2710 in the supplemental display pane one or more record overviews, user input may be received at 2711 in response to one or more insights, e.g., to take some action, or quick action.

Figure 19:
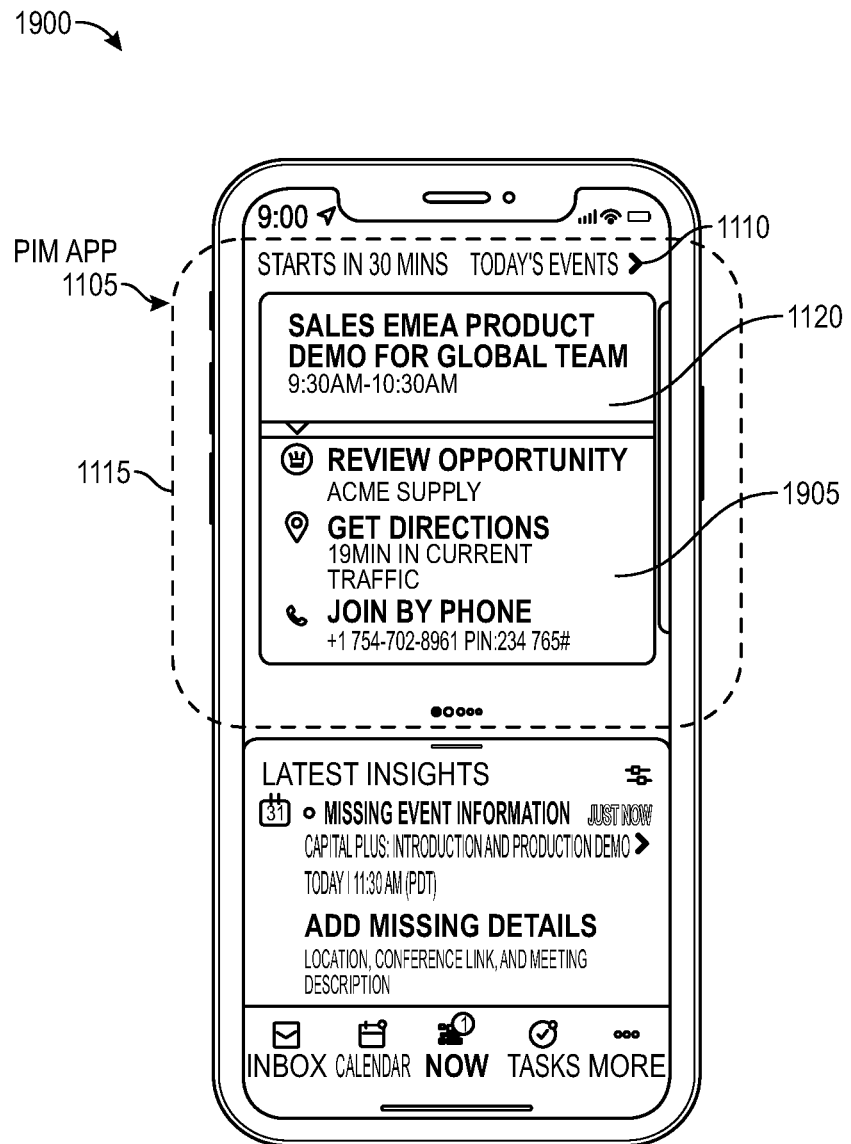
FIG. 19 depicts an embodiment wherein the PIM application is a calendaring application, and the PIM application content being displayed is a calendar event for today's date.
Figure 20:
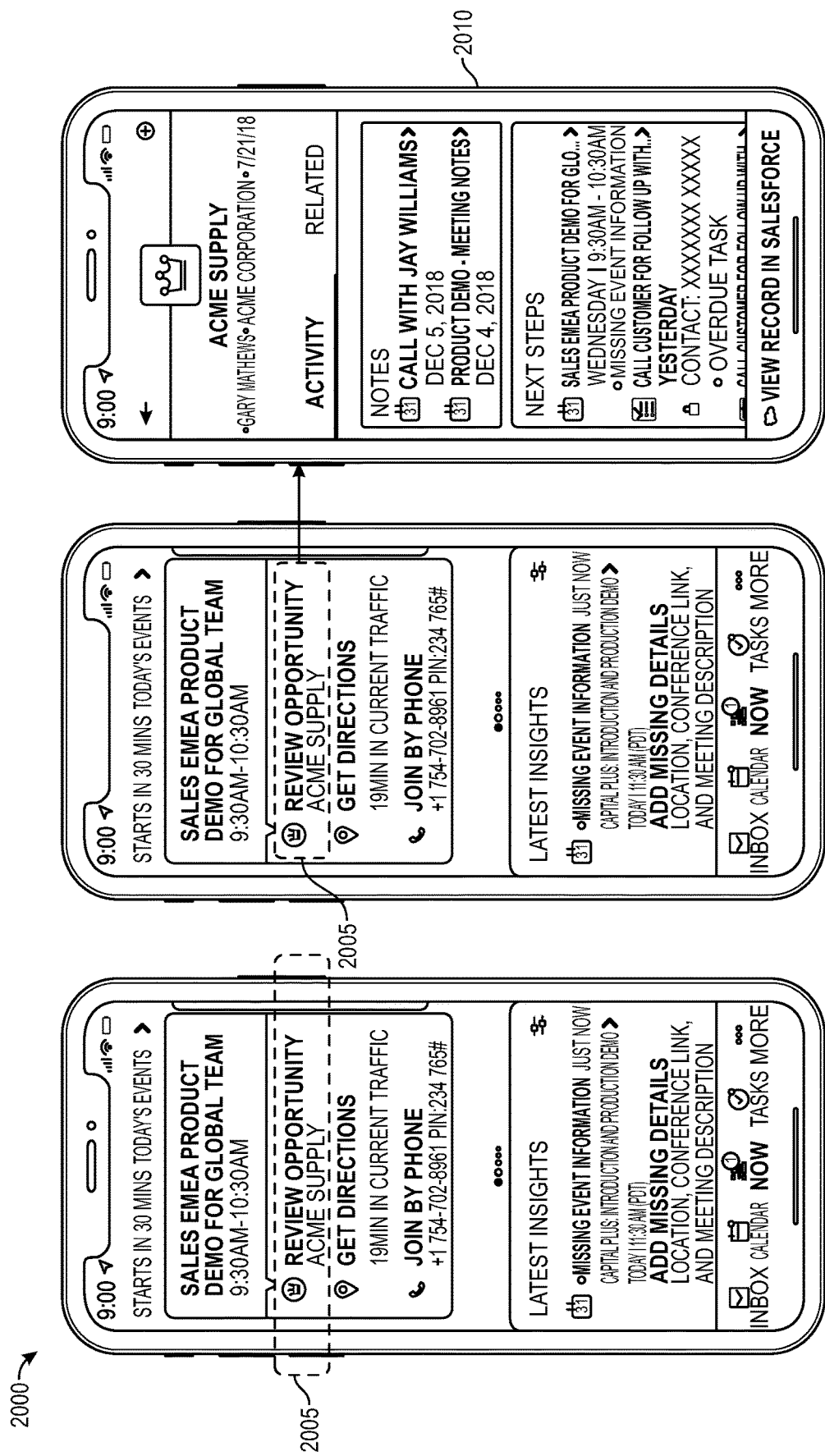
FIG. 20 depicts a PIM app that displays a related record or primary record in the CRM database, according to an embodiment.

With reference to FIG. 19, according to embodiments of the invention 1900, wherein the PIM application 1105 is a calendaring application, the PIM application content being displayed is a calendar event for today. Part of the "today's events" "card" 1110 shows a quick action 1905 to "Review opportunity" for the calendar event, in this case, a "Sales EMEA Product Demo for Global Team" event as described in the event overview section 1120 of viewing pane 1115. The "review opportunity" quick action provides the user with the ability to review an overview of a related CRM record overview. When selected by the user, the PIM app pulls information from the CRM system and merges it with PIM application content, e.g., the calendar event from the user's calendar client. Essentially, a user has the ability, when they create an event, to link a particular record in the CRM to the event so that the user can see a high-level quick snapshot of this opportunity, or this account, for example, to help inform the user of the conversation the user should have with the account contact before the user meets with the account contact. So if the user has designated a related record or primary record in the CRM database with the PIM application content, the PIM app will display it as highlighted in the embodiment 2000 illustrated in FIG. 20 at 2005 ("review opportunity"), and then when the user selects by tapping on the "review opportunity" quick action from the upcoming event card highlighted area 2005, the PIM application transition the display to a record overview page for that related or primary record in the CRM database, as depicted at 2010. In this way, the user can quickly get prepared for the next event by reviewing key information from the related CRM record. In particular, users can view a subset of key fields for an opportunity overview. These fields, according to one embodiment, map to a subset of fields that are customized by the org, for example, via admin level customization.

Figure 21:
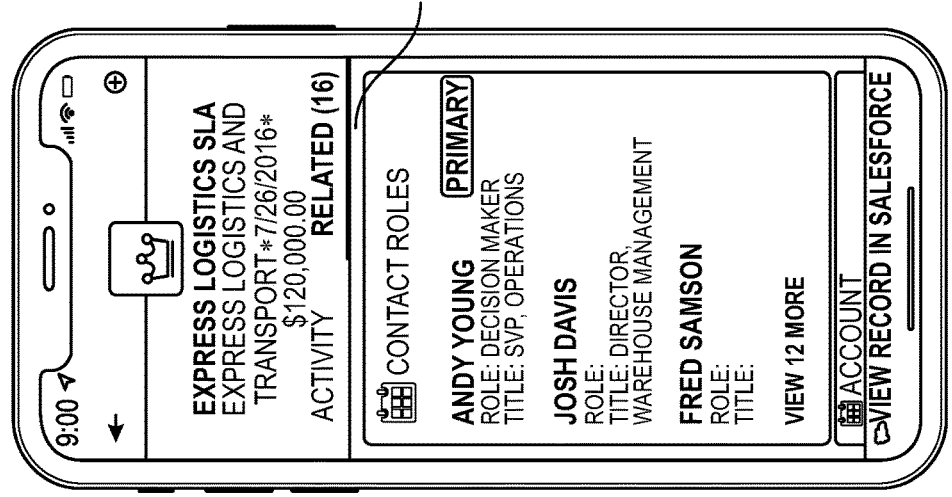
FIG. 21 depicts an example embodiment of a record overview of opportunities that relate to an upcoming event.

With reference to FIG. 21, an example embodiment 2100 of a record overview of opportunities that relate to an upcoming event is depicted. A user can access the overview of opportunities related to upcoming events. The opportunity overview record selects a focused set of content using page layout settings 2105 that informs what information appears in the record overview. A header 2110 allows users to see content that aligns to whatever fields are configured for the org. An activity tab 2115 allows users to see past notes that are associated with the opportunity record. Users can also see next steps and past activity, which aligns to the activity timeline content from a full record detail, but in a mobile and Inbox friendly format. Finally, a related tab 2120 allows users to see a limited subset of related content including contact roles and accounts.

Figure 22:
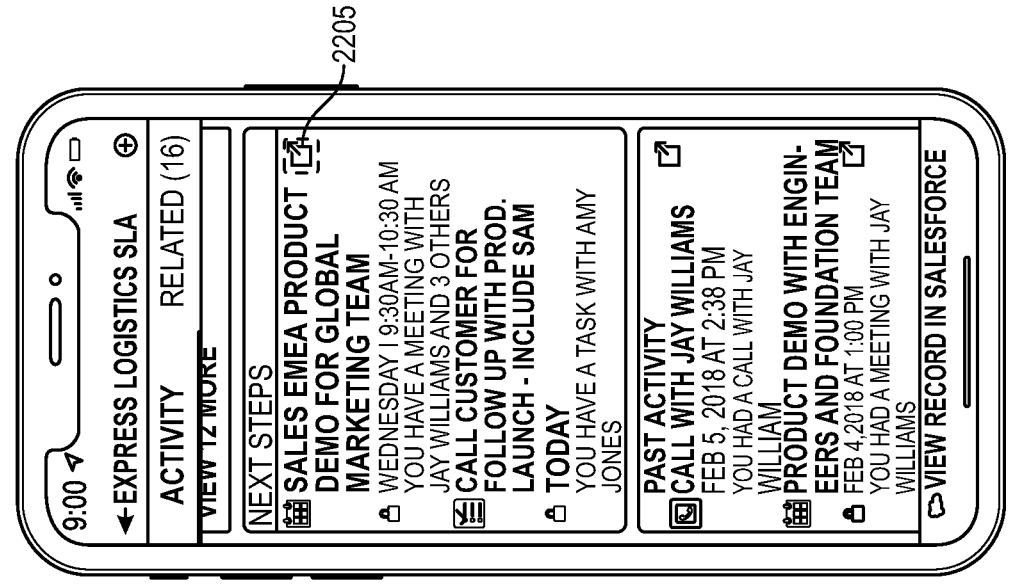
FIG. 22 depicts how the behavior of where a user will be taken to view a detail view of content in a record overview varies, upon selecting the highlighted external link icon, according to an embodiment.

With reference to FIG. 22, according to embodiment 2200, the behavior of where a user will be taken to view a detail view of content in a record overview varies, upon selecting the highlighted external link icon providing a visual indicator that is present on content that will take ("swizzle") the user out of the inbox 2205.

One embodiment also provides for displaying any activities for or associated with the record overview. For example, one embodiment displays as an activity a view of past notes from an opportunity overview. See, for example, FIG. 23, according to embodiment 2300, in which a user can tap on a note 2310 from the opportunity overview 2305 and be taken to note detail displayed in the Inbox at 2315. Likewise, a user can view next steps on an opportunity overview. Next step items are a mix of events and tasks, sorted chronologically, with the most recent activity at the top. The behavior of where a user will be taken to view the detail view of any next step activity will vary. For an event, the user will be taken to the PIM app to see the detail view of the event. For a task, the user will be taken to the detail view of the task within the Inbox.

As another example, depicted in FIG. 24, one embodiment 2400 displays as an activity a view of past activity from an opportunity overview at 2405. Past activity items are a mix of events, tasks, emails and calls sorted chronologically, with the most recent activity on top. The behavior of where a user will be taken to view the detail view of any past activity will vary, when a user taps on the view all activity link at 2410. For events, emails, and calls, the user will be taken to the PIM app to see the detail view of the event. For a task, the user will be taken to the detail view of the task within Inbox. Other embodiments also provide for displaying related contacts, related accounts, documents (such as Quip docs), or recent news for or associated with an opportunity overview.

With reference to FIG. 25, according to embodiment 2500, a user can access a full opportunity record in the CRM application. A user can access the full opportunity records from the opportunity overview. The entry point 2505 to the full record overview may be a sticky and fixed link in a portion, e.g., the bottom, of the record overview display. When a user taps on the entry point to view the full record in the CRM application, they will be taken to ("swizzled") to the opportunity record detail in the CRM application.

Figure 26:
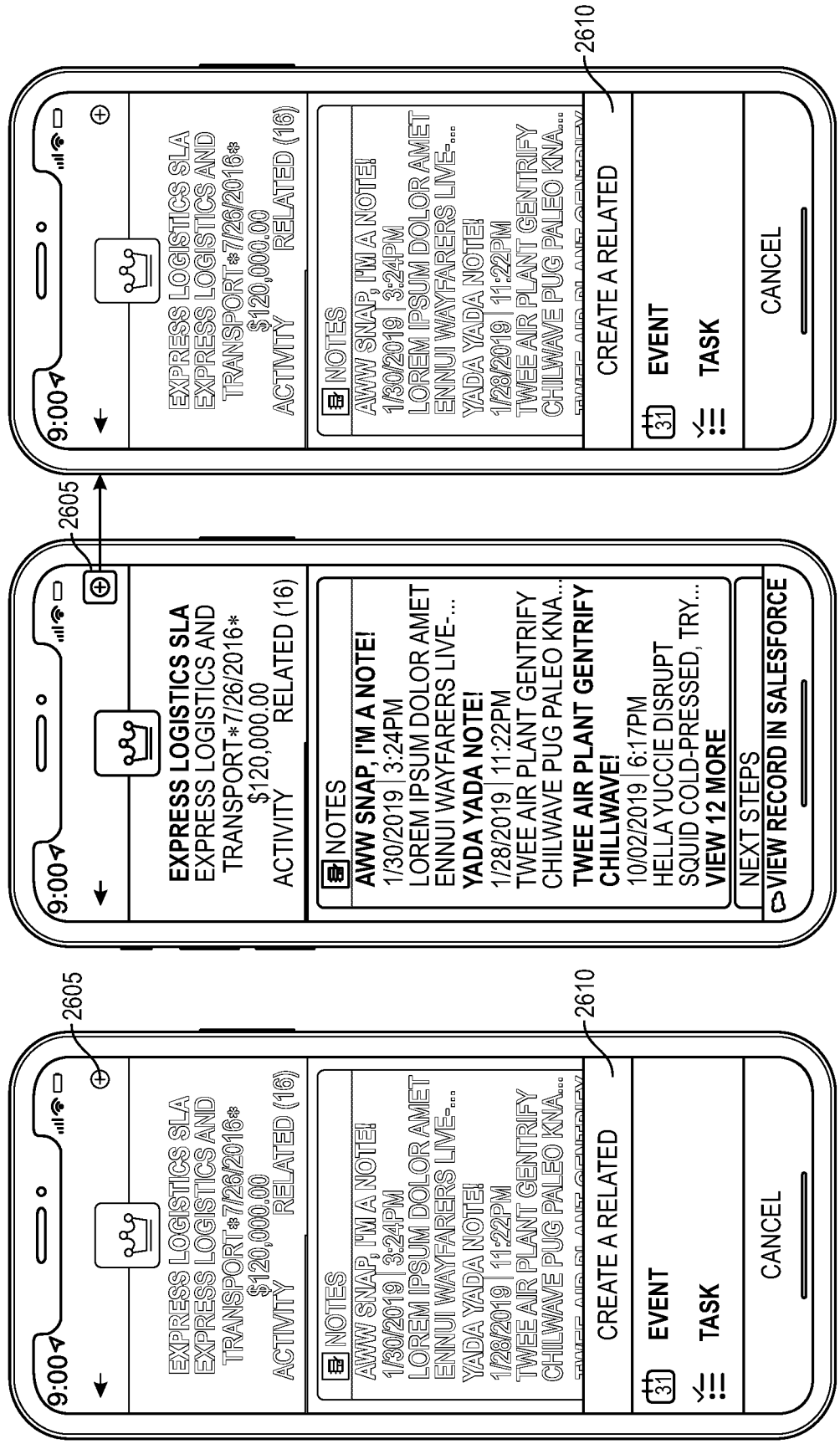
FIG. 26 depicts a user creating a related event, note, or task, from an opportunity overview.

With reference to FIG. 26, a user can create a related event, note, or task, from an opportunity overview. From the record overview display, a user can tap on the create button 2605, which causes the bottom sheet list of options for what can be created and related to the current record to be displayed, as depicted at 2610.

Figure 4B:
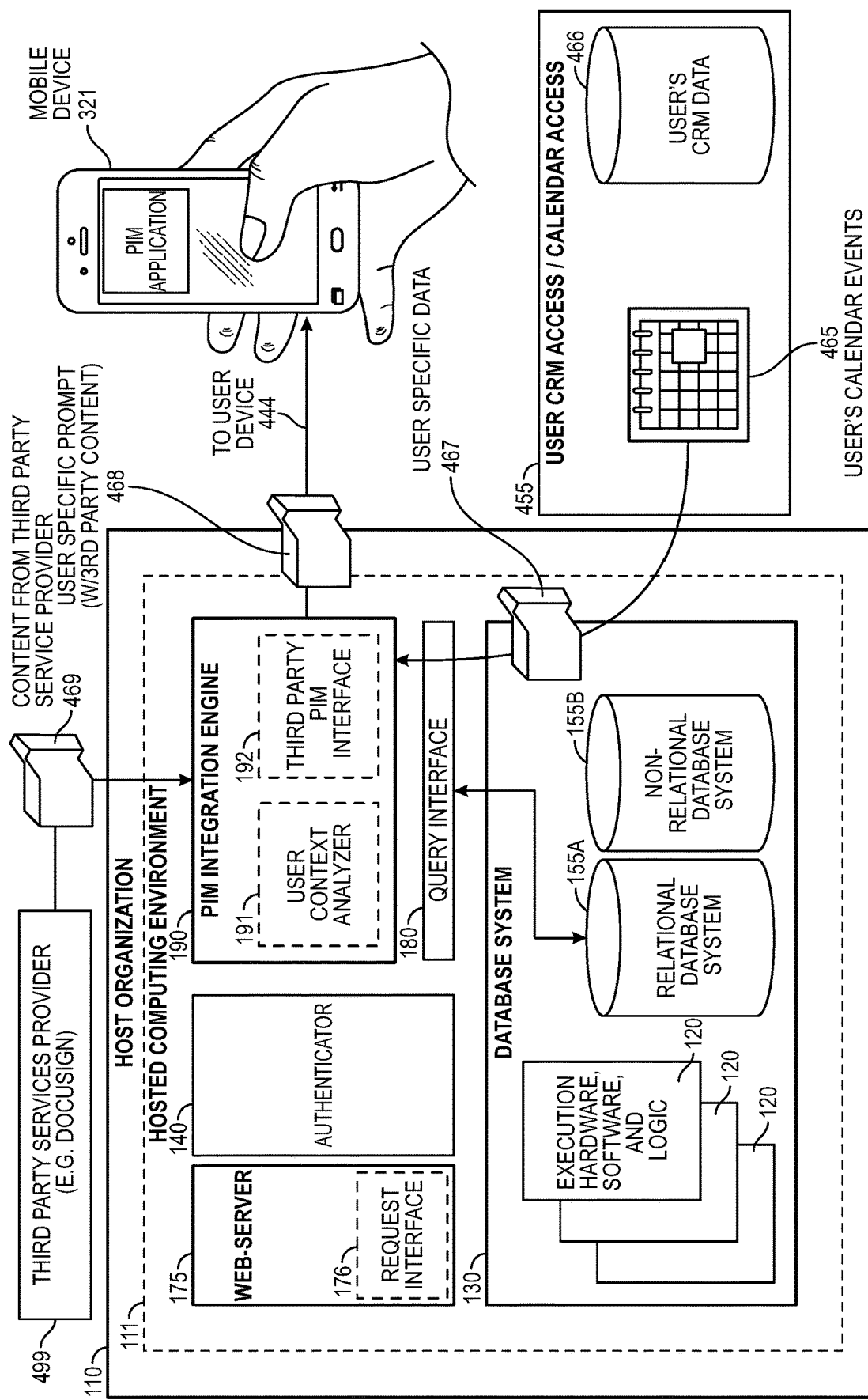
FIG. 4B depicts another alternative embodiment of the supplemental information provided to the user via the PIM application with supplemental information originating from a third party services provider.

Embodiments for Providing Supplemental Information from a Third Party Service Provider Other than the PIM Application Provider FIG. 4B depicts another alternative embodiment of the supplemental information provided to the user via the PIM application with such supplemental information originating from a third party services provider other than the PIM application provider.

According to certain embodiments, the host organization 110 supports the integration of third party custom data as provided by a third party services provider 499, such as DocuSign. For instance, whereas in the prior example, the additional context and contextually related content pushed to the user device by the PIM integration engine originated within the host organization's 110 own data and services, in this example, there is a third party services provider 499 which transmits content, as may be observed by element 469 indicating the content from the third party services provider, to the host organization which is then consumed by the PIM integration engine 190 followed by a user specific prompt 468, now with the third party content, being delivered to the user device 444 for supplemental display at the PIM application 321 executing on the mobile device.

Additionally, the host organization 110 is enabled to push context and data to external sources, such as DocuSign, similar to Salesforce.com's app builder capabilities.

As shown here, for the sake of example, DocuSign is in the business of helping users manage all their documents from the Cloud. Consequently, DocuSign has very specific processes and flows that must be followed that are not part of a PIM application normally, such as Gmail and Outlook. Consequently, a cloud computing services provider such as Saleseforce.com exposes an integration API to permit third party functionality providers to bring their services, features, and functionality into the cloud ecosystem, where it may then be pushed to the user's PIM application for display as contextually related content, despite such content originating from a third party service provider distinct from the host organization providing the PIM integration engine.

In such a way, third party service providers 499 are enabled to integrate their features into Gmail and Outlook simply by plugging (e.g., linking via the Salesforce.com exposed API) their features into the cloud computing service provider's host services. Moreover, a cloud computing services provider application development platform, such as Salesforce.com app builder, further helps such third party service providers bring their functionality over and link it with the cloud computing ecosystem so as to enable third party originated content to be displayed next to cloud computing services provided content. Further still, such integration helps cloud computing services users compose emails by utilizing cloud computing services providers features as provided by the host organization, but also features of the third party provider, such as DocuSign.

Two mechanisms are provided by which to integrate third party services with the PIM integration engine, specifically, third party initiated integration and host organization initiated integration.

With respect to third party initiated integration first, the third party services provider, according to one embodiment, utilizes the Salesforce.com app builder to select a Salesforce lightning component and then drag it into the layout manager for that Salesforce Experience so the third party content will be displayed within Outlook and Gmail. Once linked via the app builder, the third party services provider can then push that functionality through the host organization's platform.

In other situations, it may be the host organization that wishes to integrate the third-party data sources and third party services, such as LinkedIn or Twitter, natively into the host organization's supplemented PIM application experience but those third party services may not yet have taken action or may not yet be ready to do so themselves.

Therefore, the host organization may also initiate integration of the third party services much in the same way as before, except that internal host organization administrators utilize the app builder to link an object connected with the API of the third party services provider to consume a relevant data stream or to access the services of the third party services provider, via which the contextually relevant data may then be queried for, searched for, downloaded, or otherwise retrieved.

Once the third party services are integrated, users will be presented with contextually relevant information from those sources, despite the sources being external from Salesforce.com or the host organization 110 as depicted in FIG. 4B. According to certain embodiments, pattern matching is utilized to identify data from the third party services provider that is contextually relevant and appropriate for display to the user device.

For example, the PIM integration engine may evaluate the name or the email address of the people with which the native email application is interacting and then map an email address or name to potential matches in LinkedIn or Twitter, or whichever third party services provider is being referenced.

Such pattern matching is conducted based on context data provided by Outlook or Gmail which provides several metadata attributes associated with each email selected via the native Gmail or Outlook application. Such context information or metadata may include, for example, the email address, name, role, phone number, etc., all of which may be utilized for pattern matching to correlate data not within the host organization but which resides within some other third party services provider application.

In certain embodiments, a search or a query is performed by the PIM integration engine by leveraging the third party services provider's query tool, rather than performing pattern matching locally. For instance, the first name, the last name, the account the person works for and their job title may be passed directly to LinkedIn who has already built a matching engine that takes those different parameters into consideration and finds matching profiles with a degree of confidence. So if LinkedIn retrieves a profile and matches the email address and the phone number, then they will return that profile with a very high degree of certainty that it is a correct match. Conversely, if the pattern matching or the third party services provider query were only to find a profile based on a first name and last name, then the confidence level may be moderately high but not as high as a full match on richer data. And then, lastly, if only a job title were to match, then such a profile may correlate to a much lower degree of confidence.

Such scoring may be returned and presented within the supplemental and contextually relevant content by pushing the confidence and the profile to the mobile device from the PIM integration engine subsequent to performing the pattern matching or the query, thus permitting the user to make a determination or to have the option to accept or discard such data.

Figure 6:
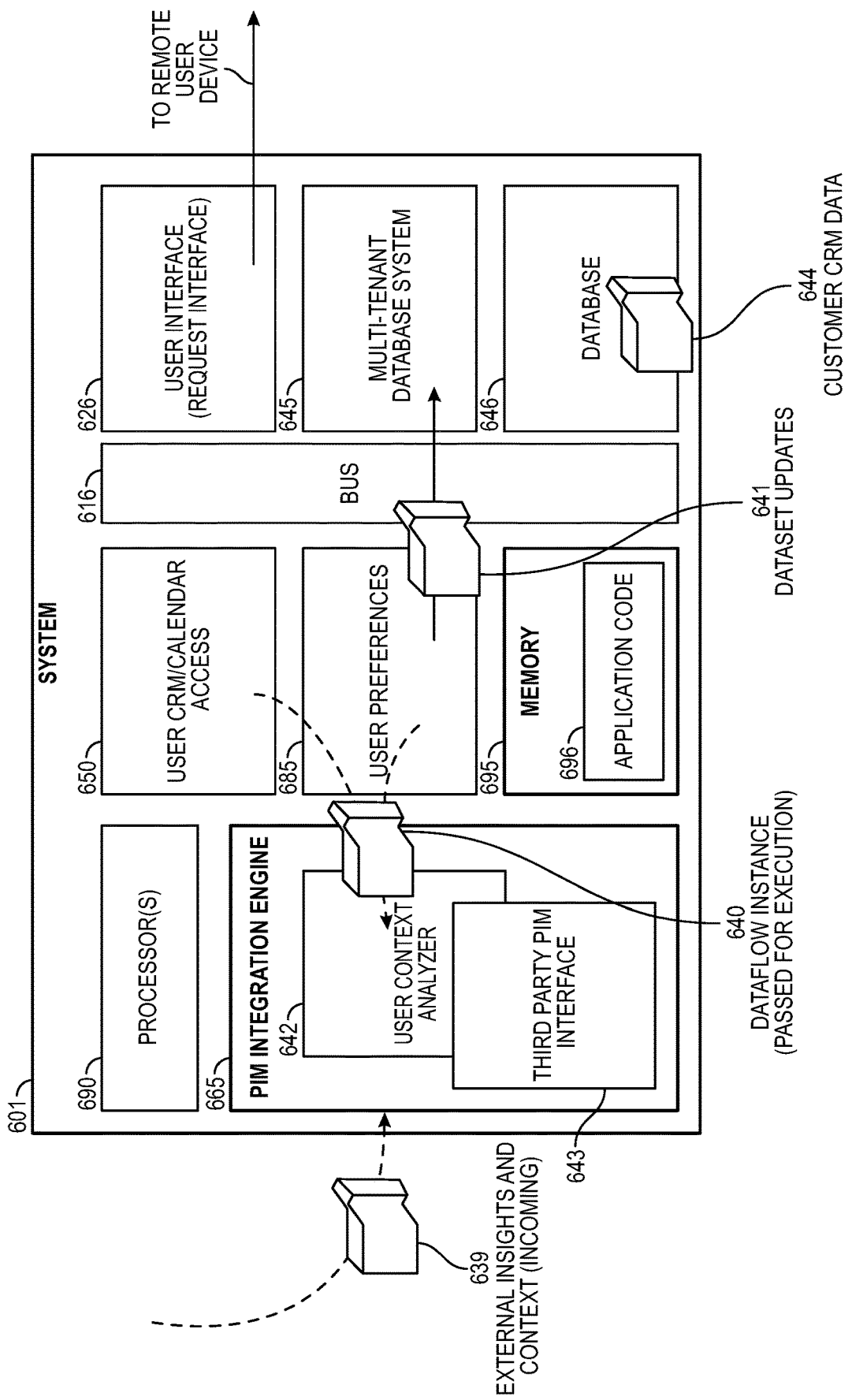
FIG. 6 shows a diagrammatic representation of a system in which embodiments may be operated, installed, integrated, or configured.

Computing, Network, and System Environments in which Embodiments of the Invention May Operate FIG. 6 shows a diagrammatic representation of a system 601 within which embodiments may operate, be installed, integrated, or configured. In accordance with one embodiment, there is a system 601 having at least a processor 690 and a memory 695 therein to execute implementing application code 696. Such a system 601 may communicatively interface with and cooperatively execute with the benefit of a hosted computing environment, such as a host organization, a multi-tenant environment, an on-demand service provider, a cloud based service provider, a client-server environment, etc.

According to the depicted embodiment, the system 601, which may operate within a host organization, includes the processor 690 and the memory 695 to execute instructions at the system 601. According to such an embodiment, the system 601 further includes: a user interface (request interface) 626 of the system to receive requests and interact with a remote user device; a PIM integration engine 665 having therein a user context analyzer 642 and a third party PIM interface 643, with the PIM integration engine being capable of receiving external insights and context 639 and to further receive user CRM access to customer CRM data 644 from database 646 as well as calendar access 650 permissions and user preferences 685 via dataflow instances 640. Dataset updates 641 may further be communicated to a multi-tenant database system 645 and database 646, as appropriate.

According to another embodiment of the system 601, a user interface 626 operates at a user client device remote from the system and communicatively interfaces with the system via a public Internet; in which the system operates at a host organization as a cloud based service provider to the user client device; in which the cloud based service provider hosts request interface exposed to the user client device via the public Internet, in which the request interface receives inputs from the client device to design the application as a request for services from the cloud based service provider.

Bus 616 interfaces the various components of the system 601 amongst each other, with any other peripheral(s) of the system 601, and with external components such as external network elements, other machines, client devices, cloud computing services, etc. Communications may further include communicating with external devices via a network interface over a LAN, WAN, or the public Internet.

Figure 7A:
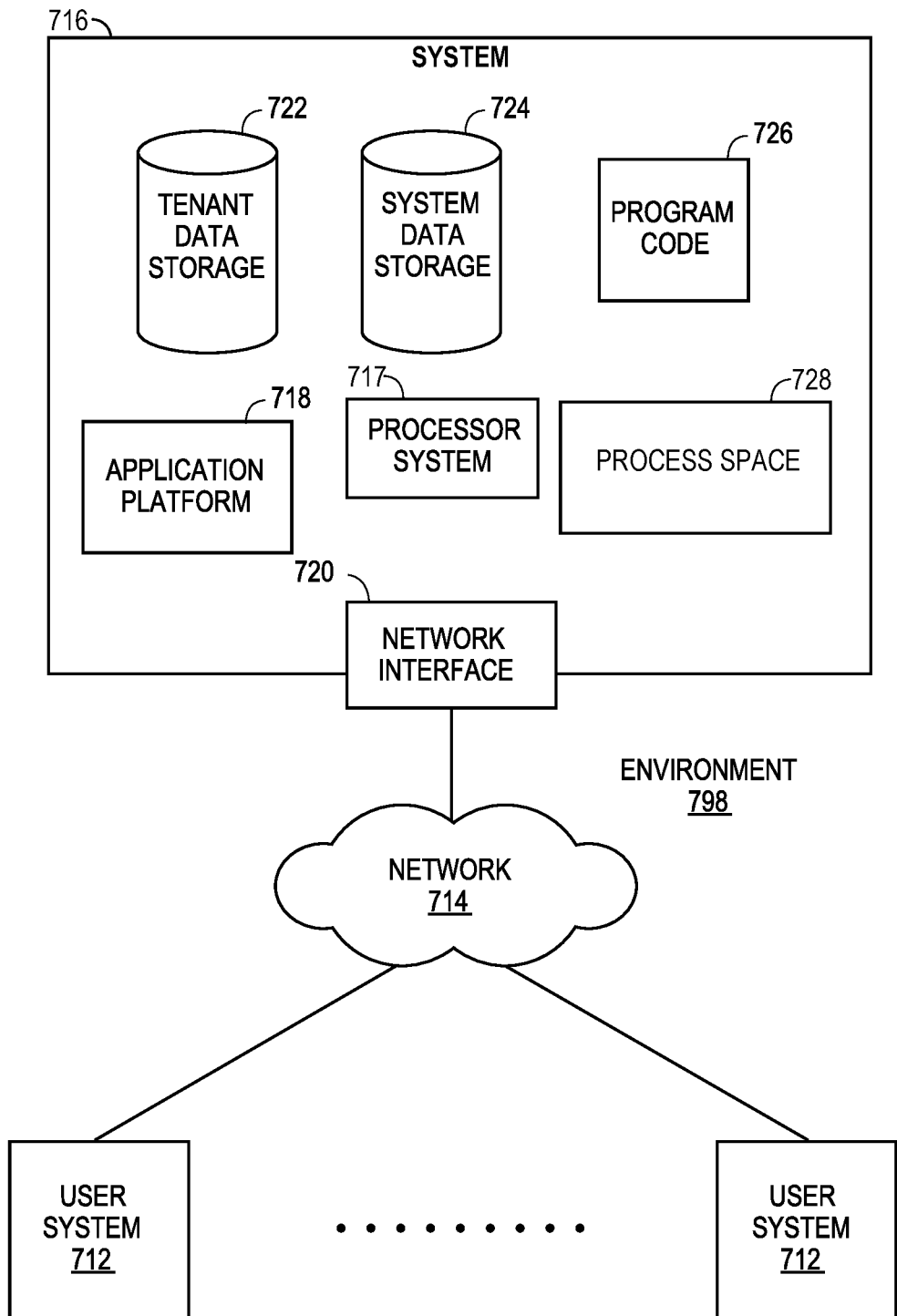
FIG. 7A illustrates a block diagram of an environment in which an on-demand database service may operate in accordance with the described embodiments.

FIG. 7A illustrates a block diagram of an environment 798 in which an on-demand database service may operate in accordance with the described embodiments. Environment 798 may include user systems 712, network 714, system 716, processor system 717, application platform 718, network interface 720, tenant data storage 722, system data storage 724, program code 726, and process space 728. In other embodiments, environment 798 may not have all of the components listed and/or may have other elements instead of, or in addition to, those listed above.

Environment 798 is an environment in which an on-demand database service exists. User system 712 may be any machine or system used by a user to access a database user system. For example, any of user systems 712 can be a handheld computing device, a mobile phone, a laptop computer, a workstation, and/or a network of computing devices. As illustrated in FIG. 7A (and in more detail in FIG. 7B) user systems 712 might interact via a network 714 with an on-demand database service, which is system 716.

An on-demand database service, such as system 716, is a database system that is made available to outside users that do not need to necessarily be concerned with building and/or maintaining the database system, but instead may be available for their use when the users need the database system (e.g., on the demand of the users). Some on-demand database services may store information from one or more tenants stored into tables of a common database image to form a multi-tenant database system (MTS). Accordingly, "on-demand database service 716" and "system 716" are used interchangeably herein. A database image may include one or more database objects. A relational database management system (RDMS) or the equivalent may execute storage and retrieval of information against the database object(s). Application platform 718 may be a framework that allows the applications of system 716 to run, such as the hardware and/or software, e.g., the operating system. In an embodiment, on-demand database service 716 may include an application platform 718 that enables creation, managing and executing one or more applications developed by the provider of the on-demand database service, users accessing the on-demand database service via user systems 712, or third party application developers accessing the on-demand database service via user systems 712.

The users of user systems 712 may differ in their respective capacities, and the capacity of a particular user system 712 might be entirely determined by permissions (permission levels) for the current user. For example, where a salesperson is using a particular user system 712 to interact with system 716, that user system has the capacities allotted to that salesperson. However, while an administrator is using that user system to interact with system 716, that user system has the capacities allotted to that administrator. In systems with a hierarchical role model, users at one permission level may have access to applications, data, and database information accessible by a lower permission level user, but may not have access to certain applications, database information, and data accessible by a user at a higher permission level. Thus, different users will have different capabilities with regard to accessing and modifying application and database information, depending on a user's security or permission level.

Network 714 is any network or combination of networks of devices that communicate with one another. For example, network 714 can be any one or any combination of a LAN (local area network), WAN (wide area network), telephone network, wireless network, point-to-point network, star network, token ring network, hub network, or other appropriate configuration. As the most common type of computer network in current use is a TCP/IP (Transfer Control Protocol and Internet Protocol) network, such as the global internetwork of networks often referred to as the "Internet" with a capital "I," that network is referred to in many of the examples herein. However, it is understood that the networks that the claimed embodiments may utilize are not so limited, although TCP/IP is a frequently implemented protocol.

User systems 712 might communicate with system 716 using TCP/IP and, at a higher network level, use other common Internet protocols to communicate, such as HTTP, FTP, AFS, WAP, etc. In an example where HTTP is used, user system 712 might include an HTTP client commonly referred to as a "browser" for sending and receiving HTTP messages to and from an HTTP server at system 716. Such an HTTP server might be implemented as the sole network interface between system 716 and network 714, but other techniques might be used as well or instead. In some implementations, the interface between system 716 and network 714 includes load sharing functionality, such as round-robin HTTP request distributors to balance loads and distribute incoming HTTP requests evenly over a plurality of servers. At least as for the users that are accessing that server, each of the plurality of servers has access to the MTS' data; however, other alternative configurations may be used instead.

In one embodiment, system 716, shown in FIG. 7A, implements a web-based customer relationship management (CRM) system. For example, in one embodiment, system 716 includes application servers configured to implement and execute CRM software applications as well as provide related data, code, forms, webpages and other information to and from user systems 712 and to store to, and retrieve from, a database system related data, objects, and Webpage content. With a multi-tenant system, data for multiple tenants may be stored in the same physical database object, however, tenant data typically is arranged so that data of one tenant is kept logically separate from that of other tenants so that one tenant does not have access to another tenant's data, unless such data is expressly shared. In certain embodiments, system 716 implements applications other than, or in addition to, a CRM application. For example, system 716 may provide tenant access to multiple hosted (standard and custom) applications, including a CRM application. User (or third party developer) applications, which may or may not include CRM, may be supported by the application platform 718, which manages creation, storage of the applications into one or more database objects and executing of the applications in a virtual machine in the process space of the system 716.

One arrangement for elements of system 716 is shown in FIG. 7A, including a network interface 720, application platform 718, tenant data storage 722 for tenant data 723, system data storage 724 for system data 725 accessible to system 716 and possibly multiple tenants, program code 726 for implementing various functions of system 716, and a process space 728 for executing MTS system processes and tenant-specific processes, such as running applications as part of an application hosting service. Additional processes that may execute on system 716 include database indexing processes.

Several elements in the system shown in FIG. 7A include conventional, well-known elements that are explained only briefly here. For example, each user system 712 may include a desktop personal computer, workstation, laptop, PDA, cell phone, or any wireless access protocol (WAP) enabled device or any other computing device capable of interfacing directly or indirectly to the Internet or other network connection. User system 712 typically runs an HTTP client, e.g., a browsing program, such as Microsoft's Internet Explorer browser, a Mozilla or Firefox browser, an Opera, or a WAP-enabled browser in the case of a smartphone, tablet, PDA or other wireless device, or the like, allowing a user (e.g., subscriber of the multi-tenant database system) of user system 712 to access, process and view information, pages and applications available to it from system 716 over network 714. Each user system 712 also typically includes one or more user interface devices, such as a keyboard, a mouse, trackball, touch pad, touch screen, pen or the like, for interacting with a graphical user interface (GUI) provided by the browser on a display (e.g., a monitor screen, LCD display, etc.) in conjunction with pages, forms, applications and other information provided by system 716 or other systems or servers. For example, the user interface device can be used to access data and applications hosted by system 716, and to perform searches on stored data, and otherwise allow a user to interact with various GUI pages that may be presented to a user. As discussed above, embodiments are suitable for use with the Internet, which refers to a specific global internetwork of networks. However, it is understood that other networks can be used instead of the Internet, such as an intranet, an extranet, a virtual private network (VPN), a non-TCP/IP based network, any LAN or WAN or the like.

According to one embodiment, each user system 712 and all of its components are operator configurable using applications, such as a browser, including computer code run using a central processing unit such as an Intel Pentium® processor or the like. Similarly, system 716 (and additional instances of an MTS, where more than one is present) and all of their components might be operator configurable using application(s) including computer code to run using a central processing unit such as processor system 717, which may include an Intel Pentium® processor or the like, and/or multiple processor units.

According to one embodiment, each system 716 is configured to provide webpages, forms, applications, data and media content to user (client) systems 712 to support the access by user systems 712 as tenants of system 716. As such, system 716 provides security mechanisms to keep each tenant's data separate unless the data are shared. If more than one MTS is used, they may be located in close proximity to one another (e.g., in a server farm located in a single building or campus), or they may be distributed at locations remote from one another (e.g., one or more servers located in city A and one or more servers located in city B). As used herein, each MTS may include one or more logically and/or physically connected servers distributed locally or across one or more geographic locations. Additionally, the term "server" is meant to include a computer system, including processing hardware and process space(s), and an associated storage system and database application (e.g., OODBMS or RDBMS) as is well known in the art. It is understood that "server system" and "server" are often used interchangeably herein. Similarly, the database object described herein can be implemented as single databases, a distributed database, a collection of distributed databases, a database with redundant online or offline backups or other redundancies, etc., and might include a distributed database or storage network and associated processing intelligence.

Figure 7B:
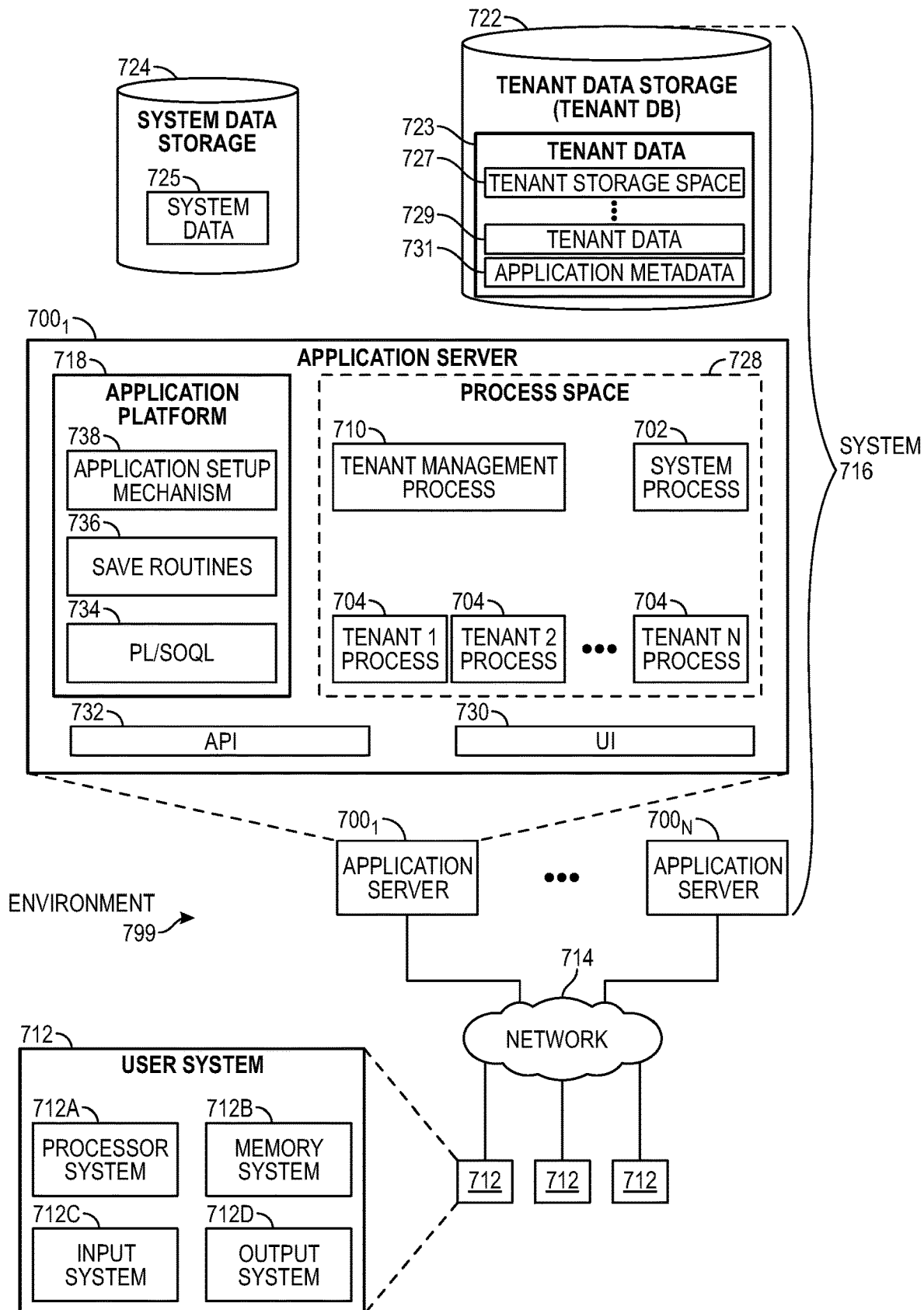
FIG. 7B illustrates another block diagram of an embodiment of elements of FIG. 7A and various possible interconnections between such elements in accordance with the described embodiments.

FIG. 7B illustrates another block diagram of an embodiment of elements of FIG. 7A and various possible interconnections between such elements in accordance with the described embodiments. FIG. 7B also illustrates environment 799. However, in FIG. 7B, the elements of system 716 and various interconnections in an embodiment are illustrated in further detail. More particularly, FIG. 7B shows that user system 712 may include a processor system 712A, memory system 712B, input system 712C, and output system 712D. FIG. 7B shows network 714 and system 716. FIG. 7B also shows that system 716 may include tenant data storage 722, having therein tenant data 723, which includes, for example, tenant storage space 727, tenant data 729, and application metadata 731. System data storage 724 is depicted as having therein system data 725. Further depicted within the expanded detail of application servers $700_{1-N}$ are User Interface (UI) 730, Application Program Interface (API) 732, application platform 718 includes PL/SOQL 734, save routines 736, application setup mechanism 738, process space 728 includes system process space 702, tenant 1-N process spaces 704, and tenant management process space 710. In other embodiments, environment 799 may not have the same elements listed above and/or may have other elements instead of, or in addition to, those listed above.

User system 712, network 714, system 716, tenant data storage 722, and system data storage 724 are discussed above in FIG. 7A. As shown by FIG. 7B, system 716 may include a network interface 720 (of FIG. 7A) implemented as a set of HTTP application servers 700, an application platform 718, tenant data storage 722, and system data storage 724. Also shown is system process space 702, including individual tenant process spaces 704 and a tenant management process space 710. Each application server 700 may be configured to tenant data storage 722 and the tenant data 723 therein, and system data storage 724 and the system data 725 therein to serve requests of user systems 712. The tenant data 723 might be divided into individual tenant storage areas (e.g., tenant storage space 727), which can be either a physical arrangement and/or a logical arrangement of data. Within each tenant storage space 727, tenant data 729, and application metadata 731 might be similarly allocated for each user. For example, a copy of a user's most recently used (MRU) items might be stored to tenant data 729. Similarly, a copy of MRU items for an entire organization that is a tenant might be stored to tenant storage space 727. A UI 730 provides a user interface and an API 732 provides an application programmer interface into system 716 resident processes to users and/or developers at user systems 712. The tenant data and the system data may be stored in various databases, such as one or more Oracle™ databases.

Application platform 718 includes an application setup mechanism 738 that supports application developers' creation and management of applications, which may be saved as metadata into tenant data storage 722 by save routines 736 for execution by subscribers as one or more tenant process spaces 704 managed by tenant management process space 710 for example. Invocations to such applications may be coded using PL/SOQL 734 that provides a programming language style interface extension to API 732. Invocations to applications may be detected by one or more system processes, which manages retrieving application metadata 731 for the subscriber making the invocation and executing the metadata as an application in a virtual machine.

Each application server 700 may be communicably coupled to database systems, e.g., having access to system data 725 and tenant data 723, via a different network connection. For example, one application server $700_1$ might be coupled via the network 714 (e.g., the Internet), another application server $700_{N-1}$ might be coupled via a direct network link, and another application server $700_N$ might be coupled by yet a different network connection. Transfer Control Protocol and Internet Protocol (TCP/IP) are typical protocols for communicating between application servers 700 and the database system. However, it will be apparent to one skilled in the art that other transport protocols may be used to optimize the system depending on the network interconnect used.

In certain embodiments, each application server 700 is configured to handle requests for any user associated with any organization that is a tenant. Because it is desirable to be able to add and remove application servers from the server pool at any time for any reason, there is preferably no server affinity for a user and/or organization to a specific application server 700. In one embodiment, therefore, an interface system implementing a load balancing function (e.g., an F5 Big-IP load balancer) is communicably coupled between the application servers 700 and the user systems 712 to distribute requests to the application servers 700. In one embodiment, the load balancer uses a least connections algorithm to route user requests to the application servers 700. Other examples of load balancing algorithms, such as round robin and observed response time, also can be used. For example, in certain embodiments, three consecutive requests from the same user may hit three different application servers 700, and three requests from different users may hit the same application server 700. In this manner, system 716 is multi-tenant, in which system 716 handles storage of, and access to, different objects, data and applications across disparate users and organizations.

As an example of storage, one tenant might be a company that employs a sales force where each salesperson uses system 716 to manage their sales process. Thus, a user might maintain contact data, leads data, customer follow-up data, performance data, goals and progress data, etc., all applicable to that user's personal sales process (e.g., in tenant data storage 722). In an example of a MTS arrangement, since all of the data and the applications to access, view, modify, report, transmit, calculate, etc., can be maintained and accessed by a user system having nothing more than network access, the user can manage his or her sales efforts and cycles from any of many different user systems. For example, if a salesperson is visiting a customer and the customer has Internet access in their lobby, the salesperson can obtain critical updates as to that customer while waiting for the customer to arrive in the lobby.

While each user's data might be separate from other users' data regardless of the employers of each user, some data might be organization-wide data shared or accessible by a plurality of users or all of the users for a given organization that is a tenant. Thus, there might be some data structures managed by system 716 that are allocated at the tenant level while other data structures might be managed at the user level. Because an MTS might support multiple tenants including possible competitors, the MTS may have security protocols that keep data, applications, and application use separate. Also, because many tenants may opt for access to an MTS rather than maintain their own system, redundancy, up-time, and backup are additional functions that may be implemented in the MTS. In addition to user-specific data and tenant specific data, system 716 might also maintain system level data usable by multiple tenants or other data. Such system level data might include industry reports, news, postings, and the like that are sharable among tenants.

In certain embodiments, user systems 712 (which may be client systems) communicate with application servers 700 to request and update system-level and tenant-level data from system 716 that may require sending one or more queries to tenant data storage 722 and/or system data storage 724. System 716 (e.g., an application server 700 in system 716) automatically generates one or more SQL statements (e.g., one or more SQL queries) that are designed to access the desired information. System data storage 724 may generate query plans to access the requested data from the database.

Each database can generally be viewed as a collection of objects, such as a set of logical tables, containing data fitted into predefined categories. A "table" is one representation of a data object, and may be used herein to simplify the conceptual description of objects and custom objects as described herein. It is understood that "table" and "object" may be used interchangeably herein. Each table generally contains one or more data categories logically arranged as columns or fields in a viewable schema. Each row or record of a table contains an instance of data for each category defined by the fields. For example, a CRM database may include a table that describes a customer with fields for basic contact information such as name, address, phone number, fax number, etc. Another table might describe a purchase order, including fields for information such as customer, product, sale price, date, etc. In some multi-tenant database systems, standard entity tables might be provided for use by all tenants. For CRM database applications, such standard entities might include tables for Account, Contact, Lead, and Opportunity data, each containing pre-defined fields. It is understood that the word "entity" may also be used interchangeably herein with "object" and "table."

In some multi-tenant database systems, tenants may be allowed to create and store custom objects, or they may be allowed to customize standard entities or objects, for example by creating custom fields for standard objects, including custom index fields. In certain embodiments, for example, all custom entity data rows are stored in a single multi-tenant physical table, which may contain multiple logical tables per organization. It is transparent to customers that their multiple "tables" are in fact stored in one large table or that their data may be stored in the same table as the data of other customers.

Figure 8:
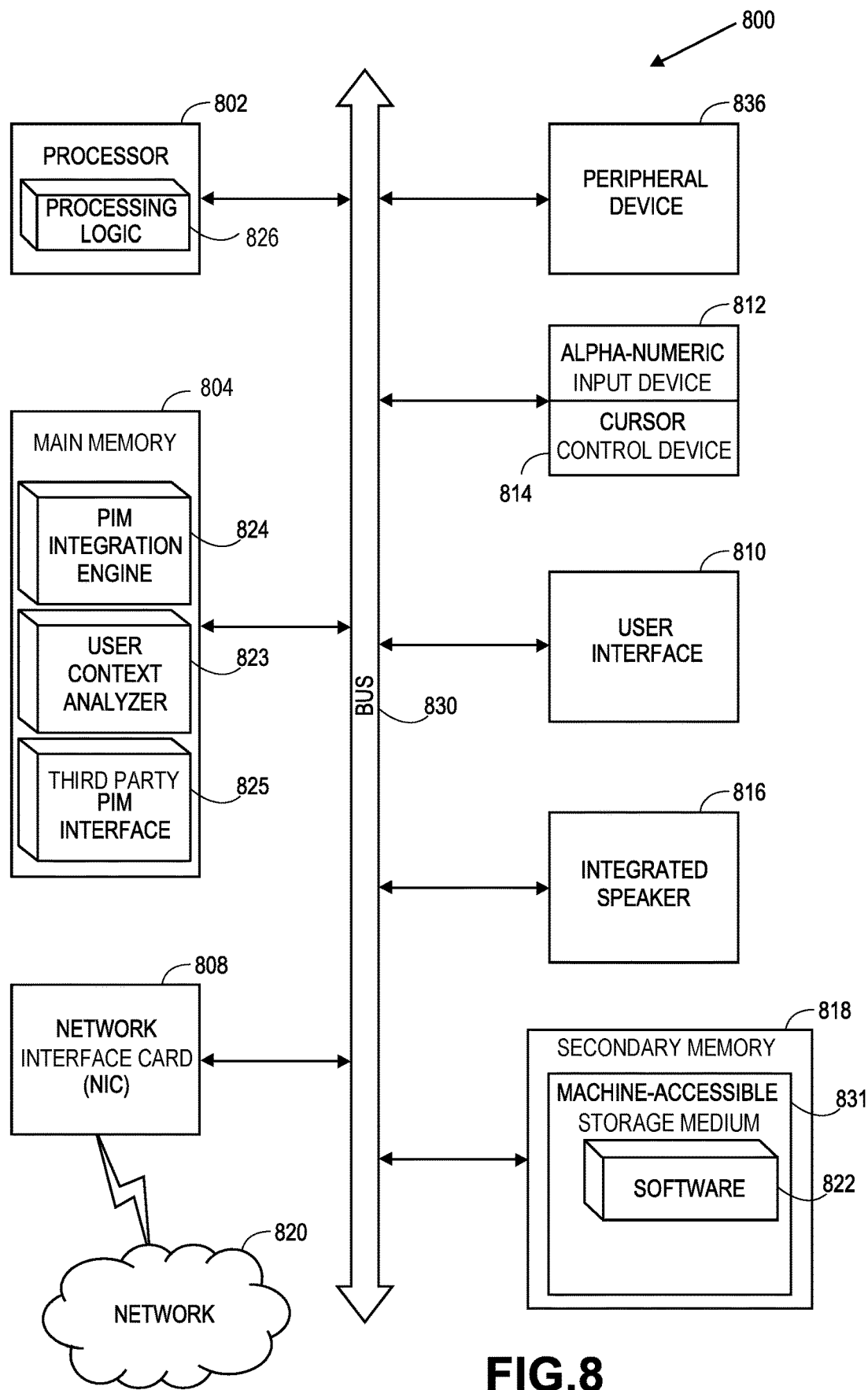
FIG. 8 illustrates a diagrammatic representation of a machine 800 in the exemplary form of a computer system, in accordance with one embodiment, within which a set of instructions for causing the machine/computer system 800 to perform any one or more of the methodologies discussed herein is executed.

FIG. 8 illustrates a diagrammatic representation of a machine 800 in the exemplary form of a computer system, in accordance with one embodiment, within which a set of instructions, for causing the machine/computer system 800 to perform any one or more of the methodologies discussed herein, may be executed. In alternative embodiments, the machine may be connected (e.g., networked) to other machines in a Local Area Network (LAN), an intranet, an extranet, or the public Internet. The machine may operate in the capacity of a server or a client machine in a client-server network environment, as a peer machine in a peer-to-peer (or distributed) network environment, as a server or series of servers within an on-demand service environment. Certain embodiments of the machine may be in the form of a personal computer (PC), a tablet PC, a set-top box (STB), a Personal Digital Assistant (PDA), a cellular telephone, a web appliance, a server, a network router, switch or bridge, computing system, or any machine capable of executing a set of instructions (sequential or otherwise) that specify actions to be taken by that machine. Further, while only a single machine is illustrated, the term "machine" shall also be taken to include any collection of machines (e.g., computers) that individually or jointly execute a set (or multiple sets) of instructions to perform any one or more of the methodologies discussed herein.

The exemplary computer system 800 includes a processor 802, a main memory 804 (e.g., read-only memory (ROM), flash memory, dynamic random access memory (DRAM) such as synchronous DRAM (SDRAM) or Rambus DRAM (RDRAM), etc., static memory such as flash memory, static random access memory (SRAM), volatile but high-data rate RAM, etc.), and a secondary memory 818 (e.g., a persistent storage device including hard disk drives and a persistent database and/or a multi-tenant database implementation), which communicate with each other via a bus 830. Main memory 804 includes a PIM integration engine 824 and a third party PIM interface 825 and a user context analyzer 823 by which to perform the described methodologies via the depicted system in accordance with described embodiments. Main memory 804 and its sub-elements are operable in conjunction with processing logic 826 and processor 802 to perform the methodologies discussed herein.

Processor 802 represents one or more general-purpose processing devices such as a microprocessor, central processing unit, or the like. More particularly, the processor 802 may be a complex instruction set computing (CISC) microprocessor, reduced instruction set computing (RISC) microprocessor, very long instruction word (VLIW) microprocessor, processor implementing other instruction sets, or processors implementing a combination of instruction sets. Processor 802 may also be one or more special-purpose processing devices such as an application specific integrated circuit (ASIC), a field programmable gate array (FPGA), a digital signal processor (DSP), network processor, or the like. Processor 802 is configured to execute the processing logic 826 for performing the operations and functionality discussed herein.

The computer system 800 may further include a network interface card 808. The computer system 800 also may include a user interface 810 (such as a video display unit, a liquid crystal display, etc.), an alphanumeric input device 812 (e.g., a keyboard), a cursor control device 814 (e.g., a mouse), and a signal generation device 816 (e.g., an integrated speaker). The computer system 800 may further include peripheral device 836 (e.g., wireless or wired communication devices, memory devices, storage devices, audio processing devices, video processing devices, etc.).

The secondary memory 818 may include a non-transitory machine-readable storage medium or a non-transitory computer readable storage medium or a non-transitory machine-accessible storage medium 831 on which is stored one or more sets of instructions (e.g., software 822) embodying any one or more of the methodologies or functions described herein. The software 822 may also reside, completely or at least partially, within the main memory 804 and/or within the processor 802 during execution thereof by the computer system 800, the main memory 804 and the processor 802 also constituting machine-readable storage media. The software 822 may further be transmitted or received over a network 820 via the network interface card 808.

While the subject matter disclosed herein is by way of example and in terms of the specific embodiments, it is understood that the claimed embodiments are not limited to the disclosed embodiments. To the contrary, the disclosure is intended to cover various modifications and similar arrangements as are apparent to those skilled in the art. Therefore, the scope of the appended claims encompass all such modifications and similar arrangements. The above description is intended to be illustrative, and not restrictive. Many other embodiments will be apparent to those of skill in the art upon reading and understanding the above description. The scope of the disclosed subject matter is therefore to be determined in reference to the appended claims, along with the full scope of equivalents to which such claims are entitled.

What is claimed is:

1. A method performed by a system having at least a processor and a memory therein and operating within a host organization that provides cloud-based services to subscribers, wherein the method comprises:
    displaying, by a Personal Information Management (PIM) application, a Graphical User Interface (GUI) including multiple display panes;

displaying, by the PIM application, PIM application content in the display panes;

selecting the displayed PIM application content for which to obtain record overviews of a Customer Relationship Management (CRM) record related to the PIM application content;

executing instructions via the processor of the system to communicably link a third-party PIM interface of the host organization with a third-party PIM application hosted remotely from the host organization;

executing instructions at the host organization to retrieve from the third-party PIM application, via the third-party PIM interface, PIM application context data related to the selected displayed PIM application content, wherein the PIM application context data was only stored external to the host organization prior to retrieval;

storing the PIM application context data retrieved from the third-party PIM application within databases of the host organization;

executing a PIM integration engine to generate the record overviews of the CRM record related to the PIM application content using the PIM application context data retrieved from the third-party PIM application;

transmitting the record overviews generated by the PIM integration engine to the PIM application for display within a context-specific display pane integrated with the display panes of the GUI using at least the PIM application context data retrieved from the third-party PIM application; and displaying the record overviews in the context-specific display pane.

2. The method of claim 1, further comprising designating the one or more CRM records as related to the selected displayed PIM application content or the received PIM application context data related to the selected displayed PIM application content.

3. The method of claim 1 further comprising receiving user input to take an action responsive to the generated one or more record overviews of the CRM record related to the selected displayed PIM application content.

4. The method of claim 1, wherein generating, by the application other than the PIM application, the one or more record overviews of the CRM record related to the PIM application content to display in the context-specific display pane integrated with the one or more display panes of the GUI based on the selected displayed PIM application content comprises generating, by the application other than the PIM application, the one or more record overviews of the CRM record related to the PIM application content to display in the context-specific display pane positioned next to the one or more display panes of the GUI.

5. The method of claim 1, further comprising:

receiving PIM application context data related to selected displayed PIM application content;

and wherein generating, by an application other than the PIM application, the one or more record overviews of the CRM record related to the PIM application content to display in the context-specific display pane integrated with the one or more display panes of the GUI based on the received PIM application content comprises generating the one or more record overviews of the CRM record related to the PIM application content to display in a context-specific display pane integrated with the one or more display panes of the GUI based on one of: the selected displayed PIM application content, the received PIM application context data, or both.

6. The method of claim 2 wherein designating one or more CRM records as related to the selected displayed PIM application content comprises designating one or more CRM records as related to the selected displayed PIM application content or the received PIM application context data related to the PIM application content.

7. The method of claim 1, wherein the PIM application is selected from a group of PIM applications including a calendar application, an email application, a task management application, an account management application, and an opportunity management application.

8. Non-transitory computer readable storage media having instructions stored thereon that, when executed by a processor of a system operating within a host organization that provides cloud-based services to subscribers, the instructions cause the system to perform operations including:

memory therein and operating within a host organization that provides cloud-based services to subscribers, wherein the method comprises:

displaying, by a Personal Information Management (PIM) application, a Graphical User Interface (GUI) including multiple display panes;

displaying, by the PIM application, PIM application content in the display panes;

selecting the displayed PIM application content for which to obtain record overviews of a Customer Relationship Management (CRM) record related to the PIM application content;

executing instructions via the processor of the system to communicably link a third-party PIM interface of the host organization with a third-party PIM application hosted remotely from the host organization;

executing instructions at the host organization to retrieve from the third-party PIM application, via the third-party PIM interface, PIM application context data related to the selected displayed PIM application content, wherein the PIM application context data was only stored external to the host organization prior to retrieval;

storing the PIM application context data retrieved from the third-party PIM application within databases of the host organization;

executing a PIM integration engine to generate the record overviews of the CRM record related to the PIM application content using the PIM application context data retrieved from the third-party PIM application;

transmitting the record overviews generated by the PIM integration engine to the PIM application for display within a context-specific display pane integrated with the display panes of the GUI using at least the PIM application context data retrieved from the third-party PIM application; and displaying the record overviews in the context-specific display pane.

9. The non-transitory computer readable storage media of claim 8, further comprising designating the one or more CRM records as related to the selected displayed PIM application content or the received PIM application context data related to the selected displayed PIM application content.

10. The non-transitory computer readable storage media of claim 8 further comprising receiving user input to take an action responsive to the generated one or more record overviews of the CRM record related to the selected displayed PIM application content.

11. The non-transitory computer readable storage media of claim 8, wherein generating, by the application other than the PIM application, the one or more record overviews of the CRM record related to the PIM application content to display in the context-specific display pane integrated with the one or more display panes of the GUI based on the selected displayed PIM application content comprises generating, by the application other than the PIM application, the one or more record overviews of the CRM record related to the PIM application content to display in the context-specific display pane positioned next to the one or more display panes of the GUI.

12. The non-transitory computer readable storage media of claim 8, further comprising:
receiving PIM application context data related to selected displayed PIM application content;
and wherein generating, by the application other than the PIM application, the one or more record overviews of the CRM record related to the PIM application content to display in the context-specific display pane integrated with the one or more display panes of the GUI based on the received PIM application content comprises generating the one or more record overviews of the CRM record related to the PIM application content to display in the context-specific display pane integrated with the one or more display panes of the GUI based on one of: the selected displayed PIM application content, the received PIM application context data, or both.

13. The non-transitory computer readable storage media of claim 9 wherein designating one or more CRM records as related to the selected displayed PIM application content comprises designating one or more CRM records as related to the selected displayed PIM application content or the received PIM application context data related to the PIM application content.

14. The non-transitory computer readable storage media of claim 8, wherein the PIM application is selected from a group of PIM applications including a calendar application, an email application, a task management application, an account management application, and an opportunity management application.

15. A system to operate within a host organization that provides cloud-based services to subscribers, wherein the system comprises:
a memory to store instructions;
a processor to execute instructions;
system logic to cause the system to perform operations including:
displaying, by a Personal Information Management (PIM) application, a Graphical User Interface (GUI) including multiple display panes;
displaying, by the PIM application, PIM application content in the display panes;
selecting the displayed PIM application content for which to obtain record overviews of a Customer Relationship Management (CRM) record related to the PIM application content;
executing instructions via the processor of the system to communicably link a third-party PIM interface of the host organization with a third-party PIM application hosted remotely from the host organization;
executing instructions at the host organization to retrieve from the third-party PIM application, via the third-party PIM interface, PIM application context data related to the selected displayed PIM application content, wherein the PIM application context data was only stored external to the host organization prior to retrieval;
storing the PIM application context data retrieved from the third-party PIM application within databases of the host organization;
executing a PIM integration engine to generate the record overviews of the CRM record related to the PIM application content using the PIM application context data retrieved from the third-party PIM application;
transmitting the record overviews generated by the PIM integration engine to the PIM application for display within a context-specific display pane integrated with the display panes of the GUI using at least the PIM application context data retrieved from the third-party PIM application; and
displaying the record overviews in the context-specific display pane.

16. The system of claim 15, further comprising designating the one or more CRM records as related to the selected displayed PIM application content or the received PIM application context data related to the selected displayed PIM application content.

17. The system of claim 15 further comprising receiving user input to take an action responsive to the generated one or more record overviews of the CRM record related to the selected displayed PIM application content.

18. The system of claim 15, wherein generating, by the application other than the PIM application, the one or more record overviews of the CRM record related to the PIM application content to display in the context-specific display pane integrated with the one or more display panes of the GUI based on the received PIM application content comprises generating, by the application other than the PIM application, the one or more record overviews of the CRM record related to the PIM application content to display in the context-specific display pane positioned next to the one or more display panes of the GUI.

19. The system of claim 15, further comprising:
receiving PIM application context data related to selected displayed PIM application content;
and wherein generating, by the application other than the PIM application, the one or more record overviews of the CRM record related to the PIM application content to display in the context-specific display pane integrated with the one or more display panes of the GUI based on the received PIM application content comprises generating the one or more record overviews of the CRM record related to the PIM application content to display in a context-specific display pane integrated with the one or more display panes of the GUI based on one of: the selected displayed PIM application content, the received PIM application context data, or both.

20. The system of claim 16 wherein designating one or more CRM records as related to the selected displayed PIM application content comprises designating one or more CRM records as related to the selected displayed PIM application content or the received PIM application context data related to the PIM application content.

21. The system of claim 15, wherein the PIM application is selected from a group of PIM applications including a calendar application, an email application, a task management application, an account management application, and an opportunity management application.

* * * * *